(12) United States Patent
Cooke et al.

(10) Patent No.: US 7,934,668 B2
(45) Date of Patent: May 3, 2011

(54) FUEL INJECTOR

(75) Inventors: Michael Peter Cooke, Gillingham (GB); Godfrey Greeves, Middlesex (GB); Nebojsa Milovanovic, Bishops Stortford (GB)

(73) Assignee: Delphi Technologies Holdings S.arl, Troy, MI (US)

( * ) Notice: Subject to any disclaimer, the term of this patent is extended or adjusted under 35 U.S.C. 154(b) by 237 days.

(21) Appl. No.: 12/291,667

(22) Filed: Nov. 12, 2008

(65) Prior Publication Data
US 2009/0134246 A1 May 28, 2009

(30) Foreign Application Priority Data

Nov. 16, 2007 (EP) .................................. 07254496

(51) Int. Cl.
*F02M 61/00* (2006.01)
(52) U.S. Cl. ........... 239/533.12; 239/533.11; 239/533.9; 239/533.2; 239/102.2; 239/88; 239/467
(58) Field of Classification Search ............... 239/533.2, 239/533.9, 533.11, 533.12, 102.2, 88, 96, 239/467
See application file for complete search history.

(56) References Cited

U.S. PATENT DOCUMENTS

| 4,266,727 | A | 5/1981 | Happel et al. |
| 5,669,334 | A | 9/1997 | Schönfeld et al. |
| 2006/0243827 | A1 | 11/2006 | Cooke |

FOREIGN PATENT DOCUMENTS

| CN | 1946926 A | 4/2007 |
| EP | 0 520 659 | 12/1992 |
| EP | 1 526 274 | 4/2005 |
| EP | 1 693 562 | 8/2006 |
| GB | 2 424 451 | 9/2006 |

OTHER PUBLICATIONS

China Office Action dated Oct. 12, 2010.
European Search Report Dated Aug. 21, 2008.

*Primary Examiner* — Dinh Q Nguyen
(74) *Attorney, Agent, or Firm* — Thomas N. Twomey

(57) ABSTRACT

A fuel injector for use in an internal combustion engine, comprising a nozzle body being provided with a nozzle bore and at least one set of one or more outlets for fluid, an outer valve member received within the nozzle bore and being engageable with a first seating region of the nozzle body to control the flow of a first fluid from a first delivery chamber, the outer valve member being provided with an outer valve bore, and an inner valve member received within the outer valve bore and being engageable with a second seating region of the nozzle body to control the flow of a second fluid from a second delivery chamber. In various embodiments, the fuel injector can be arranged to allow the first and second fluids to be injected separately and/or together. In one embodiment, the first and second fluids can be mixed within the injector before injection.

55 Claims, 49 Drawing Sheets

FUEL INJECTOR

TECHNICAL FIELD

The present invention relates to a fuel injector for use in a fuel injection system for an internal combustion engine. More particularly, the present invention relates to a fuel injector wherein first and second valve needles are operable to control the injection of two fluids into a combustion space.

BACKGROUND OF THE INVENTION

Modern internal combustion engines typically operate either on the spark ignition principle, or on the compression ignition principle. In both cases, reciprocating pistons undergo a combustion cycle comprising intake, compression, power and exhaust strokes within respective cylinders of the engine. The reciprocating motion of the piston is driven on the power stroke by the rapid expansion of combusting gases within a combustion chamber of the cylinder.

SUMMARY OF THE INVENTION

In a spark ignition engine, such as a gasoline or petrol engine, a mixture of fuel and air, known as a charge, is introduced into the combustion chamber on the intake stroke. The charge is compressed on the compression stroke, and is then ignited by a spark from a spark plug to cause combustion. The mixture of fuel and air is substantially homogeneous within the combustion chamber, and burns at a flame front that moves outwards from the spark plug. If the ignition timing in a spark ignition engine is set too early, for example so that ignition occurs before the power stroke begins, the charge may detonate simultaneously in an uncontrolled manner known as pinking or knocking.

In a compression ignition engine, such as a diesel engine, air alone is drawn into the combustion chamber during the intake stroke. The air is then compressed on the compression stroke. At the end of the compression stroke, fuel is injected into and mixes with the compressed air. As a result of the high temperature of the compressed air, the air-fuel mixture undergoes spontaneous combustion. Combustion occurs at a front, at which the fuel and air mix, and this combustion front propagates through the combustion chamber. Thus the charge burns in a gradual manner, sometimes referred to as a stratified manner. The temperature, at which the fuel spontaneously ignites, is known as the auto-ignition temperature.

There is a continuing desire to reduce exhaust emissions and fuel consumption in internal combustion engines. To an extent, improvements can be achieved by incremental refinement of engines that operate in spark ignition or compression ignition combustion modes. However, recent research has indicated that improvements in exhaust emissions and fuel consumption might also be realized by using alternative combustion modes.

One promising area is the development of engines capable of operating in the homogeneous charge compression ignition (HCCI) combustion mode, also known as pre-mixed charge compression ignition (PCCI) or controlled auto-ignition (CAI), which offer high thermal efficiency and extremely low emissions of nitrogen oxides and particulates.

In the HCCI mode, fuel is mixed with air before combustion of the charge begins, either by drawing pre-mixed fuel and air into the combustion chamber during the intake stroke, or by injecting fuel directly into the combustion chamber while air is simultaneously drawn in during the intake stroke. Ignition of the fuel occurs spontaneously as the charge is compressed during the compression stroke of the engine. Because the mixture of fuel and air is homogeneous at the point of ignition, all of the charge combusts simultaneously. Thus, the HCCI combustion mode can be considered to combine the homogeneous charge aspect of the spark ignition combustion mode with the spontaneous ignition aspect of the compression ignition combustion mode.

Currently, engines operating in the HCCI combustion mode are relatively difficult to control. For example, because there is no positive initiator for combustion, combustion tends to occur earlier in the combustion cycle than would be optimum, and the rapid combustion causes high cylinder pressures, structural stresses and undesirable noise and vibration.

For these and other reasons, it has so far proved difficult to find a fuel that is capable of being used over the full desired load and speed ranges of an engine operating in the HCCI combustion mode. For example, at low engine loads and speeds, the temperature reached in the cylinder during the compression stroke is relatively low. Diesel fuel is therefore suitable under those conditions, because it has a correspondingly low auto-ignition temperature.

At high engine loads and speeds, however, the cylinder temperature reached during the compression stroke can be significantly higher than at low loads and speeds. Consequently, diesel fuel ignites too early in the combustion cycle, before the piston has reached the end of the compression stroke, leading to reduced efficiency and power output. Furthermore, combustion of diesel fuel under these conditions takes place too rapidly for efficient conversion into movement of the piston, and causes excessive cylinder pressures and high engine noise.

Petrol or ethanol is more suitable for use under high engine loads and speeds, because it has a higher auto-ignition temperature. Conversely, at low engine loads and speeds, such fuels are not suitable because the cylinder temperatures are not high enough to cause compression ignition of the fuel.

For these and other reasons, it is desirable to provide a system for delivering two different fuels to the combustion chambers of cylinders in an engine operating in the HCCI mode, to allow the engine to run on a first fuel, a second fuel, or a mixture of the two. Such a system may be useful in applications other than HCCI, for example to allow switching between alternative combustion modes. Similar systems suitable for injecting a liquid fuel and a gaseous fuel, or a fuel and an additive such as a water or a knock suppressant are also desirable.

A number of systems capable of delivering two different fluids to a combustion chamber are conceivable. In one example, two separate injection systems could be provided, one for each fluid. However, such an arrangement would be prohibitively expensive for automotive use, and the space constraints in and around the cylinder head of a typical automotive engine would prevent the fitment of two fuel injectors for each cylinder.

In another arrangement, two injection valves could be incorporated into a single injector so that, as in the majority of existing engines, only one injector need be provided for each cylinder of the engine. Such an injector could, for example, incorporate two needle valves, each operable by respective actuators in order to control the injection of each fluid. The needles of the valves could be accommodated within the injector in adjacent bores, or coaxially in a single bore.

In all of these systems, separate control and drive systems must be provided to control selective injection of the fluids, with a consequential impact on the cost and complexity of providing such systems.

Against this background, it would be desirable to provide a single fuel injector that is capable of selectively injecting two different fluids into the combustion chamber of an engine cylinder, and that alleviates or overcomes the problems described above, or that at least provides an alternative solution.

According to a first aspect of the present invention, there is provided a fuel injector for use in an internal combustion engine, comprising a nozzle body provided with a nozzle bore and at least one set of one or more outlets for fluid, an outer valve member received within the nozzle bore and being engageable with a first seating region of the nozzle body to control the flow of a first fluid from a first delivery chamber, the outer valve member being provided with an outer valve bore, and an inner valve member received within the outer valve bore and being engageable with a second seating region of the nozzle body to control the flow of a second fluid from a second delivery chamber. The fuel injector further comprises an injection control chamber for the first fluid, a pressure control arrangement for controlling the pressure of fluid in the control chamber, a first surface associated with the inner valve member, which is exposed to fluid pressure within the injection control chamber, and a second surface associated with the outer valve member, which is exposed to fluid pressure within the injection control chamber. When the injection control chamber is at an intermediate fluid pressure, the inner and outer valve members are in engagement with their respective seating regions. The first and second surfaces are arranged such that when the pressure of fluid within the injection control chamber is increased from the intermediate fluid pressure to a relatively high pressure, one of the outer valve member or the inner valve member is caused to disengage its respective seating region, and when the pressure of fluid within the injection control chamber is decreased from the intermediate fluid pressure to a relatively low pressure, the other of the outer valve member or the inner valve member is caused to disengage its respective seating region.

In this way, the delivery of fuel into a combustion chamber of the engine can be controlled by operation of the outer and inner valve members to cause flow of the first and second fluids from the respective first and second delivery chambers. The first fluid is preferably a liquid fuel, for example diesel. The second fluid may also be a liquid fuel, such as ethanol or petrol, but may instead be another gaseous or liquid fluid that may contain solid particles and that may function other than as a fuel.

In one embodiment, for example, a decrease in fluid pressure within the injection control chamber may cause the outer valve member to disengage the first seating region and an increase in fluid pressure within the injection control chamber may cause the inner valve member to disengage the second seating region.

The pressure control arrangement may include a control piston having a surface that defines the injection control chamber, together with the first and second surfaces, and the control piston may be operable to control the volume of the injection control chamber. The inner valve member may be provided with a collar comprising the first surface.

In an elegant arrangement, the pressure control arrangement may include a piezoelectric actuator having a stack of piezoelectric elements, and an increase in the length of the actuator causes an increase in fluid pressure within the injection control chamber. At least part of the actuator, for example the stack, may be arranged in a first accumulator volume for receiving the first fluid at an injection pressure.

The fuel injector may include a restricted flow arrangement for equalizing pressure between the control chamber and the first accumulator volume. For example, the restricted flow arrangement may include a restricted flow passage provided in the pressure control arrangement to fluidly connect the injection control chamber to the first accumulator volume.

In one embodiment of the invention, the fuel injector further may include a coupler to couple movement of the outer valve member to the inner valve member when the outer valve member is caused to move away from the first seating region. In this way, the inner valve member may be caused to move in conjunction with the outer valve member, so that both valve members may be disengaged with their respective seating regions at the same time.

To that end, the coupler may include an abutment surface associated with the outer valve member, which is engageable with a cooperable surface associated with the inner valve member. The abutment surface associated with the outer valve member may be an upper end face of the outer valve member, and may be the second surface. The cooperable surface associated with the inner valve member may be the first surface.

The first delivery chamber may be defined by the bore of the nozzle body and the outer valve member.

The nozzle body itself may be provided with a first set of one or more outlets, and the first set of outlets may comprise one or more passages extending through the nozzle body from the first seating region to the outer surface of the nozzle body, in which case, the outer valve member may be provided with an upper seating line and a lower seating line engageable with the first seating region at respective positions either side of the first set of outlets. The upper and lower seating lines may be defined by upper and lower edges, respectively, of an annular groove provided on the outer valve needle. Cooperation between the upper seating line of the outer valve member and the first seating region may control fluid flow between the first delivery chamber and the first set of outlets, while cooperation between the lower seating line and the first seating region may control fluid flow between the second delivery chamber and the first set of outlets.

Furthermore, the nozzle body may be provided with a second set of one or more outlets, in which case, the second set of outlets may comprise one or more passages extending through the nozzle body from the second seating region to the outer surface of the nozzle body. The inner valve member may be provided with an upper seating line and a lower seating line engageable with the second seating region at respective positions either side of the second set of outlets. As for the outer valve member, the upper and lower seating lines of the inner valve member may be defined by upper and lower edges, respectively, of an annular groove provided on the inner valve member. Cooperation between the lower seating line of the inner valve member and the second seating region may control fluid flow between the second delivery chamber and the second set of outlets, while cooperation between the upper seating line of the inner valve member and the second seating region may control fluid flow between the first delivery chamber and the second set of outlets.

Instead of passages extending through the nozzle body, the second set of outlets may take a different form. For example, the second set of outlets may comprise an orifice extending axially through a tip region of the nozzle body. In such a case, the second delivery chamber may comprise a bore of the inner valve member, and the inner valve member may be provided with an upper seating line and a lower seating line engageable with the second seating region at respective positions either side of one or more passages that extend through the inner valve member to communicate with the second delivery chamber. The lower seating line may be engageable with the second seating region to control flow of the second fluid from the second delivery chamber to the orifice comprising the second set of outlets by way of the passages.

When a first set of outlets is provided, the outer valve member may be operable to control flow of the first fluid from the first delivery chamber to the first set of outlets while the inner valve member remains engaged with the second seating region. In this way, the first fluid can be delivered from the injector without causing delivery of the second fluid.

Similarly, when a second set of outlets is provided, the inner valve member may be operable to control flow of the second fluid from the second delivery chamber to the second set of outlets while the outer valve member remains engaged with the first seating region, to allow delivery of the second fluid without causing delivery of the first fluid. Optionally, the inner valve member may be coupled to the movement of the outer valve member to control flow of the second fluid from the second delivery chamber through the first and second outlets, to allow both the first and second fuels to be delivered from the injector at the same time.

The nozzle body may be provided with a single set of one or more outlets for fluid. Preferably, the single set of outlets includes one or more passages extending through the nozzle body.

When a single set of outlets is provided, the or each passage may extend from the first seating region to an outer surface of the nozzle body, so that, in a first mode of operation, the outer valve member is operable to control flow of fluid from the first delivery chamber through the or each outlet while the inner valve member remains engaged with the second seating surface and, in a second mode of operation, the inner valve member is coupled to the movement of the outer valve member to control flow of fluid from the second delivery chamber through the or each outlet.

Optionally, the injector may also include a clearance defined in part by the outer valve member and in part by the inner valve member, and the outer valve member may include a communication path for fluid flow between the first delivery chamber and the clearance. In this way, a third mode of operation may be provided wherein the inner valve member is operable to control flow of the first and second fluids between the first delivery chamber and the second delivery chamber by way of the clearance, so as to cause mixing of the first and second fluids while the outer valve member remains engaged with the first seating surface.

In these cases, the outer valve member may be provided with an upper seating line and a lower seating line engageable with the first seating region at respective positions either side of the passages of the outlet, and the inner valve member may be provided with a single seating line for engagement with the second seating region. The single seating line may be formed at the intersection of two frusto-conical surfaces.

When a single set of outlets is provided, the or each passage may instead extend from the second seating region to an outer surface of the nozzle body, in which case, in a first mode of operation, the inner valve member may be operable independently of the outer valve member to control flow of the second fluid from the second delivery chamber through the or each outlet. In a second mode of operation, the inner valve member may be coupled to the movement of the outer valve member to control flow of the first fluid from the first delivery chamber through the or each passage.

Optionally, such an injector may also include a clearance defined in part by the outer valve member and in part by the inner valve member, and the inner valve member may include includes a communication path for fluid flow between the second delivery chamber and the clearance. In a third mode of operation, therefore, the outer valve member may be operable to control flow of the first and second fluids between the first delivery chamber and the second delivery chamber by way of the clearance so as to cause mixing of the first and second fluids, while the inner valve member remains engaged with the second seating surface.

The inner valve member may be is provided with an upper seating line and a lower seating line engageable with the second seating region at respective positions either side of the outlet, and the outer valve member may be provided with a single seating line for engagement with the first seating region.

In a further example, where a single set of outlets is provided, the or each outlet may extends from a position intermediate the first and second seating regions to an outer surface of the nozzle body. In this case, in a first mode of operation, the inner valve member may be operable to control flow of the second fluid from the second delivery chamber through the or each outlet while the outer valve member remains engaged with the first seating region while, in a second mode of operation, the outer valve member may be operable to control flow of the first fluid from the first delivery chamber through the or each outlet while the inner valve member remains engaged with the second seating region. Optionally, in a third mode of operation, the inner valve member is coupled to movement of the outer valve member to control flow of the first and second fluids from the respective first and second delivery chambers through the or each outlet. The outer valve member may be provided with a single seating line for engagement with the first seating region, and likewise the inner valve member may be provided with a single seating line for engagement with the second seating region.

In one embodiment of the invention, the fuel injector comprises a biasing element to bias the inner valve member towards the second seating region. The biasing element may, for example, comprise a coiled portion of the inner valve member, or a spring.

In some embodiments, the inner valve member comprises a solid needle, and the second delivery chamber is defined in part by the needle and in part by the nozzle body. For example, the second delivery chamber may be defined by a blind bore extending upwardly from a tip of the needle and, alternatively or in addition, by a blind bore extending downwardly within the nozzle body. The nozzle body may carry a sleeve to define a second accumulator volume for receiving the second fluid between the nozzle body and the sleeve, and the nozzle body may includes a flow path for communication of the second fluid from the second accumulator volume to the second delivery chamber. The flow path may include the second delivery chamber, for example as a cross-hole of the flow path.

In other embodiments, the inner valve member may comprise a tube for delivery of the second fluid to the second delivery chamber, in which case, the second delivery chamber may be defined, in part, by a bore of the inner valve member.

In one such case, an upstream end of the inner valve member comprises an inlet to admit the second fluid to the injector. In another example, the injector may include a capnut for retaining the nozzle body on an end of the injector body, and one or more radial passages may be provided in the capnut to form an inlet to admit the second fluid to the injector. Furthermore, the nozzle body may comprise a communication path for communication of the second fluid from the inlet to the inner valve member. For example, the communication path may include passages within a collar portion of the nozzle body, and may include a filter arrangement for filtering the second fluid.

When the inlet comprises passages in the capnut or, conceivably, in the injector body or other component, the second fluid can be provided to the bore of the cylinder head, in which the injector is mounted for supply to the injector by virtue of the inlet. Accordingly, the present invention extends to a cylinder head for an internal combustion engine, comprising a bore for receiving a fuel injector according to the invention, and a supply arrangement for supplying the second fluid to the fuel injector. The supply arrangement may, for example, comprise passages in the cylinder head that communicate with the bore.

By virtue of the invention, the injection of two different fluids, for example two different fuels such as diesel and petrol or diesel and ethanol, can be achieved by way of a single fuel injector that takes up no more space than known fuel injectors.

Furthermore, in a preferred embodiment, the fuel injector comprises a single actuator, such that only one electronic drive system need be provided per injector.

Some embodiments of the invention are arranged to deliver either the first fluid or the second fluid at any given time. This would be sufficient to allow engine control techniques such as injecting a first fuel with a high resistance to auto-ignition, such as petrol or ethanol, early in the compression stroke, and then causing ignition of the charge later in the combustion stroke by injecting a small quantity of a second fuel that auto-ignites readily, such as diesel.

In some embodiments of the invention, the injector is arranged to deliver the either the first fluid alone or a combination of the first and second fluids simultaneously. In other embodiments, the injector is arranged to deliver either the second fluid alone or a combination of the first and second fluids simultaneously and, in a further embodiment, the injector is able to deliver the first fluid alone, the second fluid alone, or a combination of the first and second fluids simultaneously.

When the first and second fluids are delivered simultaneously, they may undergo mixing within the combustion chamber after injection, or they may undergo mixing within the injector before delivery to the combustion chamber in a pre-mixed state. Accordingly, the present invention extends to a method of fuel injection in an internal combustion engine having at least one fuel injector supplied with a first fluid being a fuel and a second fluid, the method comprising operating the fuel injector to cause mixing of the first fluid and the second fluid within the fuel injector and, subsequently, operating the fuel injector to cause delivery of the mixed first and second fluids into a combustion chamber of the engine.

Whenever the two fuels are injected together, the ratio of the first and second fuels in the mixture can be controlled by controlling the extent to which the outer or inner valve members are lifted from the first and second seating regions. This control permits continuous control of the properties of the charge for optimum combustion. Furthermore, the ratio of fuels can be varied for each combustion cycle if necessary, so as to allow fine control of the combustion cycle. Therefore, the present invention allows sufficient control of the charge composition to enable running in the homogeneous charge compression ignition mode over a wide range of engine conditions.

In some embodiments of the injector, the first and second fluids cannot be injected simultaneously. In such cases, the first and second fluids remain substantially separate at all times within the injector, even when injection events are occurring. This allows the first and second fluids to be at substantially different pressures, which can be advantageous in optimizing the spray pattern of the fuel injections. For example, the optimum pressure of diesel for fuel injection is many times higher than the optimum pressure of petrol or ethanol, because the viscosity of diesel is much higher.

BRIEF DESCRIPTION OF THE DRAWINGS

Embodiments of the present invention will now be described, by way of example only, with reference to the accompanying drawings, in which:

FIG. 7b is an enlarged sectional view of part of the fuel injector of FIG. 7a;

DESCRIPTION OF THE PREFERRED EMBODIMENT

Figure 1:
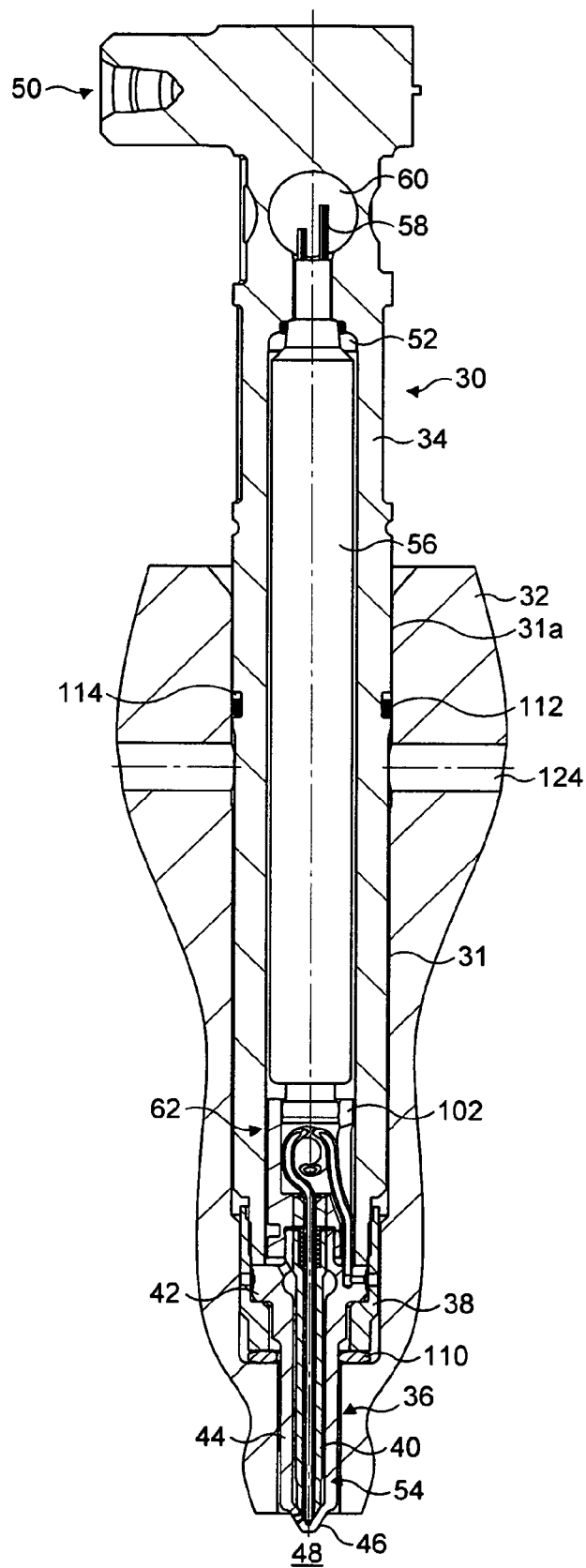
FIG. 1 is a sectional view of a fuel injector according to a first embodiment of the present invention, disposed within a cylinder head and including an outer valve member and an inner valve member.

In the following description, the terms "upper" and "lower" are used having regard to the orientation of the fuel injector as shown in the drawings. It will be appreciated, however, that the fuel injector need not be limited to a particular orientation, in use or otherwise. The terms "upstream" and "downstream" are used with respect to the direction of fuel flowing through the injector from an injector inlet to a respective outlet.

FIG. 1 shows a first embodiment of a fuel injector 30 according to the present invention, mounted in a bore 31 extending through a cylinder head 32 of an internal combustion engine. The injector 30 includes a longitudinally-extending injector body 34 and an injector nozzle 36.

The injector nozzle 36 is secured to the injector body 34 by means of a capnut 38. The capnut 38 carries internal threads (not shown in FIG. 1) to mate with external threads (not shown) provided on the lower end of the injector body 34. The injector nozzle 36 includes an elongate nozzle body 40 comprising a collar portion 42 of relatively large outside diameter, and a longitudinal portion 44 of relatively small outside diameter.

The nozzle body 40 also includes a tip region 46 that extends beyond a lower surface of the cylinder head 32 and into a combustion chamber 48 of the cylinder. The fuel injector 30 is supplied with first and second fluids, referred to hereafter as first and second fuels, from respective first and second pressurized fuel sources (not shown). The fuel sources could, for example, comprise first and second common rails that are also arranged to supply fuel to one or more other injectors.

The first fuel is supplied to the injector 30, by way of a first injector inlet 50. The first inlet 50 is located at the upper end of the injector 30 distal from the injector nozzle 36. The first fuel is communicated from the inlet 50 through an inlet passage comprising a drilling (not shown) and a cylindrical first accumulator volume 52, both of which are provided in the injector body 34, to a needle valve arrangement 54 provided in the injector nozzle 36.

The first accumulator volume 52 houses a piezoelectric actuator 56 that is operable to control the delivery of fuel from the injector 30. The piezoelectric actuator 56 comprises a stack of piezoelectric elements arranged within the accumulator volume 52, and an electrical connector 58 extending through an upper opening 60 in the injector body 34 to enable the stack to be connected to an external power supply (not shown). In use, the first accumulator volume 52 is filled with the first fuel under high pressure so as to apply a hydrostatic loading to the actuator 56.

Figure 2A:
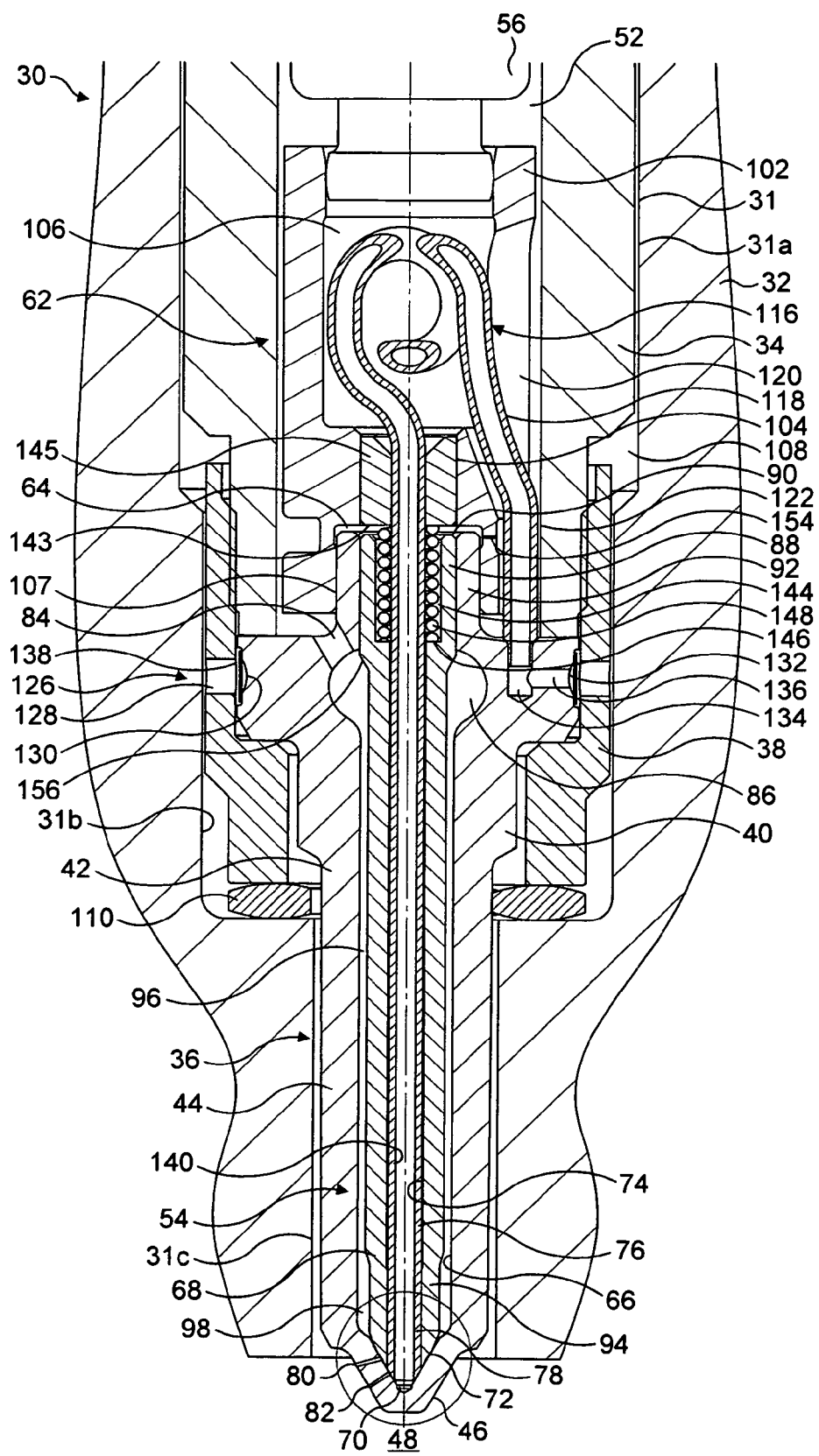
FIG. 2a is an enlarged sectional view of part of the fuel injector of FIG. 1, disposed within a cylinder head, when the outer and inner valve members are both in seated positions.

Referring additionally to FIG. 2a, the piezoelectric actuator 56 is coupled to the valve arrangement 54 by way of a load transmission means 62 arranged within a lower region of the first accumulator volume 52. Varying the voltage supplied to the piezoelectric actuator 56 causes the actuator 56 to extend or contract, thus controlling the axial position of the load transmission means 62. In turn, the position of the load transmission means 62 controls the volume of, and thus the pressure of fuel within, a valve control chamber 64. In this way, the load transmission means 62 and the piezoelectric actuator 56 together constitute a pressure control means.

The nozzle body 40 is provided with a blind axial bore 66, in which a first or outer valve member 68, in the form of a needle, is slidably received. As shown in more detail in FIG. 2b, the bore 66 terminates in a sac volume 70 and defines a seating surface 72 of frusto-conical form at its blind end.

The outer valve member 68 is itself provided with an outer valve bore or axial through-bore 74, within which an inner valve member 76 is slidably received. The inner valve member 76 comprises a pipe or tube having a needle portion 78 at its lowermost end that extends beyond the lowermost end of the outer valve member 68. Upstream of the needle portion 78, the inner valve member 76 extends beyond the uppermost end of the outer valve member 68 into the load transmission means 62.

Figure 2B:
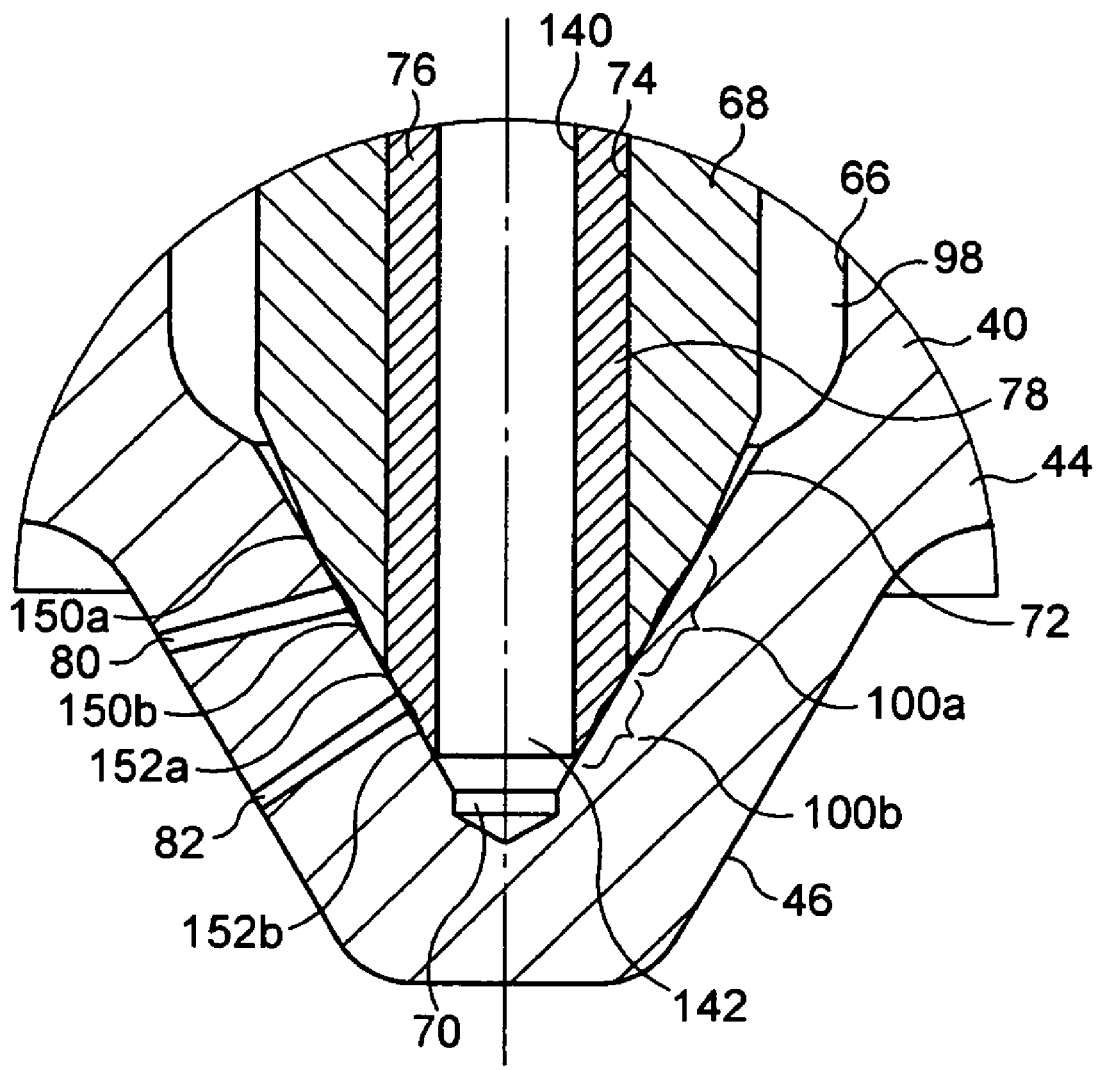
FIG. 2b is a further enlarged sectional view of part of the fuel injector of FIGS. 1 and 2a, disposed within a cylinder head, when the outer and inner valve members are both in seated positions.

Referring additionally to FIG. 2b, the nozzle body 40 includes a first set of outlets 80 and a second set of outlets 82. The outlets 80, 82 extend from the seating surface 72 through the nozzle body 40, so that the outermost ends of the outlets 80, 82 open at the outer surface of the nozzle body 40. The first and second set of outlets 80, 82 are disposed at different axial positions with respect to the longitudinal axis of the nozzle body 40. Although only a single one of the first set of outlets 80 and a single one of the second set of outlets 82 is shown, it will be appreciated that each set of outlets 80, 82 may comprise a plurality of outlets as an alternative to a single outlet, and the term "set" should accordingly by construed as meaning one or more outlets.

As shown most clearly in FIG. 2a, the first fuel is received by the nozzle body 40 from the first accumulator volume 52 through a nozzle inlet passage 84, and is supplied into an annular chamber 86 defined between the nozzle body bore 66 and an enlarged upper region 88 of the outer valve member 68. The upper region 88 of the outer valve member 68 has an outside diameter substantially equal to that of the nozzle body bore 66 such that cooperation between these parts serves to guide movement of the outer valve member 68 as it slides within the bore 66, in use. When the outer valve member 68 is seated, as is the case in FIGS. 1, 2a and 2b, the upper face 90 of the upper end region 88 of the outer valve member 68 lies substantially flush with an upwardly-extending projection 92 of the nozzle body 40.

A lower end region 94 of the outer valve member 68 is slimmer than the nozzle body bore 66 so as to define a space 96 therebetween. By virtue of the space 96, fuel can travel from the annular chamber 86 to a first delivery chamber 98. The first delivery chamber 98 is located in the vicinity of the blind end of the nozzle body bore 66 and is defined between the outer surface of the outer valve member 68 and a region of the nozzle body bore 66 upstream of the first and second sets of outlets 80, 82. The outer valve member 68 is engageable with a first valve seating region 100a defined by the seating surface 72 to control delivery of fuel through the first set of outlets 80.

The load transmission means 62 includes a piston member 102 located within the first accumulator volume 52. The piston member 102 is disposed between the piezoelectric actuator 56 and the nozzle body 40, and is generally cylindrical having an external diameter less than that of the first accumulator volume 52 to permit relative movement between the piston member 102 and the injector body 34. The first fuel is thus permitted to flow past the piston member 102 to the nozzle inlet passage 84.

The piston member 102 is provided with a longitudinal bore 104, the upper end of which opens into a chamber 106. The uppermost end of the chamber 106 receives an end of the actuator 56 such that axial movement of the actuator 56 as it extends and contracts, in use, is transmitted to the piston member 102. The lower end of the piston member bore 104 opens into a recess 107 provided in the lowermost end of the piston member 102. The recess 107 receives the upwardly-extending projection 92 of the nozzle body 40.

In this first embodiment of the injector, supply of the second fuel to the injector 30 is achieved by way of the cylinder head 32 as will now be described.

A first section 31a of the cylinder head bore 31, shown uppermost in FIG. 1, has a relatively large diameter and opens to the outer surface of the cylinder head 32. A second section 31b of the bore has a slightly smaller diameter than the first section 31b. A third, lowermost section 31c of the bore 31 has a substantially smaller diameter than the first and second sections 31a, 31b and opens into the combustion chamber 42. The second section 31b of the bore 31 is disposed between the first and third sections 31a, 31c.

In use, the fuel injector 30 is mounted within the bore 31 such that a lower portion of the injector body 34 is received within the upper section 31a of the bore 31, the capnut 38 is substantially accommodated within the second section 31b of the bore 31, and the nozzle 36 is received within the third section 31c of the bore 31 so that the tip region 46 of the nozzle protrudes into the combustion chamber 48.

As shown most clearly in FIG. 2a, the injector body 34 and the capnut 38 have smaller diameters than the respective first and second sections 31a, 31b of the bore 31, so as to define a second accumulator volume 108 between the fuel injector 30 and the wall of the bore 31 in the cylinder head 32. The second accumulator volume 108 is sealed at its lowermost end by a sealing washer 110 disposed between the lowermost face of the capnut 38 and a shoulder of the bore 31 where the second section 31b meets the third section 31c. As shown in FIG. 1, the second accumulator volume 108 is sealed at its uppermost end by a sealing ring 112 provided within an annular groove 114 in the injector body 34.

The inner valve member 76 extends into the chamber 106 of the piston member 102. In the chamber 106, the inner valve member 76 is formed into a coiled portion 116 comprising a double-turn coil. The coiled portion 116 is arranged to provide a biasing force to the needle portion 78 of the inner valve member 76 to bias tip of the inner valve member 76 toward the seating surface 72.

An upstream portion 118 of the inner valve member 76 emerges from the coiled portion 116 in a downwardly and outwardly direction, so as to extend through an aperture 120 in the wall of the piston member 102. The inner valve member 76 terminates at its upstream end in a straight section 122 that extends parallel to the longitudinal axis of the injector 30.

The second accumulator volume 108 is supplied with the second fuel under pressure by way of fuel supply passages (124 in FIG. 1) provided in the cylinder head 32. The second fuel is communicated from the second accumulator volume 98 into the injector 30 by way of a second injector inlet 126 comprising a set of radial drillings 128 provided in the capnut 38. In FIG. 2a, two such drillings 128 are shown, but it will be appreciated that any suitable number of drillings may be provided.

The nozzle body 40 is provided with an annular groove 130 adjacent to the second injector inlet 126 and within the collar portion 42, so that the innermost ends of the drillings 128 open into an annular space 132 defined in part by the annular groove 130 and in part by the inner wall of the capnut 38. The nozzle body 40 is further provided with a blind longitudinal drilling 134 that opens to the upper face of the collar portion 42 of the nozzle body 40 to receive the end of the upstream portion 118 of the inner valve member 76. A radial drilling 136 intersects both the longitudinal drilling 134 and the annular space 132, so as to provide a flow path for the second fuel from the annular space 132 to the inner valve member 76. A mesh filter 138 is provided within the annular space 132 so as to remove particulate matter from the second fuel as it flows therethrough.

The inner valve member 76 provides a passage for the second fuel through its bore 140. In this way, the second fuel is communicated from the second inlet 126 to a second delivery chamber 142 within the inner valve member 76 and adjacent to the nozzle tip 46, by way of the annular space 132, the radial drilling 136, the longitudinal drilling 134, and the bore 140 of the inner valve member 76. The inner valve member 76 is engageable with a second valve seating region 100b defined by the seating surface 72 to control delivery of fuel through the second set of outlets 82.

An annular collar 145 is mounted on the inner valve member 76 just below the coiled portion 116, so that the inner valve member 76 is accommodated within a bore of the collar 145. The collar 145 is clamped to the inner valve member 76 so that there is no relative movement between the collar 145 and the inner valve member 76. The bore of the collar is flared at its upper end, so as to accommodate the inner valve member 76 where it bends to form the coiled portion 116.

The collar 145 is slidably received within the bore 104 of the piston member 102. The lowermost face 143 of the collar 145 opposes the upper end face of the outer valve member 68 and together they define, in part, the control chamber 64.

The through bore 74 of the outer valve member 68 includes a region of increased diameter at its uppermost end, so as to form a spring chamber 144 having a shoulder 146 at its lowermost end. A biasing spring 148 is provided in the spring chamber 144 and around the inner valve member 78, between the shoulder 146 and the collar 145. The spring 148 therefore acts to bias the outer valve member 68 against the seating surface 72.

The control chamber 64 is therefore defined by surfaces associated with the spring chamber 144, the nozzle body 40 and the piston member 102, along with the underside face of the collar 145 and the uppermost end face of the outer valve member 68. By virtue of their opposed end faces being exposed to fuel pressure within the control chamber 64, fuel pressure within the control chamber 64 acts on the outer valve member 68 and the collar 145, and hence on the inner valve member 76, in opposite axial directions.

Referring again to FIG. 2b in particular, the first and second fuels are conveyed to the vicinity of the nozzle tip 46 as described above, such that the first fuel is present in the first delivery chamber 98 between the outer valve member 68 and the wall of the longitudinal bore 66 in the nozzle body, and the second fuel is present in the second delivery chamber 142 in the bore 140 of the inner valve member 76 and the nozzle sac 70.

Both the outer and inner valve members 68, 76 are provided with first and second seats that engage, respectively, the first and second seating regions 100a, 100b of the seating surface 72 at seating lines axially above and below the first and second sets of outlets 80, 82. The outer valve member 68 is shaped to define a grooved or recessed region that, in turn, defines an upper seating line 150a at the upper end of the grooved region and a lower seating line 150b at the lower end of the grooved region. The upper and lower seating 150a, 150b lines engage the first seating region 100a above and below the first set of outlets 80 when the outer valve member 68 is seated. Cooperation between the upper seating line 150a and the first seating region 100a controls fuel flow between the first delivery chamber 98 and the first set of outlets 80, while cooperation between the lower seating line 150b and the first seating region 100a controls fuel flow between the second delivery chamber 140 and the first set of outlets 80, particularly in circumstances when the inner valve member 76 is lifted from its seated position.

Similarly, the lower region of the inner valve member 76 is provided with a grooved or recessed region that, in turn, defines an upper seating line 152a at the upper end of the grooved region and a lower seating line 152b at the lower end of the grooved region. The upper and lower seating lines 152a, 152b engage the second seating region 100b above and below the second set of outlets 82 when the inner valve member 76 is seated. Cooperation between the upper seating line 152a and the second seating region 100a controls fuel flow between the first delivery chamber 98 and the second set of outlets 82, particularly when the outer valve member 68 is lifted from the seating surface 72, while cooperation between the lower seating line 152b and the second seating region 100b controls fuel flow between the second delivery chamber 142 and the second set of outlets 82.

By lifting the outer and inner valve members 68, 76 from the seating surface 72, together or independently, the delivery of the first and second fuels through the first and second sets of outlets 80, 82 can be controlled. In this first embodiment of the invention, the outer and inner valve members 68, 76 can be lifted independently to provide selectable injection of each of the first and second fuels, as will now be described.

The control chamber 64 communicates with the accumulator volume 52 by way of a restricted orifice 154. Therefore, when the injector 30 is in use and at the energization level as is shown in FIGS. 1, 2a and 2b, the pressure of fuel within the control chamber 64 is substantially equal to the pressure of fuel within the first accumulator volume 52. For the purposes of this description, the energization level of the actuator 56 at this point will be referred to as an "intermediate energization level" and the pressure of fuel within the control chamber 64 will be referred to as an "intermediate fuel pressure". Likewise, the position of the lowermost end of the actuator 56 relative to the injector body 32 at this energization level will be referred to as an "intermediate position".

When the actuator 56 is at the intermediate energization level, fuel pressure within the control chamber 64 acting on the upper face 90 of the enlarged end region 88 of the outer valve member 68 provides a force urging the outer valve member 68 into engagement with the first seating region 100a that, together with the biasing force of the spring 148, is greater than the opposing force acting on the outer valve member 68 by virtue of thrust surfaces 156 provided on its external surface.

By way of the aperture 120, the chamber 106 of the piston member 102 is filled with the first fuel at substantially the same pressure as the fuel in the first accumulator volume 52. The fuel in the chamber 106 acts upon the uppermost face of the collar 145, providing a downward component of force to the inner valve member 78. Fuel pressure in the control chamber 64 acting on the exposed lower face 143 of the collar 145 provides an upward component of force that urges the inner valve member 78 to disengage the second seating region 100b. This downward component of force is substantially equal to the opposing upward component of force due to fuel pressure in the chamber 106 acting on the upper face of the collar 145. Thus, the additional downward biasing force on the inner valve member 78 provided by the coiled region 116 causes the inner valve member 78 to remain seated.

As a result, when the pressure of fuel within the control chamber 64 is substantially equal to the pressure of fuel within the accumulator volume 52, fuel delivery does not take place through either of the first or the second sets of outlets 80, 82 and the fuel injector 30 can be described as being in a non-injecting state.

Figure 3A:
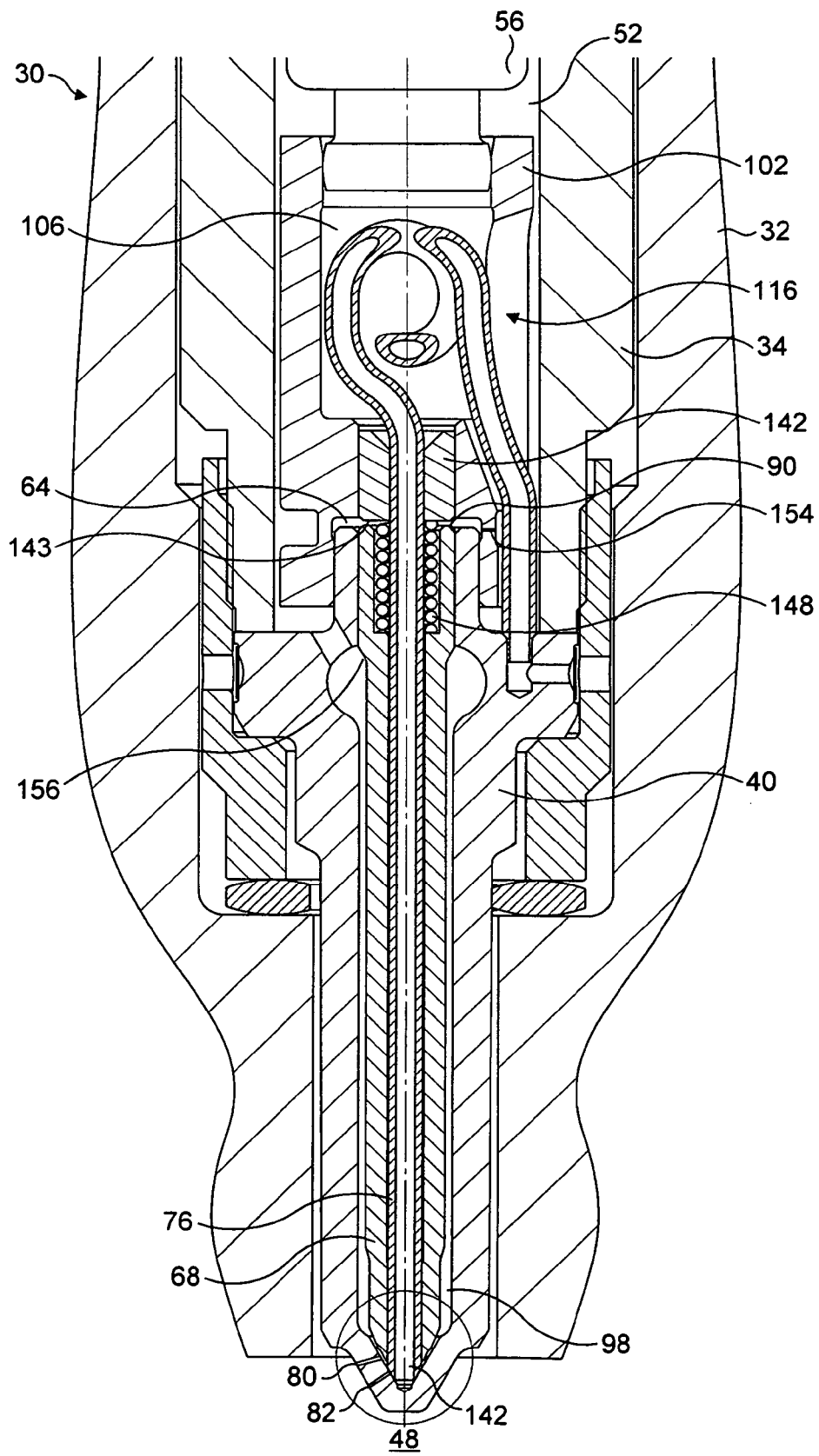
FIG. 3a is an enlarged sectional view of part of the fuel injector of FIGS. 1, 2a and 2b, disposed within a cylinder head, when the outer valve member is in an unseated position and the inner valve member is in a seated position.

In order to cause injection of the first fuel through the first set of outlets 80, the energization level of the actuator 56 is changed from the intermediate level shown in FIG. 2a so as to cause contraction of the actuator 56 as shown in FIG. 3a. In this state, the actuator 56 is said to be in a de-energized or retracted state, and the position of the lower end of the actuator 56 is said to be in a retracted position. Contraction of the actuator 56 causes the piston member 102 to move upwards within the first accumulator volume 52, which in turn increases the volume of the control chamber 64. Because the flow of fuel into the control chamber 64 is restricted by the restricted orifice 154, the pressure of fuel within the control chamber 64 is consequently reduced to a low level relative to the intermediate level.

Figure 3B:
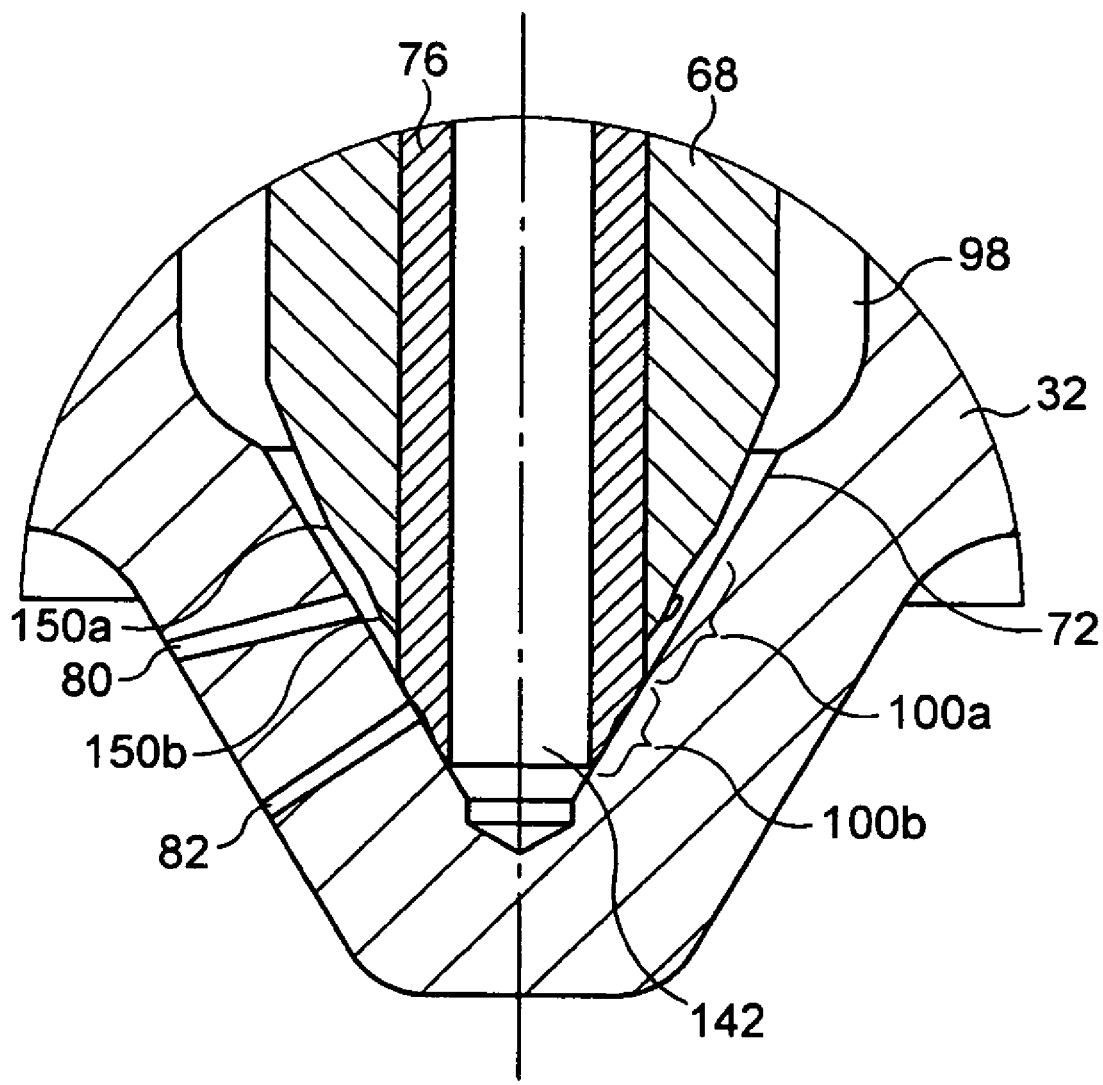
FIG. 3b is a further enlarged sectional view of part of the fuel injector of FIGS. 1 to 3a, disposed within a cylinder head, when the outer valve member is in an unseated position and the inner valve member is in a seated position.

As a result, the downward force which results from the pressure of fuel within the control chamber 64 acting on the outer valve member 68 is reduced. Thus the total downward force acting to urge the outer valve member 68 into engagement with the first seating region 100a reduces to an amount less than the upward force due to fuel pressure acting on the thrust surfaces 156, creating a net upward force on the outer valve member 68. The outer valve member 68 thus disengages its seating region 100a, allowing the first fuel to flow from the first delivery chamber 98, through the first set of outlets 80, and into the combustion chamber 48. FIG. 3b is a more detailed view of the tip of the injector 30, in which the flow path for the first fuel can be readily appreciated.

The decrease in fuel pressure in the control chamber 64 in turn increases the net downward force acting upon the inner valve member 76, and so the inner valve member 76 remains biased against the second seating surface 100b while the outer valve member 68 is lifted. Consequently, there is no injection of the second fuel through either the first or second set of outlets 80, 82, and there is no appreciable mixing of the first and second fuels during delivery of the first fuel.

Delivery of the first fuel can be terminated by returning the actuator 56 to the intermediate energization level. By doing so, the volume of the control chamber 64 is restored to its original value, and the pressure of fuel within the control chamber 64 increases so that the downward force acting on the upper surface 90 of the outer valve member 68 due to the fuel pressure in the control chamber 64 and the biasing spring 148 once again exceeds the upward force acting on the outer valve member 68 due to fuel pressure on the thrust surfaces 156. Consequently, a net downward force acts to urge the outer valve member 68 back into engagement with the first seating surface 100a, thereby terminating delivery of the first fuel.

Because the first fuel tends to flow into the control chamber 64 through the restricted orifice 154 while the actuator 56 is contracted, the pressure in the control chamber 64 typically increases to a value greater than the pressure in the first accumulator volume 52 when the actuator 56 is returned to the intermediate energization level. This aids the rapid engagement of the outer valve member 68 with the seating surface 100a. Subsequently, the pressure in the control chamber 64 returns to the intermediate pressure by virtue of fuel flow through the restricted orifice 154.

Figure 4A:
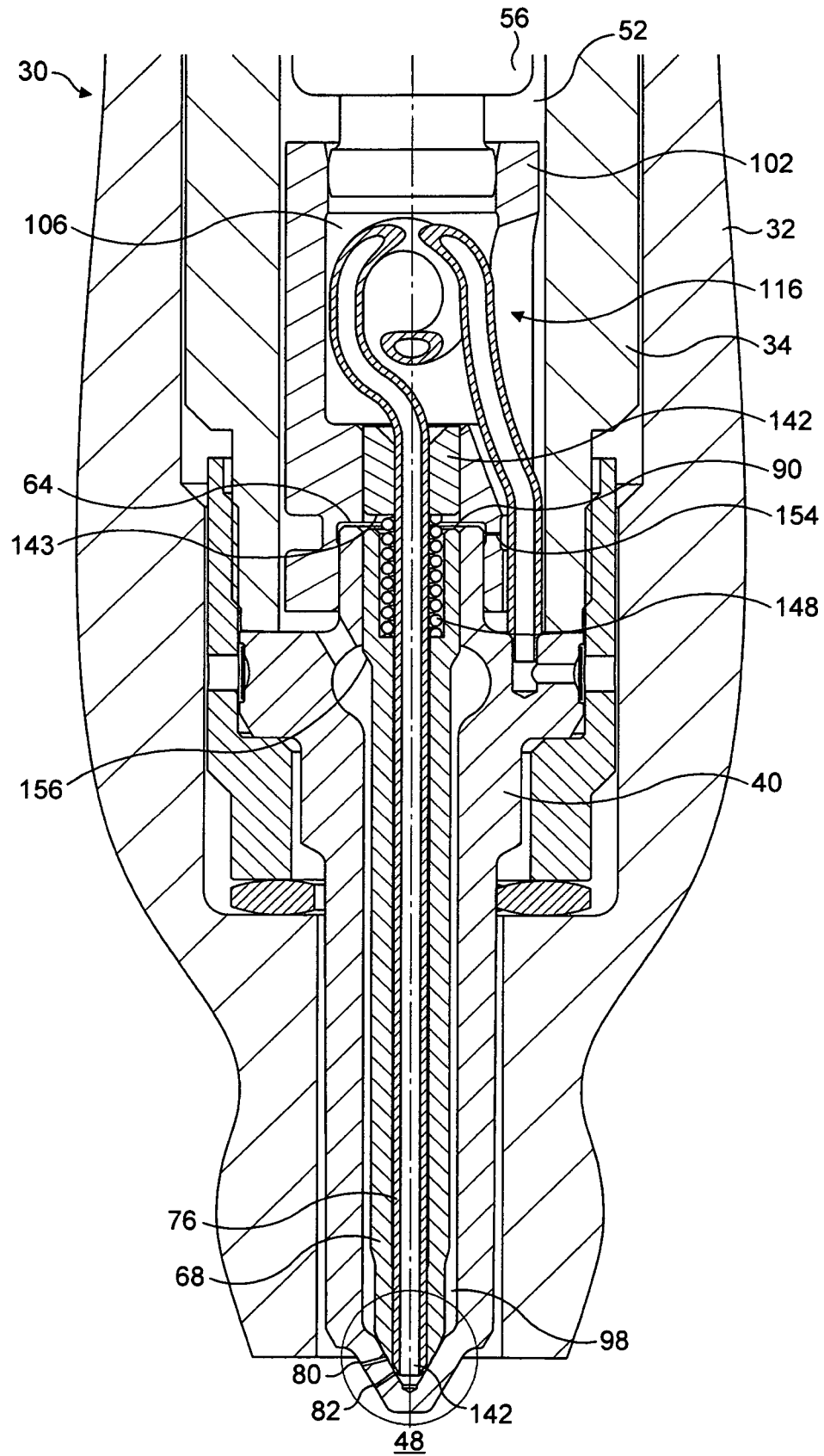
FIG. 4a is an enlarged sectional view of part of the fuel injector of FIGS. 1 to 3b, disposed within a cylinder head, when the outer valve member is in a seated position and the inner valve member is in an unseated position.

In order to cause delivery of the second fuel through the second set of outlets 82, the energization level of the actuator 56 is changed from the intermediate level shown in FIG. 2a so as to cause extension of the actuator 56, as shown in FIG. 4a. In this state, the actuator 56 is said to be in an energized or extended state, and the position of the lowermost end of the actuator 56 can be described as an extended position. Extension of the actuator 56 causes the piston member 102 to move downwards within the first accumulator volume 52, which in turn decreases the volume of the control chamber 64. Because the flow of fuel out of the control chamber 64 is restricted by the restricted orifice 154, the pressure of fuel within the control chamber 64 is consequently increased to a high level relative to the intermediate pressure.

Figure 4B:
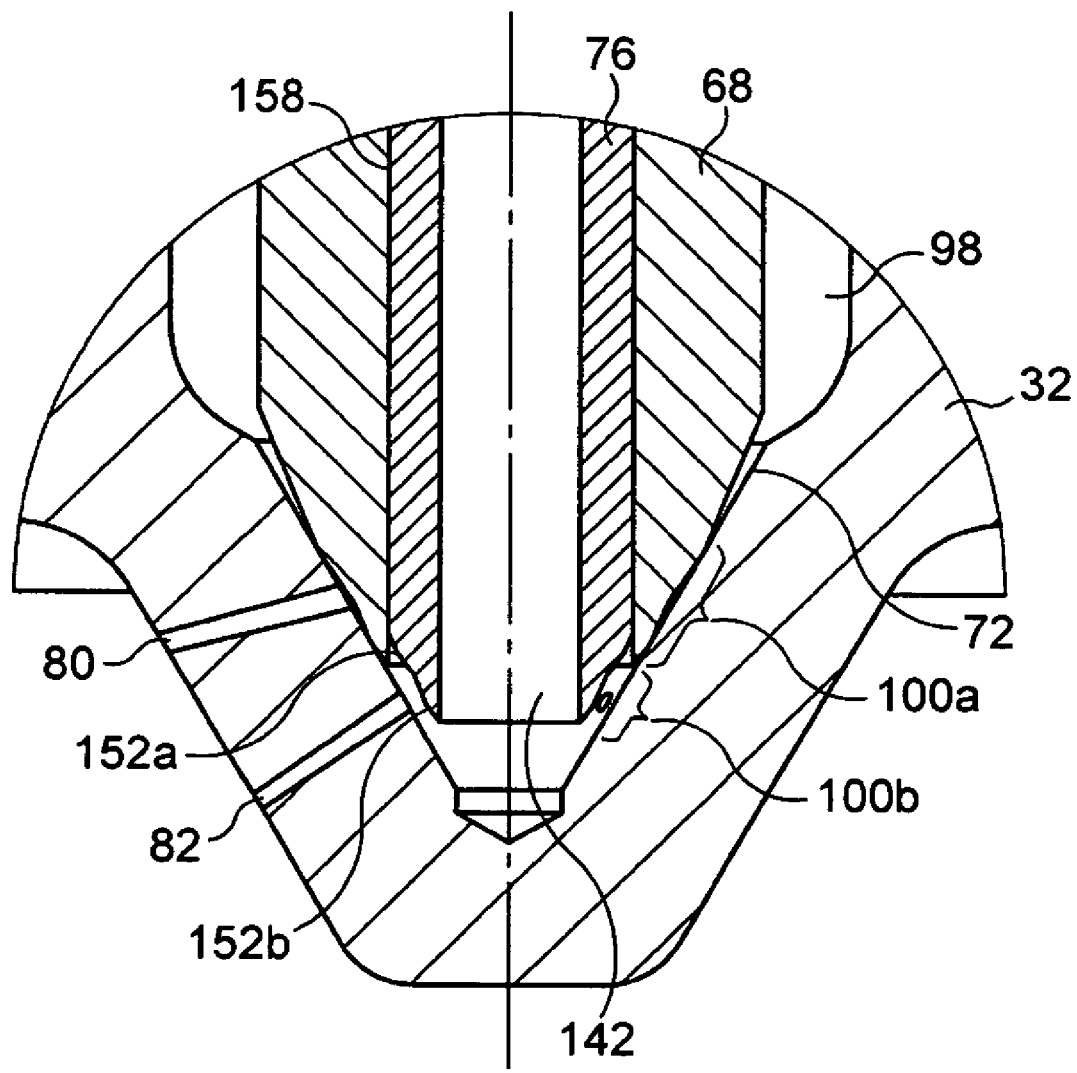
FIG. 4b is a further enlarged sectional view of part of the fuel injector of FIGS. 1 to 4a, disposed within a cylinder head, when the outer valve member is in a seated position and the inner valve member is in an unseated position.

As a result, the upward force, which results from the pressure of fuel within the control chamber 64 acting upon the lower face 143 of the collar 145 on the inner valve member 76, becomes greater than the sum of the downward forces acting on the collar 145 due to the fuel within the cavity 106 and the biasing force provided by the coiled region 116, thus creating a net upward force on the inner valve member 76. The inner valve member 76 thus disengages the second seating region 100b, allowing the second fuel to flow from the second delivery chamber 142, through the second set of outlets 82, and into the combustion chamber 48 as shown most clearly in FIG. 4b.

The increase in fuel pressure in the control chamber 64 increases the net downward force acting upon the outer valve member 68, and so the outer valve member 68 remains biased against the first seating region 100a while the inner valve member 76 is lifted. Once again, there is no injection of the first fuel through either the first or second set of outlets 80, 82. Furthermore, because the clearance 158 between the inner and outer valve members 68, 76 is small, there is no appreciable mixing of the first and second fuels during delivery of the second fuel.

Delivery of the second fuel can be terminated by returning the actuator 56 to the intermediate energization level so that the volume of the control chamber 64 increases to its original value and, in turn, the pressure of fuel within the control chamber 64 decreases back to or below the intermediate pressure. The upward force acting on the inner valve member 76 due to the fuel pressure in the control chamber 64, by way of the collar 145, becomes less than sum of the downward forces acting on the inner valve member 76 due to the fuel pressure in the cavity 106 and the resilience of the coiled region 116. Consequently, a net downwards force acts to urge the inner valve member 76 back into engagement with the second seating surface 100b, thereby terminating delivery of the second fuel.

Because the first fuel tends to flow out of the control chamber 64 through the restricted orifice 154 while the actuator 56 is extended, the pressure in the control chamber 64 typically decreases to a value less than the pressure in the first accumulator volume 52 when the actuator is returned to the intermediate energization level. This aids the rapid engagement of the inner valve member 76 with the seating surface 72. Subsequently, the pressure in the control chamber 64 returns to the intermediate pressure by virtue of fuel flow through the restricted orifice 154.

The injector of FIGS. 1 to 4b allows the first fuel or the second fuel to be selectively injected by causing the actuator 56 to retract or extend. Because the first and second fuels are kept separate until the point of injection, mixing of the first and second fuels in an uncontrolled way can be prevented. Furthermore, the supply pressure of the two fuels may be substantially different because the supply path of the first fuel is never directly connected to the supply path of the second fuel within the injector 30.

It will be appreciated that the restricted orifice 154 provides a safety function in the event of injector failure. Irrespective of the state of the injector at the time of failure, the restricted orifice 154 allows the pressure of fuel within the control chamber 64 to equalize with the pressure of fuel in the first accumulator volume 52, thus ensuring that the injector 30 returns to a non-injecting state.

A number of alternative embodiments according to the invention will now be described. In each case, the embodiments are similar to the injector of FIGS. 1 to 4b so, for brevity, only those features that differ from the features of the injector of FIGS. 1 to 4b will be described in detail.

Figure 5A:
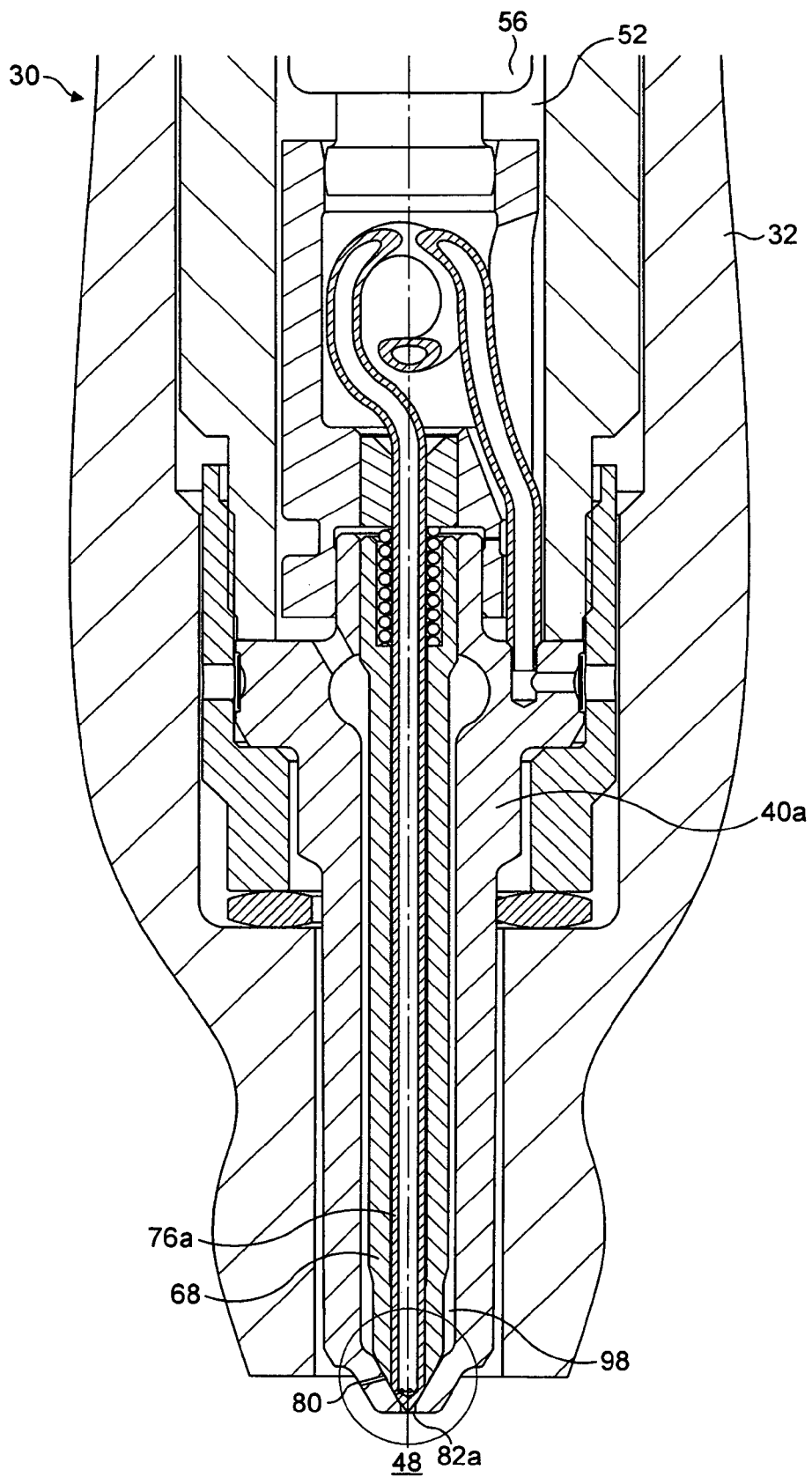
FIG. 5a is an enlarged sectional view of part of a fuel injector according to a second embodiment of the present invention, disposed within a cylinder head and including an outer valve member and an inner valve member, when the outer and inner valve members are both in seated positions.
Figure 5B:
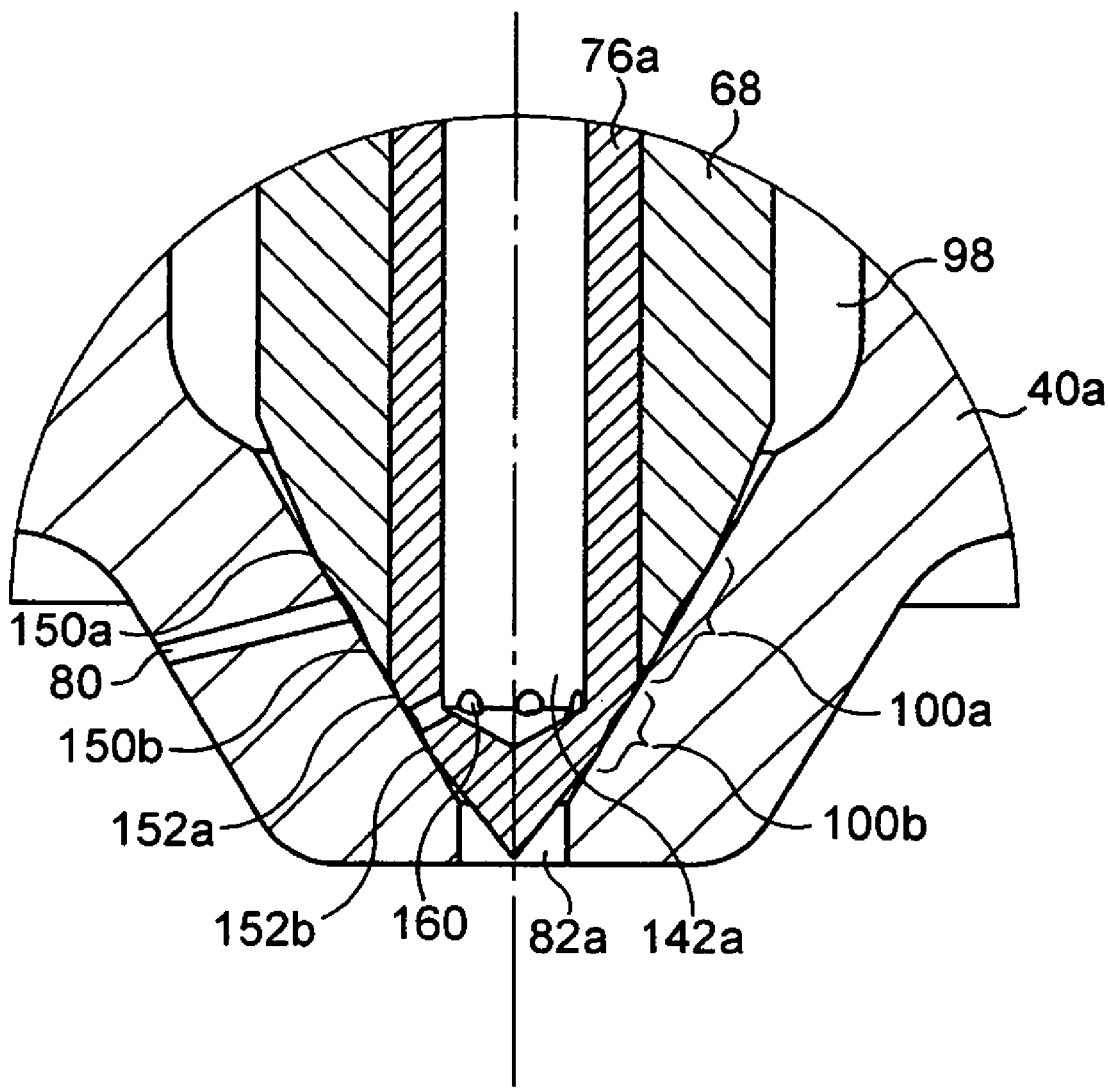
FIG. 5b is a further enlarged sectional view of part of the fuel injector of FIG. 5a, disposed within a cylinder head, when the outer and inner valve members are both in seated positions.

FIGS. 5a and 5b show part of a fuel injector 30a according to a second embodiment of the invention wherein the second set of outlets in the nozzle body 40a comprises a single downwards-pointing orifice or outlet at the tip of the nozzle, known hereafter as the second outlet 82a. The second outlet is aligned axially with the nozzle body 40a. The inner valve member 76a is provided with passages 160 extending from the outer surface to the inner surface of the inner valve member 76a and arranged between the upper and lower seating lines 152a, 152b of the inner valve member 76a.

In the intermediate energization state, the inner valve member 76a is seated on the second seating region 100b as shown most clearly in FIG. 5b. Cooperation of the upper seating line 152a of the inner valve member 76a with the second seating region 100b prevents the second fuel from flowing from the second delivery chamber 142a within the bore of the inner valve member 76a toward the first set of outlets 80, particularly when the outer valve member 68 is lifted from its seated position. Similarly, cooperation of the lower seating line 152b of the inner valve member 76a and the second seating region 100b prevents the second fluid from flowing from the second delivery chamber 142a to the second outlet 82a.

Figure 6A:
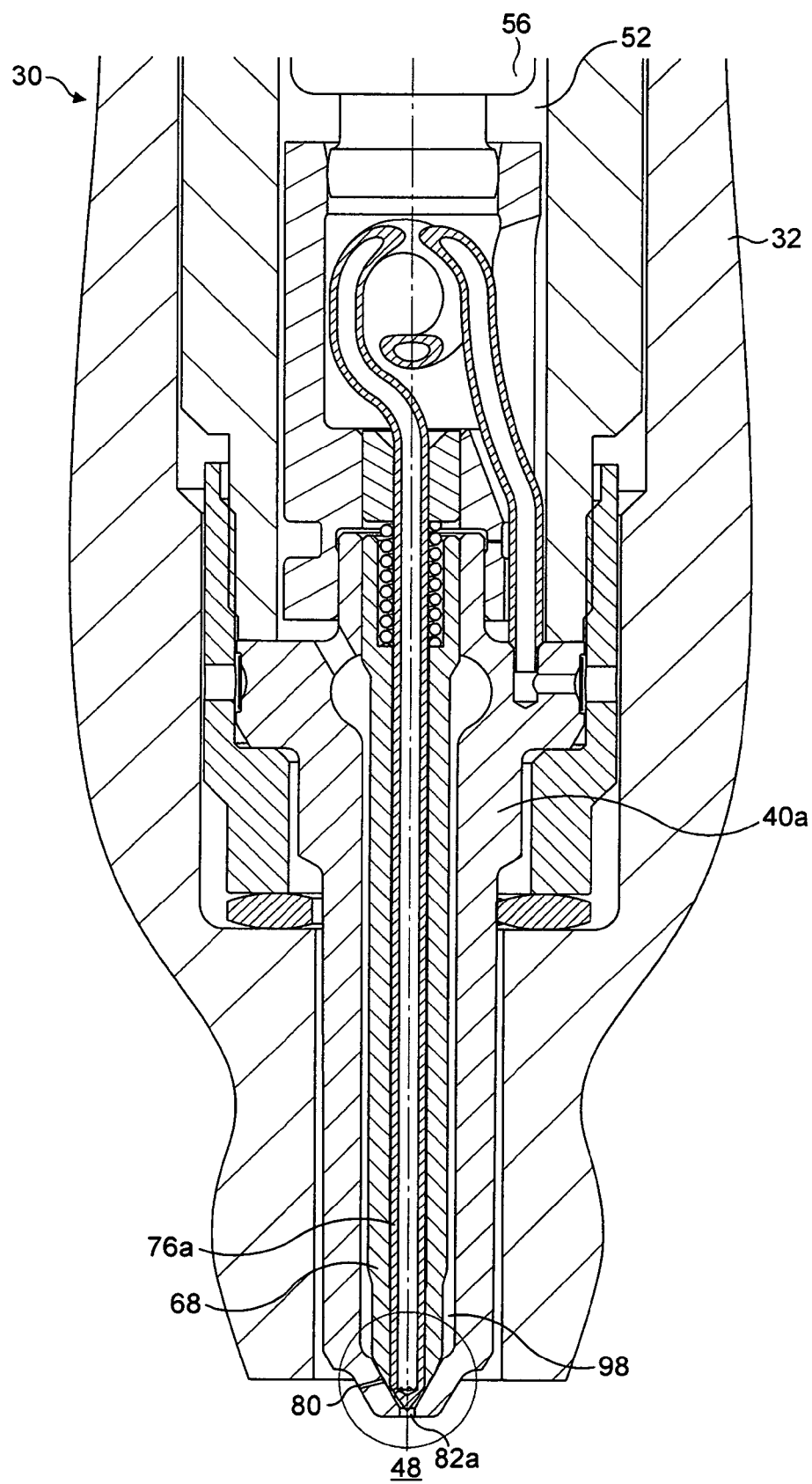
FIG. 6a is an enlarged sectional view of part of the fuel injector of FIGS. 5a and 5b, disposed within a cylinder head, when the outer valve member is in a seated position and the inner valve member is in an unseated position.
Figure 6B:
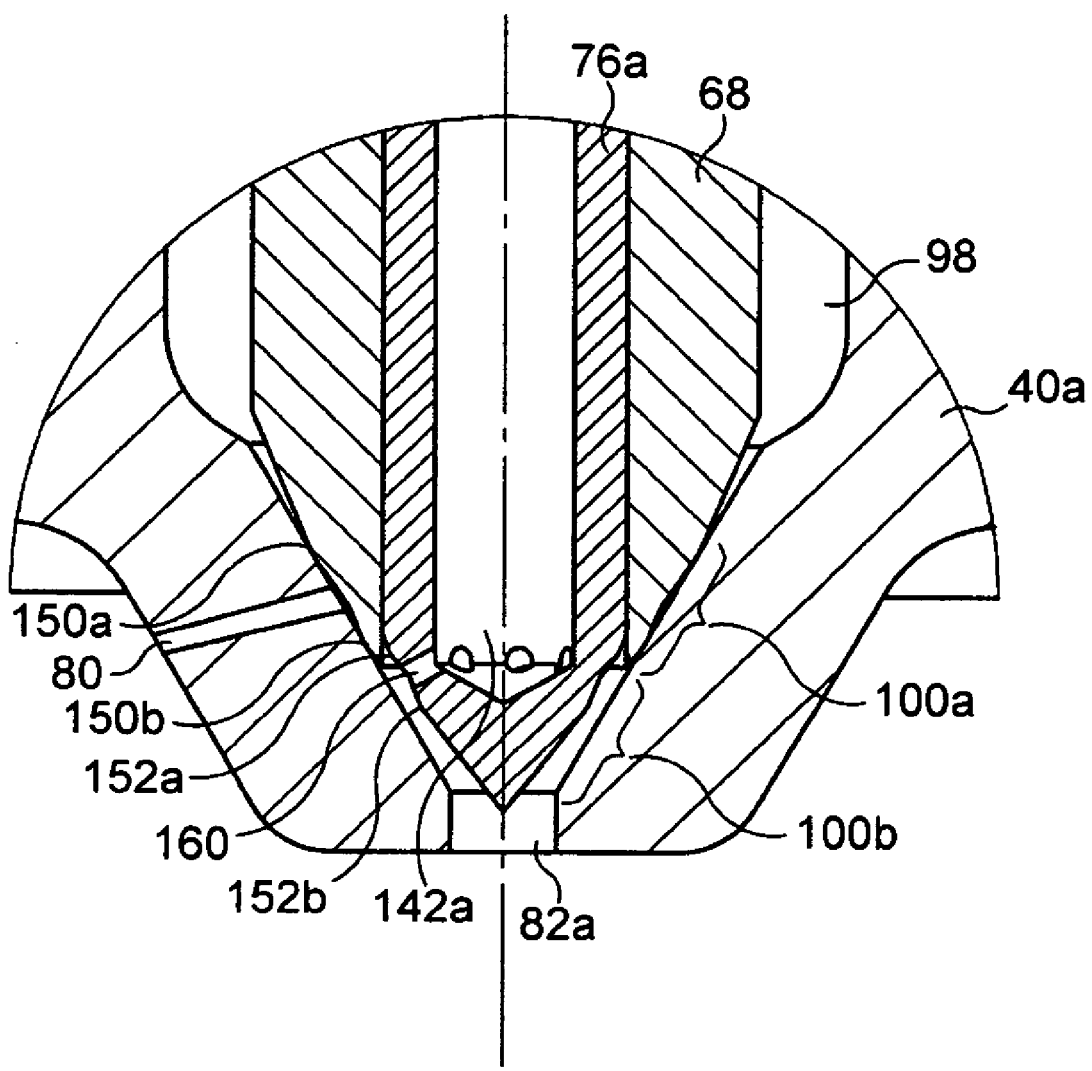
FIG. 6b is a further enlarged sectional view of part of the fuel injector of FIGS. 5a to 6a, disposed within a cylinder head, when the outer valve member is in a seated position and the inner valve member is in an unseated position.

As shown in FIGS. 6a and 6b, the inner valve member 76a can be lifted from its seated position by extending the actuator 56 as previously described. The second fuel may then pass from the second delivery chamber 142a, through the passages 160 in the inner valve member 76a, and through the second outlet 82a, thus effecting delivery of the second fuel to the combustion chamber 48 in a downward and conical spray pattern.

In the above embodiments, the second fuel is supplied to the injector by way of passages in the cylinder head. Consequently, the wetted components of the cylinder head must be tolerant to the second fluid, for example with regard to corrosion resistance. To achieve such tolerance, modifications of the cylinder head may be necessary. For example, when the second fuel is ethanol, a bare aluminium cylinder head would be vulnerable to corrosion. To overcome this, the cylinder head could be anodized to provide a thicker protective oxide film than would usually be present. The injector components, which are wetted by the second fuel, could be made from stainless steel.

Figure 7A:
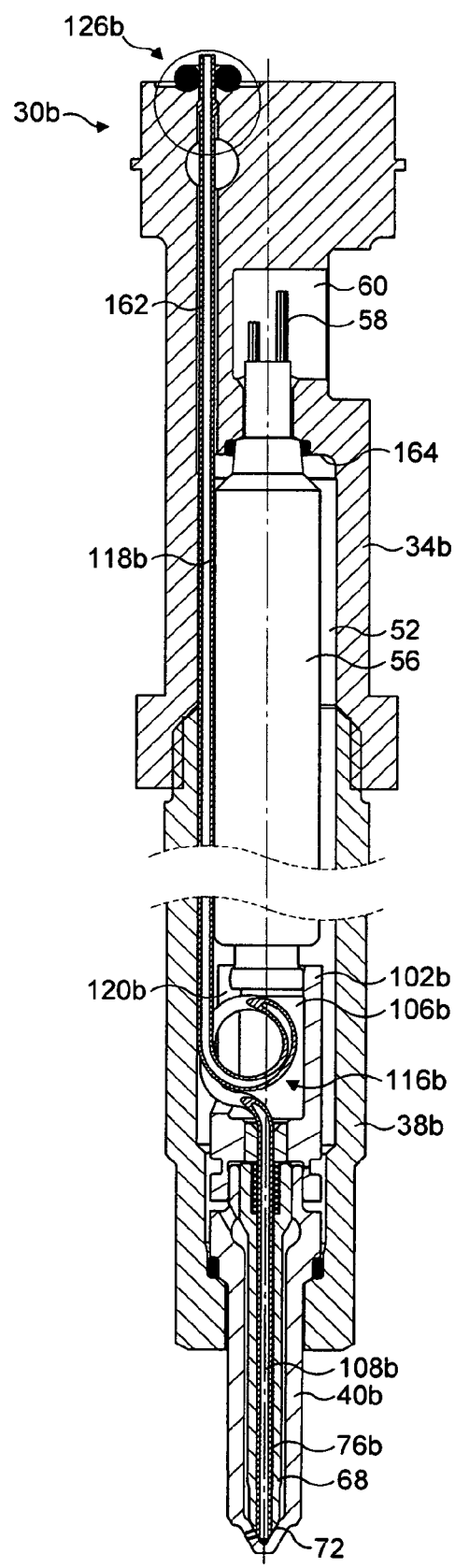
FIG. 7a is a sectional view, broken longitudinally, of a fuel injector according to a third embodiment of the present invention, including an outer valve member and an inner valve member.
Figure 7B:
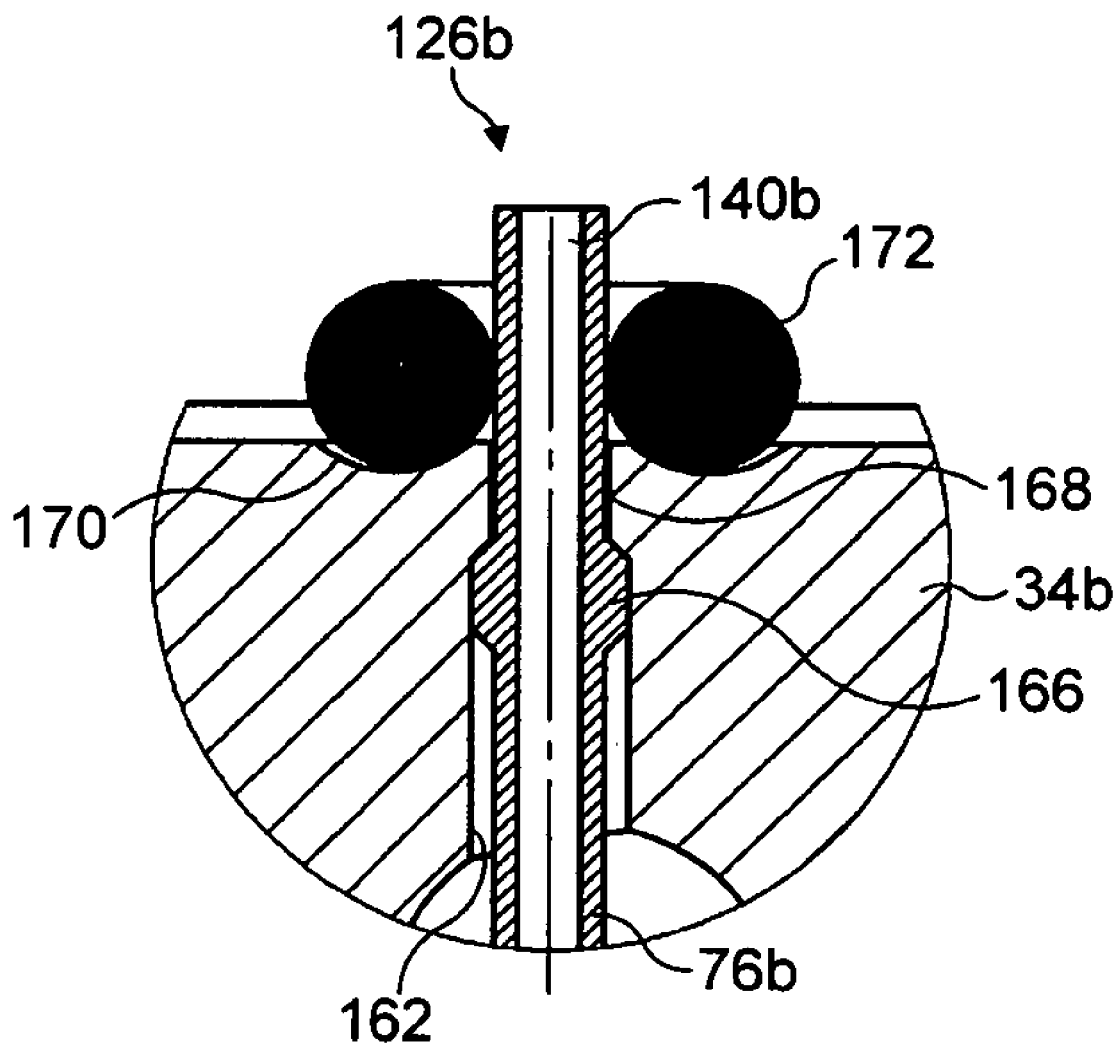

FIGS. 7a and 7b show a fuel injector 30b according to a third embodiment of the present invention that provides an alternative communication path for the second fuel. In this embodiment, no passages for the second fuel are provided in the capnut 38b or the nozzle body 34b of the injector 30b and the second fuel need not be routed through the cylinder head (not shown in FIGS. 7a and 7b). Instead, the coiled portion 116b of the inner valve member 76b comprises a single loop, and the upstream portion 118b of the inner valve member 76b emerges from the coiled portion 116b in an upwardly direction. The coiled portion 116b is accommodated partly within the cavity 106b of the piston member 102b, and partly within an aperture 120b in the wall of the piston member 102b, so that the upstream portion 118b of the inner valve member 76b emerges upwardly from the coiled portion 116b alongside the piston member 102b and in a direction parallel to the longitudinal direction of the injector 30b.

In this embodiment, the upstream portion 118b of the inner valve member 76b extends upwards from the coiled portion 116b through the first accumulator volume 52, alongside the actuator 56. The injector body 34b is provided with a longitudinal bore 162 that extends from the upper end face 164 of the first accumulator volume 52 to the uppermost end face of the injector body 34b, and that receives part of the upstream portion 118b of the inner valve member 76b therethrough. As shown most clearly in FIG. 7b, the wall of the upstream portion 118b of the inner valve member 76b is thickened close to its uppermost end to form a collar 166.

To create a high-pressure seal between the inner valve member 76b and the injector body 34b, the injector body 34b is shaped to conform to the shape of the inner valve member 76b above the collar 166. For example, the injector body 34b may be swaged after insertion of the inner valve member 76b in the bore 162 during manufacture of the injector 30b, so as to create a portion of restricted diameter 168 at the uppermost end of the bore and a part-toroidal dimple 170 in the end face of the injector body 34b around the exit of the inner valve member 76b. By virtue of the resilience of the coiled portion 116b, the inner valve member 76b is biased against the seating surface 72 of the nozzle body 40b at its downstream end, and against the injector body 34b at its upstream end.

The second fuel is provided to the injector 30b by way of a fuel supply line (not shown) that connects to a second injector inlet 126b comprising the upstream end of the inner valve member 76b emergent from the uppermost end face of the injector body 34b. The fuel supply line may be held in place by compression of an elastomeric seal 172. In this case, the bore 140b of the inner valve member 76b forms a second accumulator volume for the second fuel.

In comparison to the first and second embodiments of the invention, the capnut 38b of the injector of the third embodiment of the invention extends further towards the uppermost end of the injector 30b to permit convenient assembly of the injector components during manufacture. The upper end of the capnut 38b is externally threaded to mate with internal threads carried on the lower end of the injector body 34b.

The operation of the injector 30b of FIGS. 7a and 7b is identical to that of the first embodiment of the invention, described with reference to FIGS. 1 to 4b.

Figure 8A:
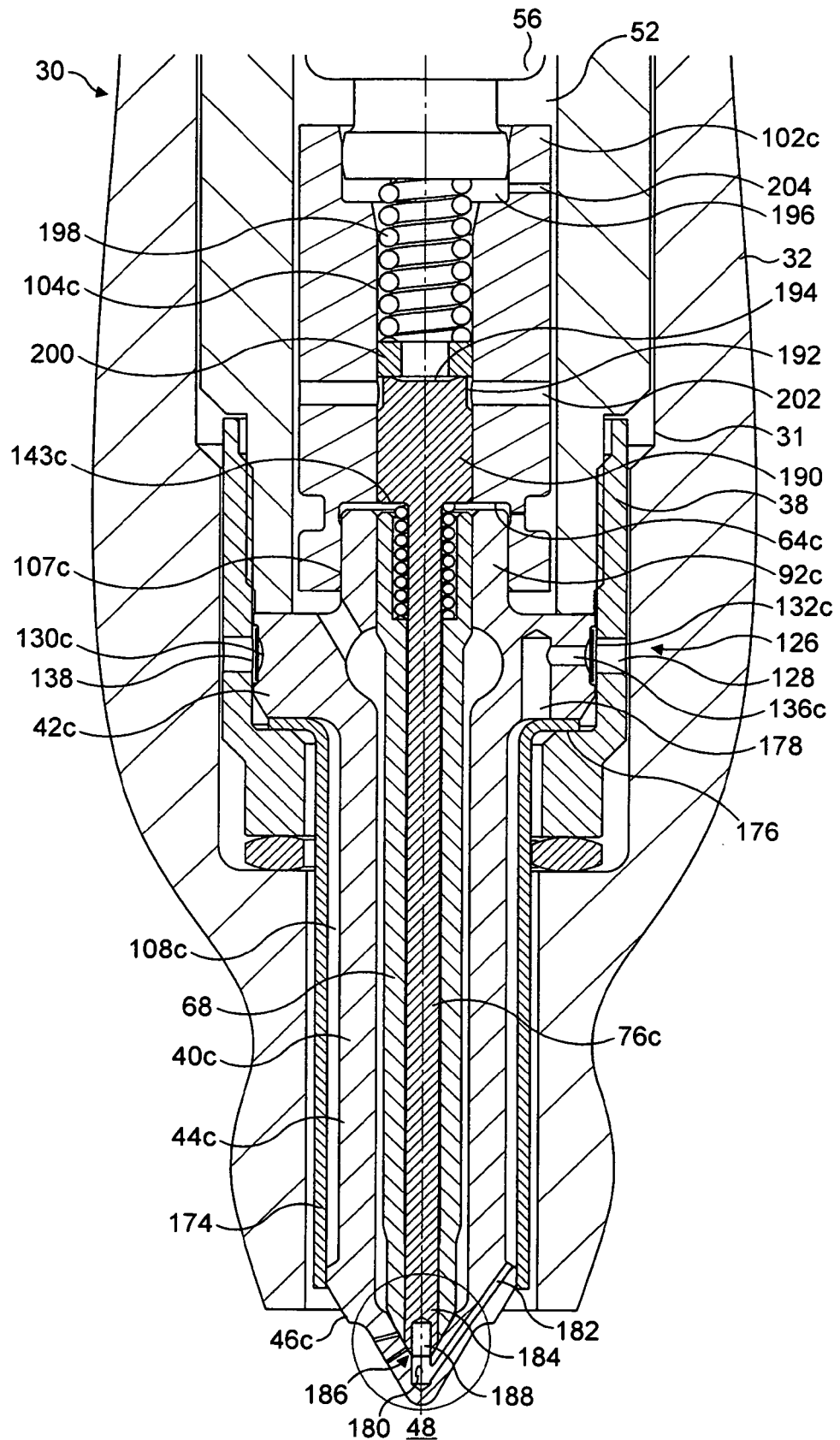
FIG. 8a is an enlarged sectional view of part of a fuel injector according to a fourth embodiment of the present invention, disposed within a cylinder head and including an outer valve member and an inner valve member, when the outer and inner valve members are both in seated positions.
Figure 8B:
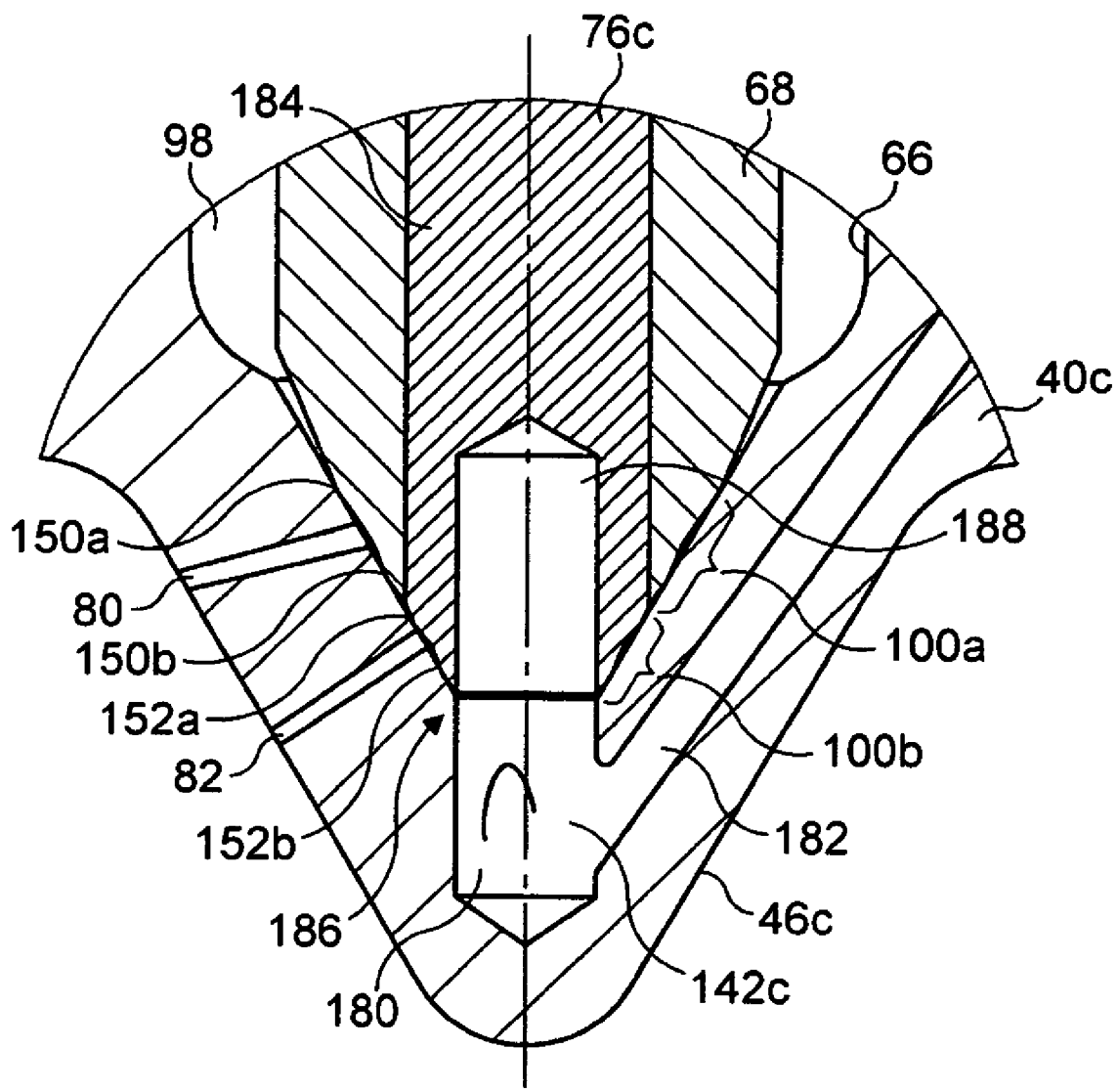
FIG. 8b is a further enlarged sectional view of part of the fuel injector of FIG. 8a, when the outer and inner valve members are both in seated positions.

Referring to FIGS. 8a and 8b, in a fourth embodiment of the invention a fuel injector 30c is provided wherein the second fuel is not supplied to the nozzle tip by way of the inner valve member. Instead, an alternative supply path for the second fuel is provided.

In this embodiment, the nozzle body 40c comprises a collar portion 42c of relatively large diameter, a longitudinal portion 44c of relatively small diameter, and a tip portion 46c that has a maximum diameter slightly larger than the diameter of the longitudinal portion 44c, and that tapers to a rounded point.

The nozzle body 40c is provided with a cylindrical sleeve 174 having an internal diameter equal to the maximum diameter of the tip region 46c of the nozzle body 40c. The lower end of the sleeve 174 extends over and forms a seal against the tip region 46c, while an upper end of the sleeve 174 is flared outwards into a flange 176 to form a seal against the lower face of the collar portion 42c. The seals between the sleeve 174 and the nozzle body 40c may be formed by, for example, welding or brazing. In this way, a second accumulator volume 108c is defined between the nozzle body 40c and the sleeve 174.

As in the first and second embodiments of the invention, the second fuel is supplied, via passages (not shown) in the cylinder head 32, to a volume between the bore 31 of the cylinder head 32 and the injector 30c. As previously described, a second injector inlet 126 comprising a set of drillings 128 in the capnut 38 is provided to admit the second fuel into the injector 30c. The drillings 128 open into an annular space 132c defined by the inner wall of the capnut 38 and an annular groove 130c provided in the nozzle body 40c and containing a mesh filter 138.

The nozzle body 40c includes a blind longitudinal drilling 178 that extends upwards from the lower face or shoulder of the collar portion 42c, and a radial drilling 136c that extends from the annular space 132c to intersect with the longitudinal drilling 178. The longitudinal drilling 178 communicates with the second accumulator volume 108c. The second fuel can therefore flow from the second injector inlet 126, through the mesh filter 138, and into the second accumulator volume 108c by way of the radial and longitudinal drillings 136c, 178 in the collar portion 42c of the nozzle body 40c.

The tip portion 46c of the nozzle body 40c is provided with a blind drilling 180 that extends downwardly from the bore 66c of the nozzle body 40c towards its tip to define, in part, a second delivery chamber 142c for the second fuel. The second fuel is admitted to the second delivery chamber 142c by way of an inclined supply passage 182 that extends from the second accumulator volume 108c to the blind drilling 180.

In contrast to the previously-described embodiments, in this embodiment of the invention the inner valve member 76c comprises a solid needle portion 184 having a frusto-conical tip 186. The tip 186 is provided with upper and lower seating lines 152a, 152b, as in the first and second embodiments, to cooperate with the second seating surface 100b of the nozzle body 40c either side of the second set of outlets 82. The tip 186 is truncated by an upwardly-extending blind axial bore 188. Thus, when the inner valve member 74c is seated against the second seating surface 100c, the second delivery chamber 142c is defined by the bore in the inner valve member 188 and the bore 180 in the tip portion 46c of the nozzle body 40c.

The uppermost end of the inner valve member 76c is formed into a generally cylindrical head portion 190 having a diameter greater than the needle portion 184. An underside face 143c of the head portion 190 defines, in part, the control chamber 64c, in place of the collar of previously described embodiments of the invention. The head portion 190 is provided with an annular recess 192 at its uppermost end, and a depression or dimple 194 in its upper end face.

A longitudinal bore 104c of the piston member 102c extends from an upper recess 196 that receives an end of the piezoelectric actuator 56, to the lower recess 107c, which receives the upwardly-extending projection 92c defined by the nozzle body 40c. The head portion 190 of the inner valve member 76c is slidably received within the bore 104c.

A second biasing spring 198 is provided within the bore 104c of the piston member 102c. The second spring 198 acts upon the lower end surface of the piezoelectric actuator 52 and, by way of an annular end cap 200, upon the head portion 190 of the inner valve member 76c. In this way, the second spring 198 serves to bias the needle portion 184 of the inner valve member 76c against the second seating surface 100b.

The piston member 102c is provided with radial drillings 202 that extend from the accumulator volume 52 and that intersect the piston member bore 104c adjacent to the annular recess 192 in the head portion 190 of the inner valve member 76c. A further radial drilling 204 extends through the piston member 102c from the first accumulator volume 52 to intersect the upper recess 196 of the piston member 102c. By virtue of these radial drillings 202, 204, the first fuel can flow from the accumulator volume 52 into the bore 104c of the piston member 102c, so as to ensure that the pressure acting on the exposed surfaces of the head portion 190 of the inner valve member 76c is equal to the pressure of fuel within the first accumulator volume 52. Because the flow of fuel through the radial passages 202, 204 is restricted by their diameter, the passages 202, 204 provide a damping means to damp the movement of the inner valve member 76c. It will be appreciated that a different number of such radial drillings or other passage means could be provided to equilibrate the fuel pressures in the piston member bore 104c and the first accumulator volume 52.

Operation of the fuel injector 30c is analogous to operation of the injector of the first embodiment, as described with reference to FIGS. 1 to 4b. The second biasing spring 198 takes the place of the coiled portion of the inner valve member in providing a downwards biasing force on the inner valve member, while the action of the fuel pressure in the control chamber 64c and in the piston member bore 104c upon the head portion 190 of the inner valve member 76c serve to control lifting and re-seating of the inner valve member 76c.

Thus, when both the outer valve member 68 and the inner valve member 76c are seated against the first seating region 100a and the second seating region 100b respectively, fuel flow through the first and second sets of outlets 80, 82 is prevented by virtue of the upper and lower seating lines 150a, 150b, 152a, 152b cooperating with the respective seating regions 100a, 100b.

Figure 9A:
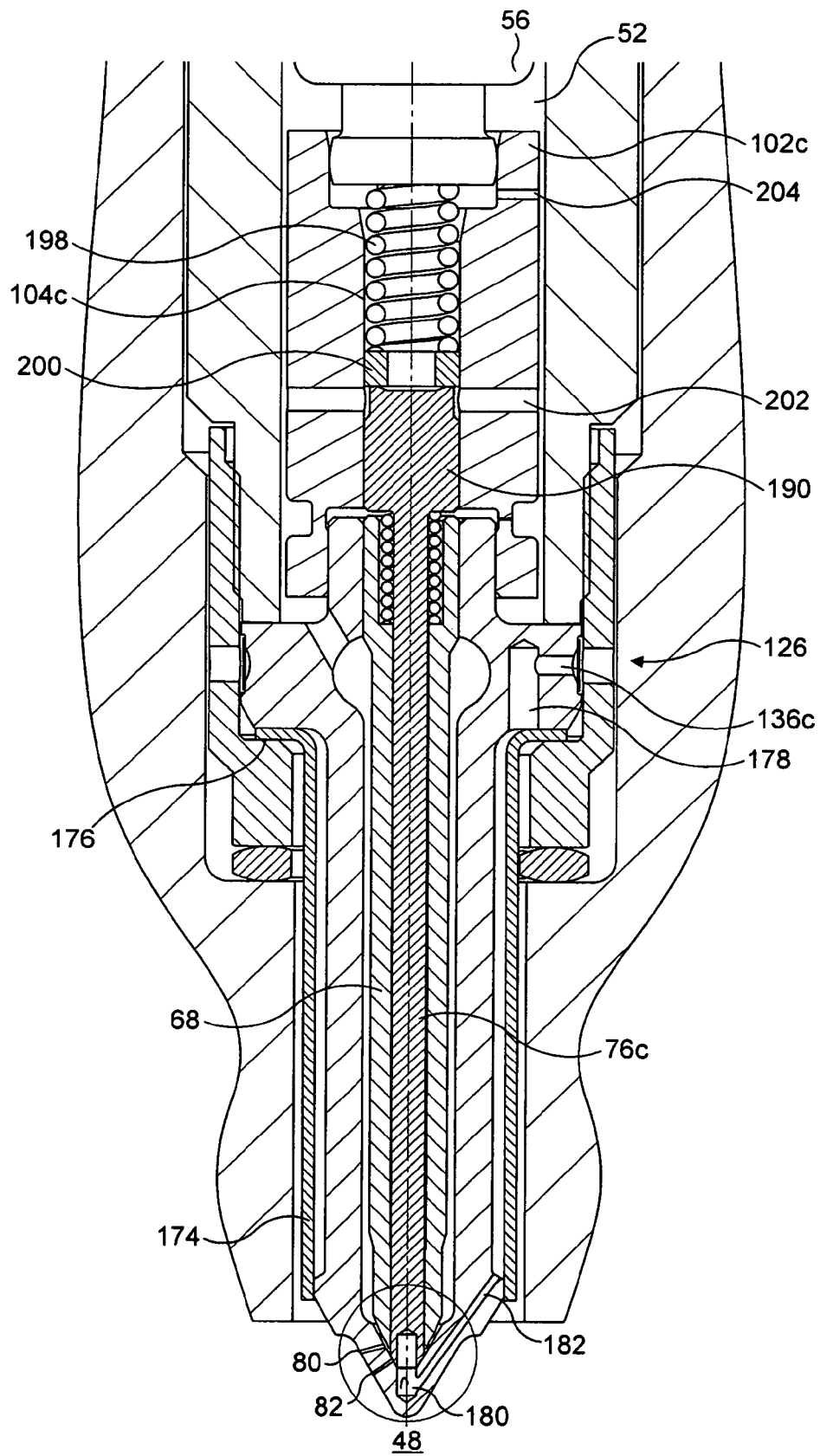
FIG. 9a is an enlarged sectional view of part of the fuel injector of FIGS. 8a and 8b, disposed within a cylinder head, when the outer valve member is in an unseated position and the inner valve member is in a seated position.
Figure 9B:
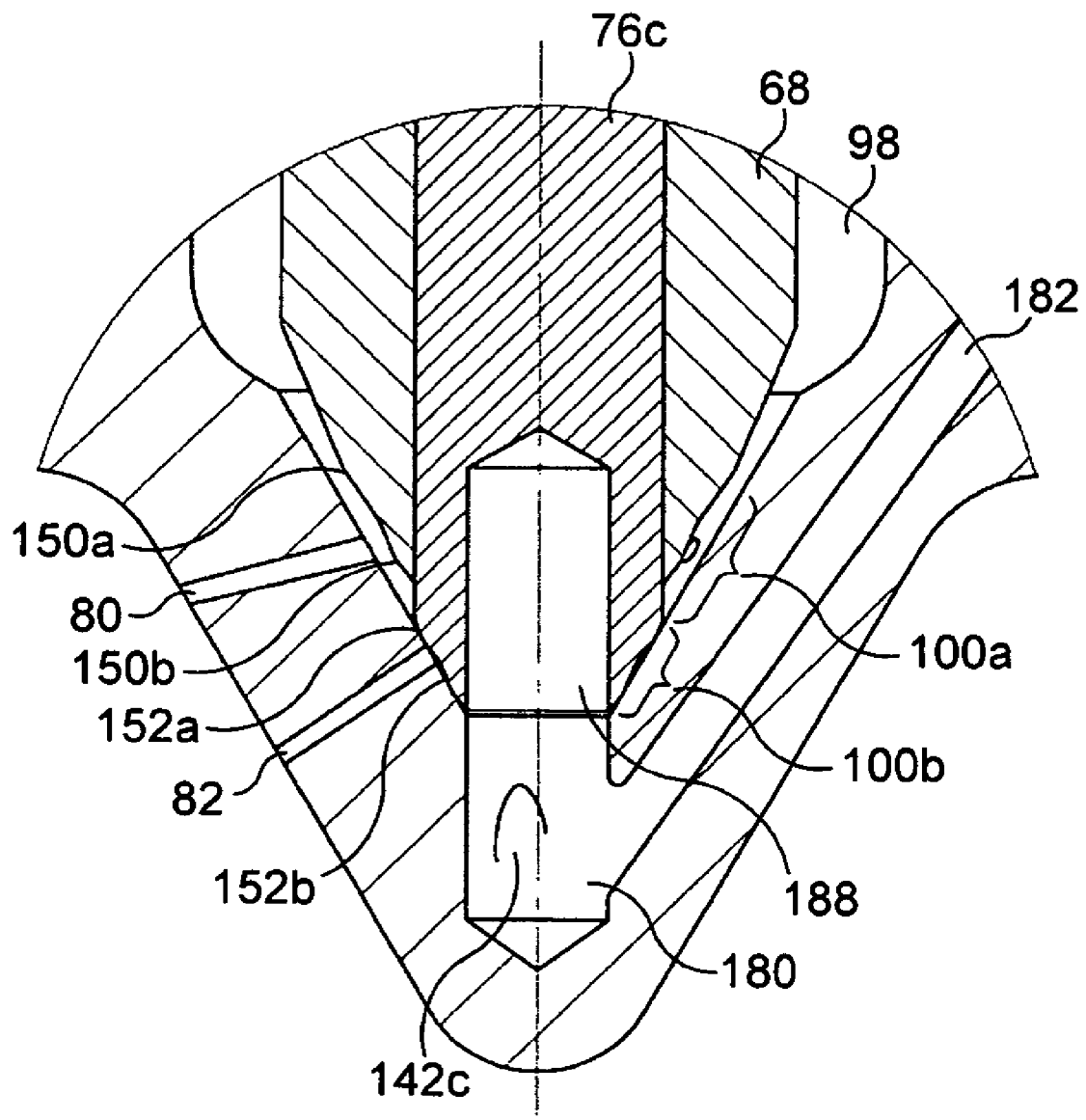
FIG. 9b is a further enlarged sectional view of part of the fuel injector of FIGS. 8a to 9a, when the outer valve member is in an unseated position and the inner valve member is in a seated position.

As shown in FIGS. 9a and 9b, the outer valve member 68 can be lifted from the first seating region 100a by contraction of the actuator 56 as previously described. The inner valve member 76c remains seated. The first fuel can flow from the first delivery chamber 98 and through the first set of outlets 80 for delivery into the combustion chamber 48, but the upper seating line 152a of the inner valve member 76c cooperates with the second seating region 100b to prevent flow of the first fuel through the second set of outlets 82. Likewise, the lower seating line 152b of the inner valve member 76c cooperates with the second seating region 100c to prevent flow of the second fuel through the second set of outlets 82.

Figure 10A:
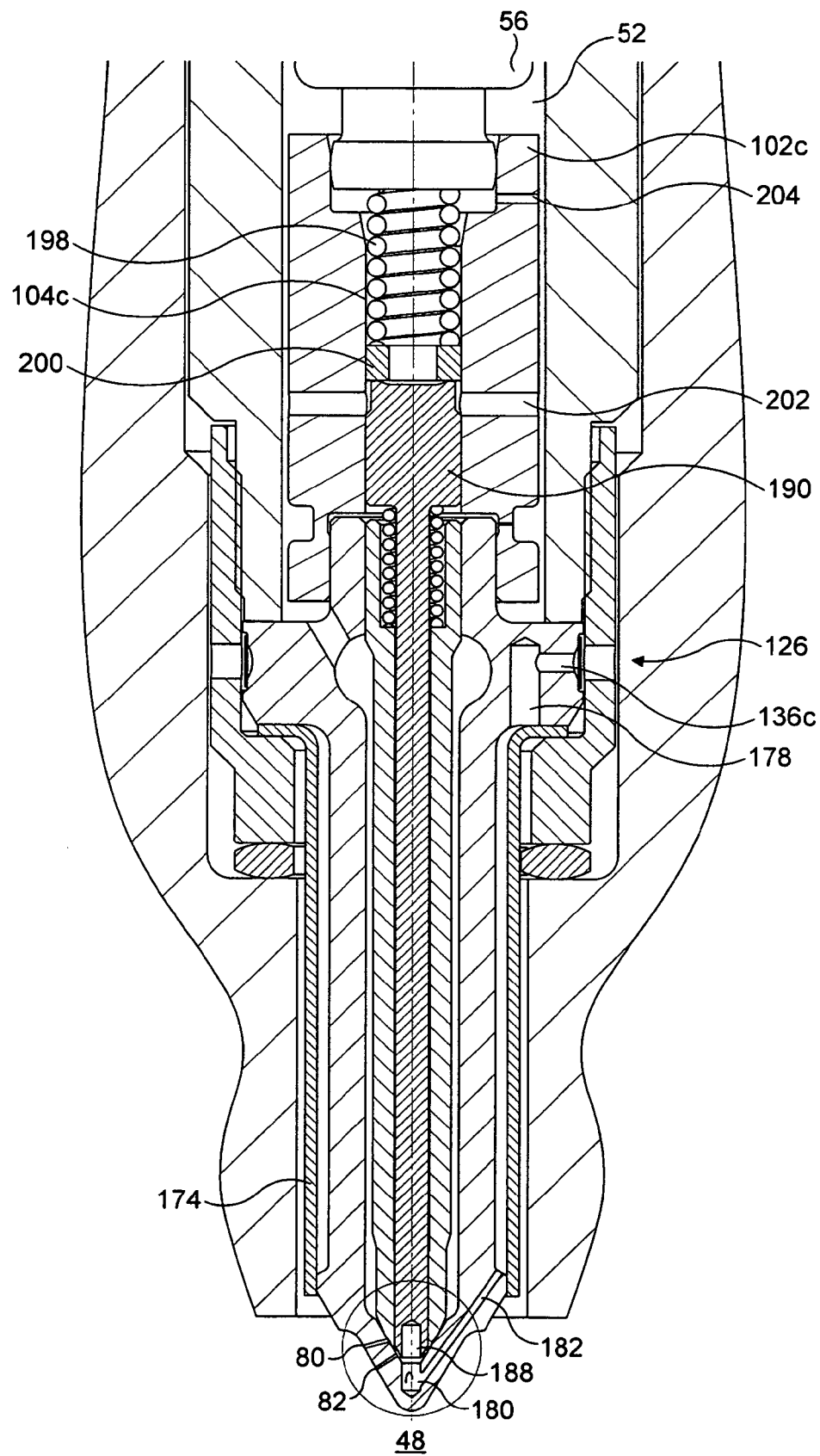
FIG. 10a is an enlarged sectional view of part of the fuel injector of FIGS. 8a to 9b, disposed within a cylinder head, when the outer valve member is in a seated position and the inner valve member is in an unseated position.
Figure 10B:
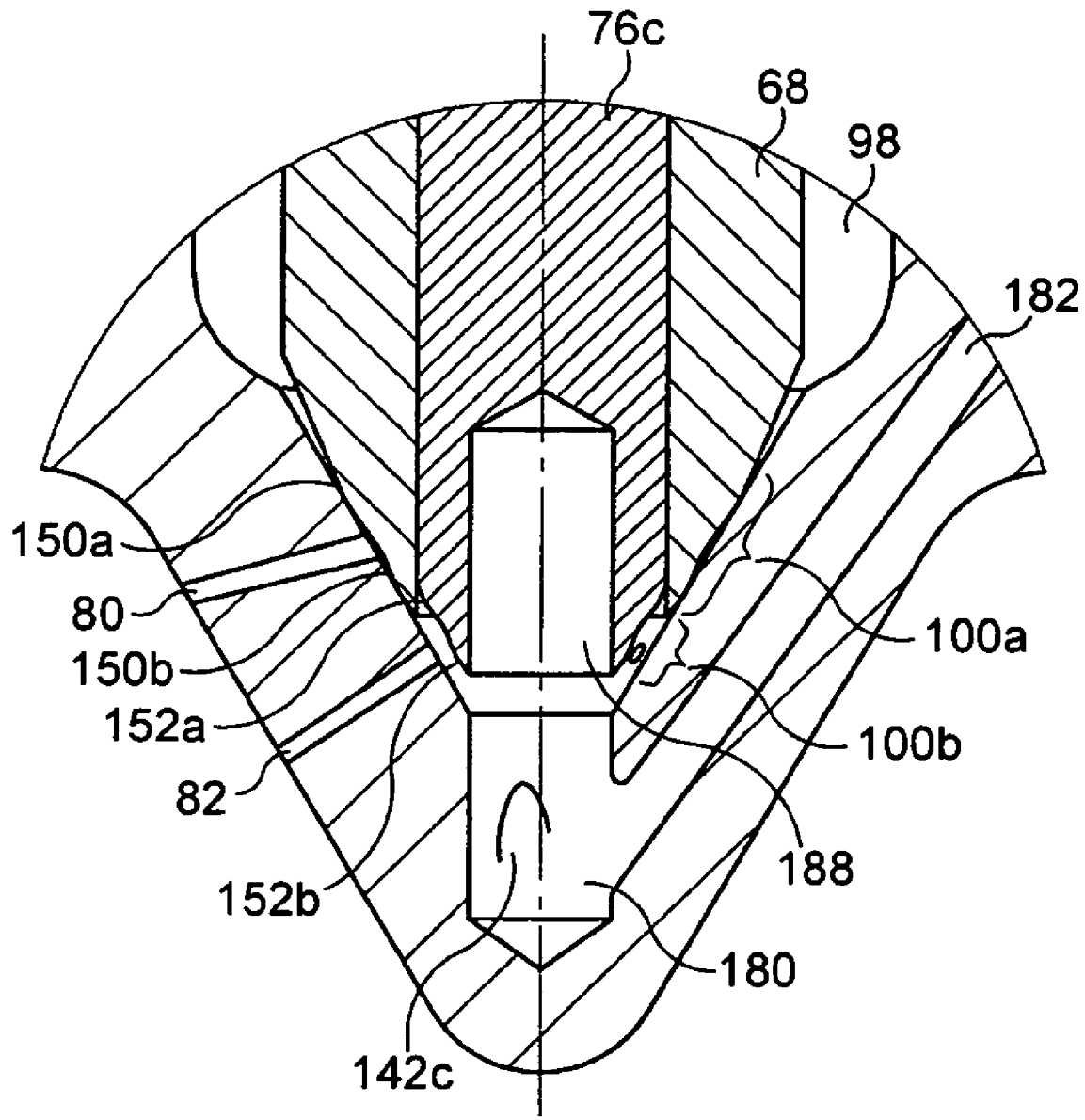
FIG. 10b is a further enlarged sectional view of part of the fuel injector of FIGS. 8a to 10a, when the outer valve member is in a seated position and the inner valve member is in an unseated position.

FIGS. 10a and 10b show the injector 30c when the actuator 56 is in an extended state, so that the inner valve member 76c is lifted from the second seating region 100b and the outer valve member 68 is seated. In this case, the second fuel can flow from the second delivery chamber 142c through the second set of outlets 82 for delivery to the combustion chamber 48. Flow of the second fuel through the first set of outlets 80 is prevented by virtue of the lower seating line 150b of the outer valve member 68 sealing against the first seating region 100a, while flow of the first fuel through the first set of outlets 80 is prevented by cooperation of the upper seating line 150a of the outer valve member 68 and the first seating region 100a. When the actuator 56 is returned to the intermediate state, the lift damper valve 200 lifts momentarily to increase the speed, at which the inner valve member 76c returns to its seated position.

Figure 11A:
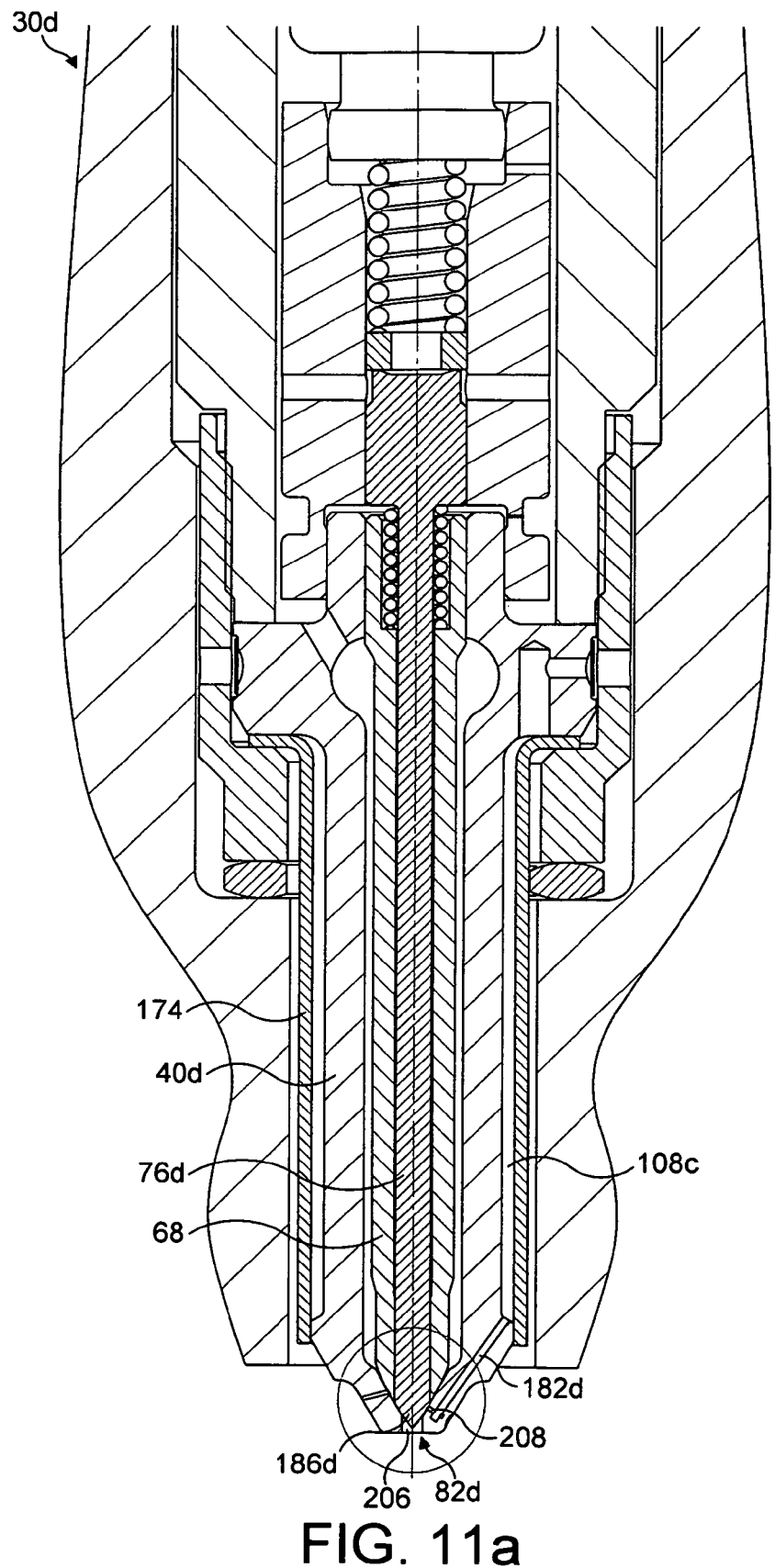
FIG. 11a is an enlarged sectional view of part of a fuel injector according to a fifth embodiment of the present invention, disposed within a cylinder head and including an outer valve member and an inner valve member, when the outer and inner valve members are both in seated positions.
Figure 11B:
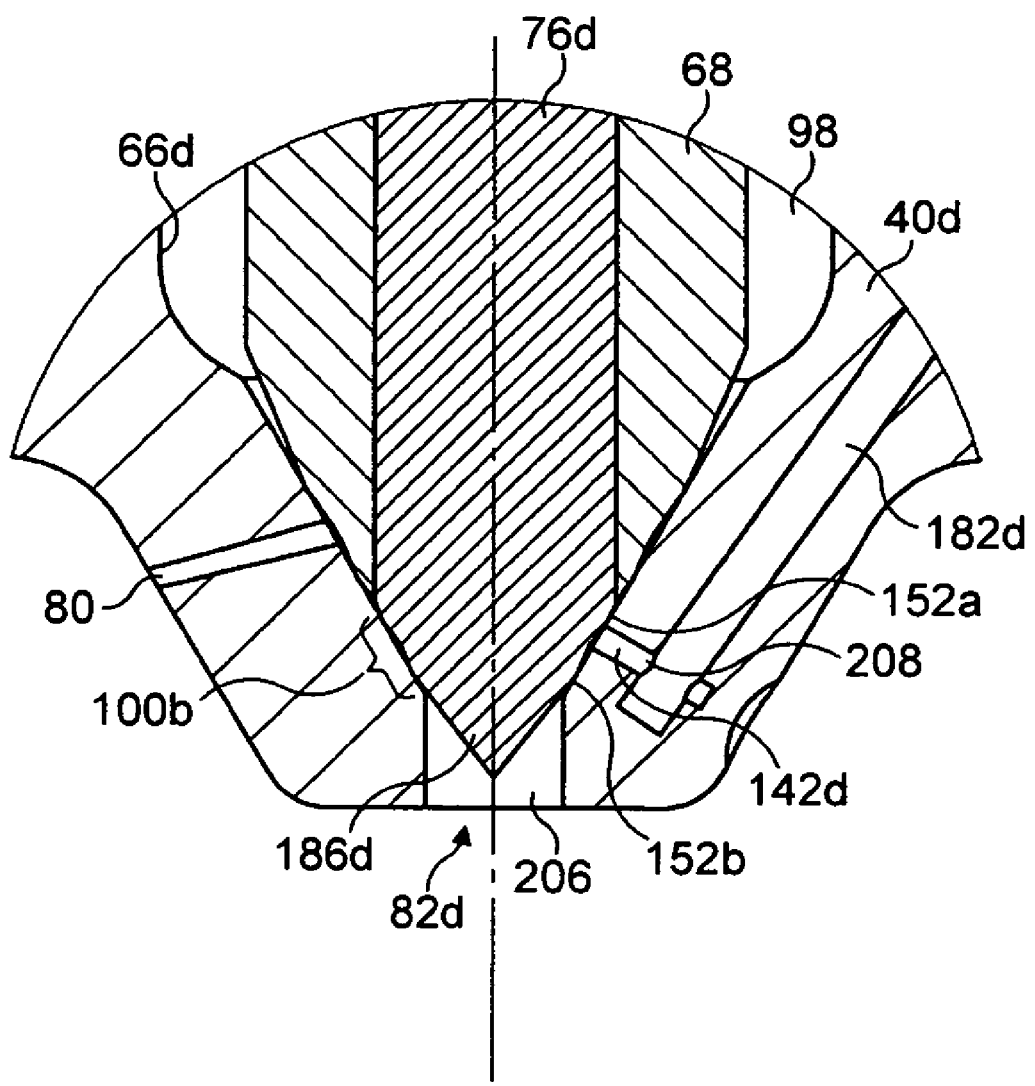
FIG. 11b is a further enlarged sectional view of part of the fuel injector of FIG. 11a, when the outer and inner valve members are both in seated positions.

FIGS. 11a and 11b show a fuel injector 30d according to a fifth embodiment of the present invention, which is similar to the fuel injector of the fourth embodiment except for the arrangement of passages associated with the second fuel at the tip of the injector.

In this embodiment, the second set of outlets 82d comprises a single downwards-pointing orifice 206 at the tip of the nozzle body 40d. The tip 186d of the inner valve member 76d is not truncated, but is instead received in the orifice 206 when the inner valve member 76d is seated. An inclined supply passage 182d extends from the second accumulator volume 108c defined between the nozzle body 40d and the sleeve 174 and towards the orifice 206. The supply passage 182d stops short of the orifice 206. A passage or cross-hole 208 intersects the supply passage 182d and opens into the bore 66d of the nozzle body 40d. The cross-hole 208 emerges at the second seating region 100b, at a position between the upper and lower seating lines 152a, 152b of the inner valve member 76d when the inner valve member 76d is seated. The cross-hole defines a second delivery chamber 142d for the second fuel.

In this way, cooperation of the lower seating line 152b with the second seating region 100b prevents delivery of the second fuel through the orifice 206 when the inner valve member 76d is seated, while cooperation of the upper seating line 152b with the second seating region 100b prevents flow of the second fuel towards the first set of outlets 80, particularly when the outer valve member 68 is lifted from its seated position.

Figure 12A:
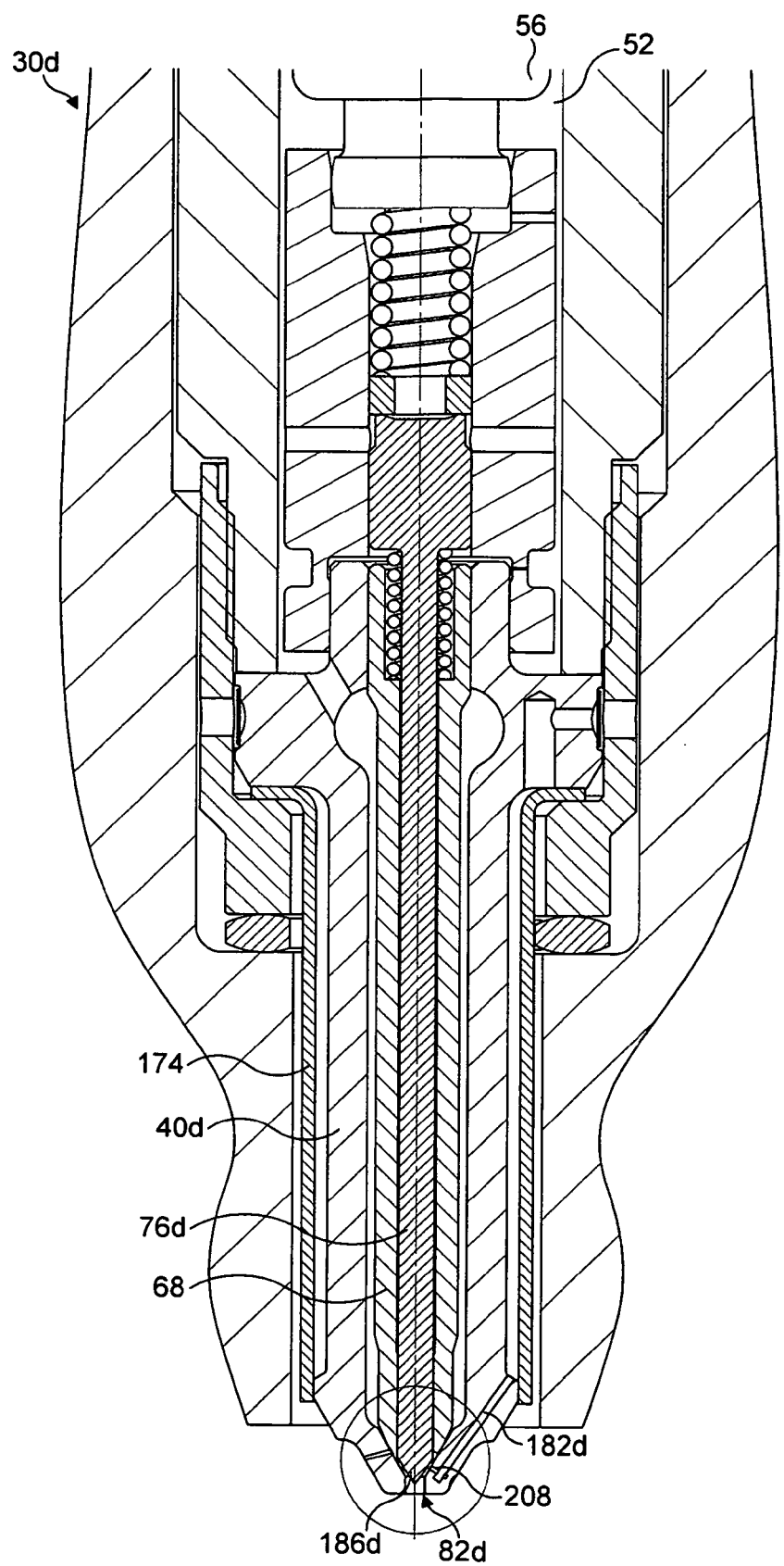
FIG. 12a is an enlarged sectional view of part of the fuel injector of FIGS. 11a and 11b, disposed within a cylinder head, when the outer valve member is in a seated position and the inner valve member is in an unseated position.
Figure 12B:
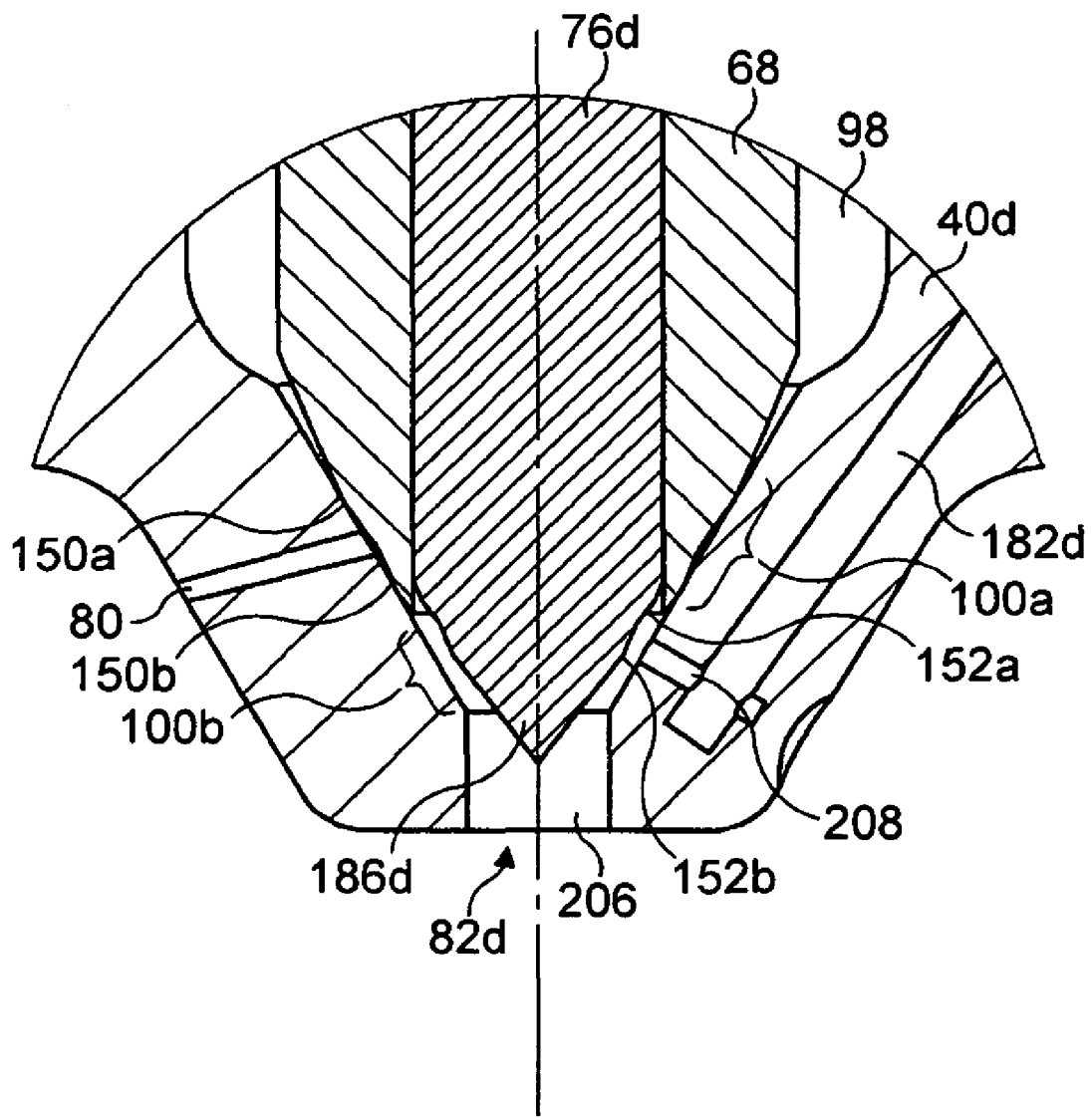
FIG. 12b is a further enlarged sectional view of part of the fuel injector of FIGS. 11a to 12a, when the outer valve member is in a seated position and the inner valve member is in an unseated position.

FIGS. 12a and 12b show the injector 30d of the fifth embodiment when the actuator 56 is in an extended state, so that the inner valve member 76d is lifted away from the second seating region 100b. The outer valve member 68 remains seated. The second fuel can flow from the supply passage 182d, through the cross-hole 208, and out of the second outlet 82d in a downwardly-pointing conical spray pattern created by the orifice 206 and the tip 186d. Flow of the second fuel towards the first set of outlets 80 is prevented by virtue of the lowermost seating line 150b on the outer valve member in cooperation with the first seating region 100a.

During manufacture of an injector according to the fifth embodiment of the invention, the cross-holes 208 may be formed by laser drilling a through-bore from the outside of the nozzle body 40d, then subsequently using the laser to melt a region of the nozzle body 40d, causing the outermost end of the bore to be plugged with molten metal. In all of the above-described embodiments, the injectors are arranged to deliver either the first fuel or the second fuel at any given time. Mixing of the fuels takes place, when necessary, in the combustion chamber following successive injections of the respective fuels. In some applications, however, it may be desirable to provide a fuel injector capable of injecting the first and second fuels simultaneously as well as one or both of the fuels independently.

Figure 13A:
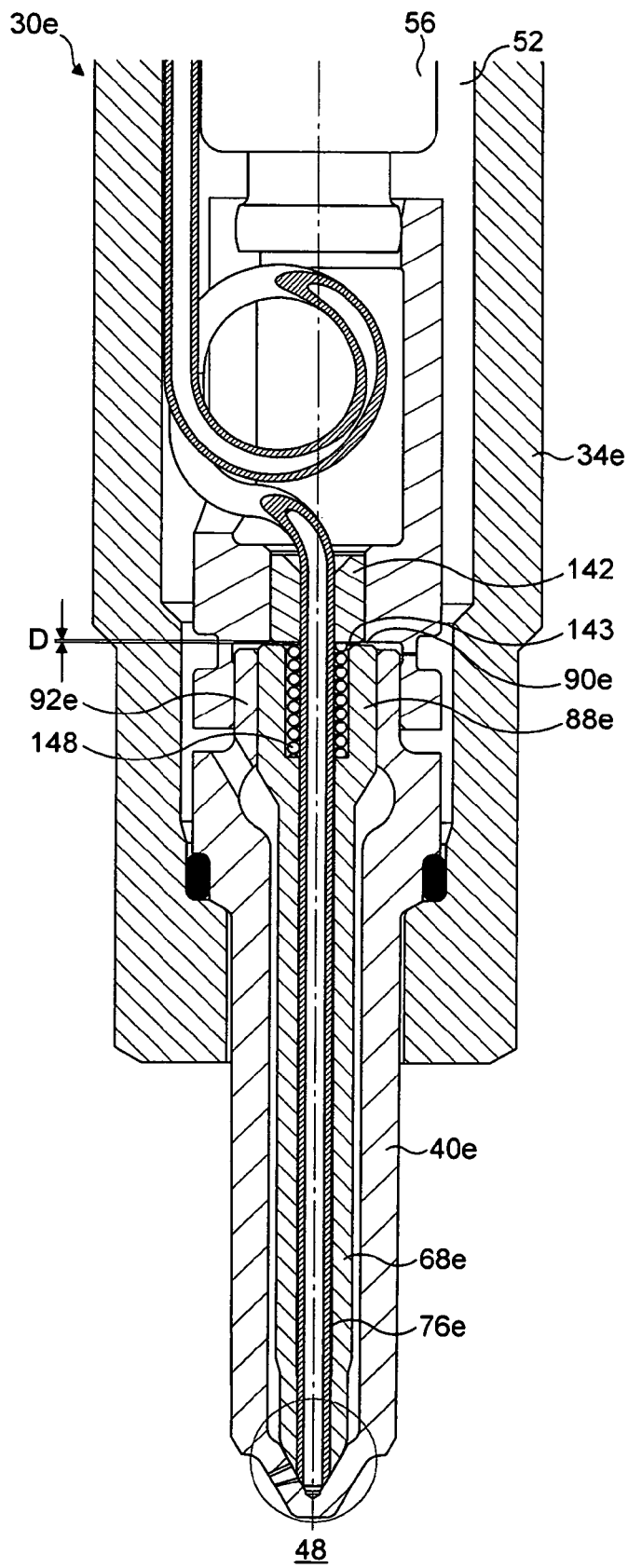
FIG. 13a is an enlarged sectional view of part of a fuel injector according to a sixth embodiment of the present invention, including an outer valve member and an inner valve member, when the outer and inner valve members are both in seated positions.
Figure 13B:
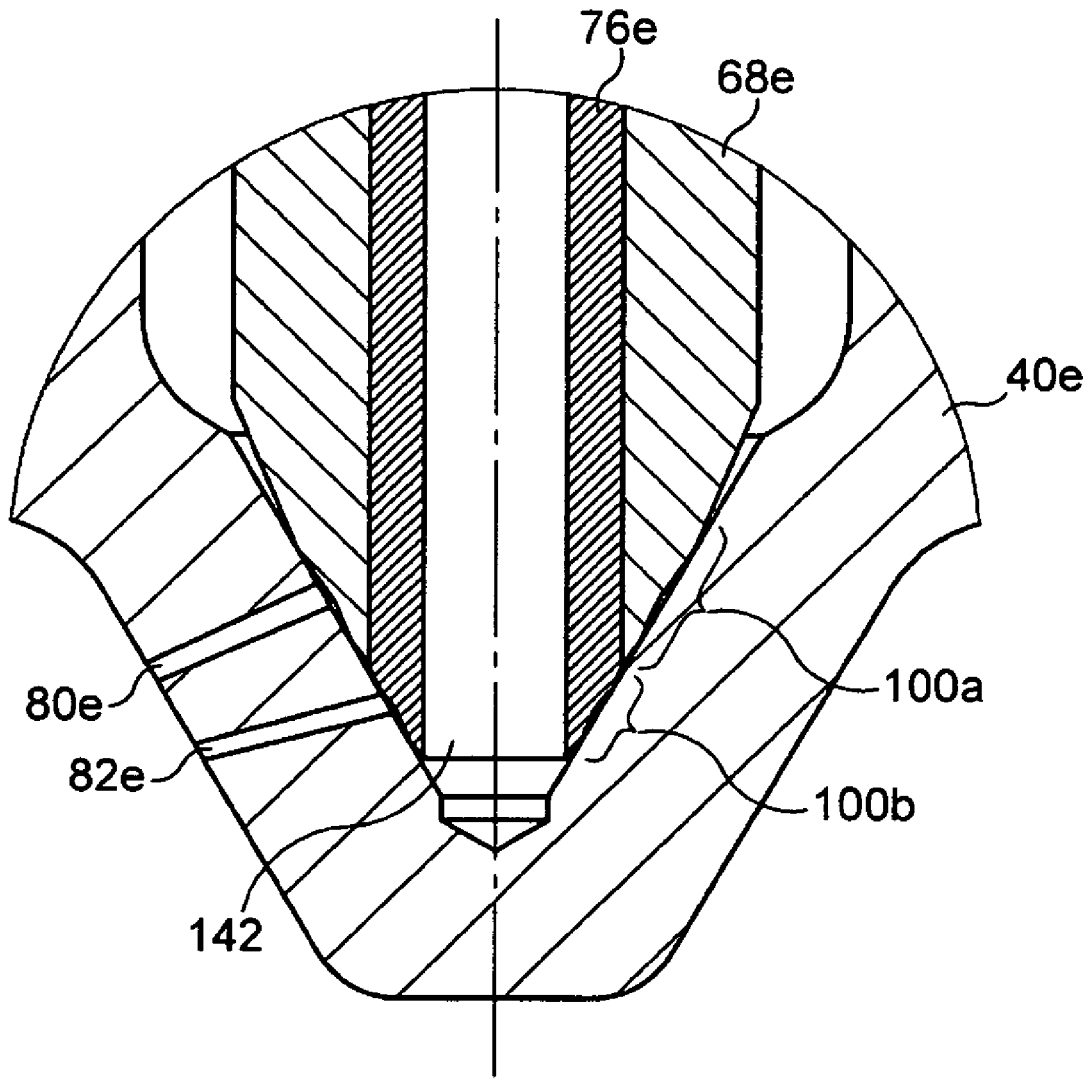
FIG. 13b is a further enlarged sectional view of part of the fuel injector of FIG. 13a, when the outer and inner valve members are both in seated positions.

To this end, FIGS. 13a and 13b show part of a fuel injector 30e according to a sixth embodiment of the invention, which is similar to the fuel injector of the third embodiment of the invention except in that, when the outer valve member 68e is seated, the upper face 90e of the outer valve member 68e extends upwards beyond the upwardly-extending projection 92e of the nozzle body 40e. In other words, the upper region 88e of the outer valve member 68e, which houses the biasing spring 148, is slightly longer in this sixth embodiment of the invention than in the injector of the third embodiment.

When outer valve member 68e and the inner valve member 76e are both seated, therefore, a small gap (labelled D on FIG. 13a) is present between the upper face 90e of the outer valve member 68e and the lower face 143 of the collar 142 on the inner valve member 76e.

Figure 14A:
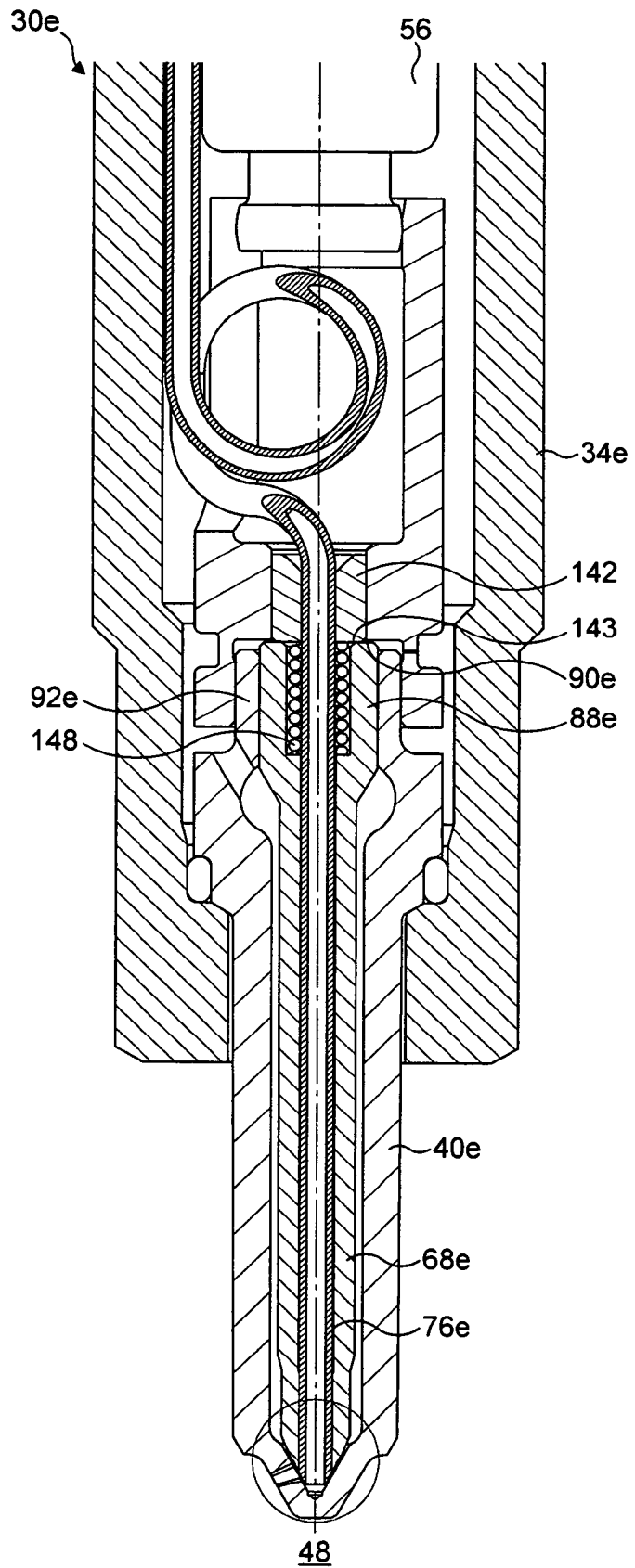
FIG. 14a is an enlarged sectional view of part of the fuel injector of FIGS. 13a and 13b, when the outer and inner valve members are both in unseated positions.
Figure 14B:
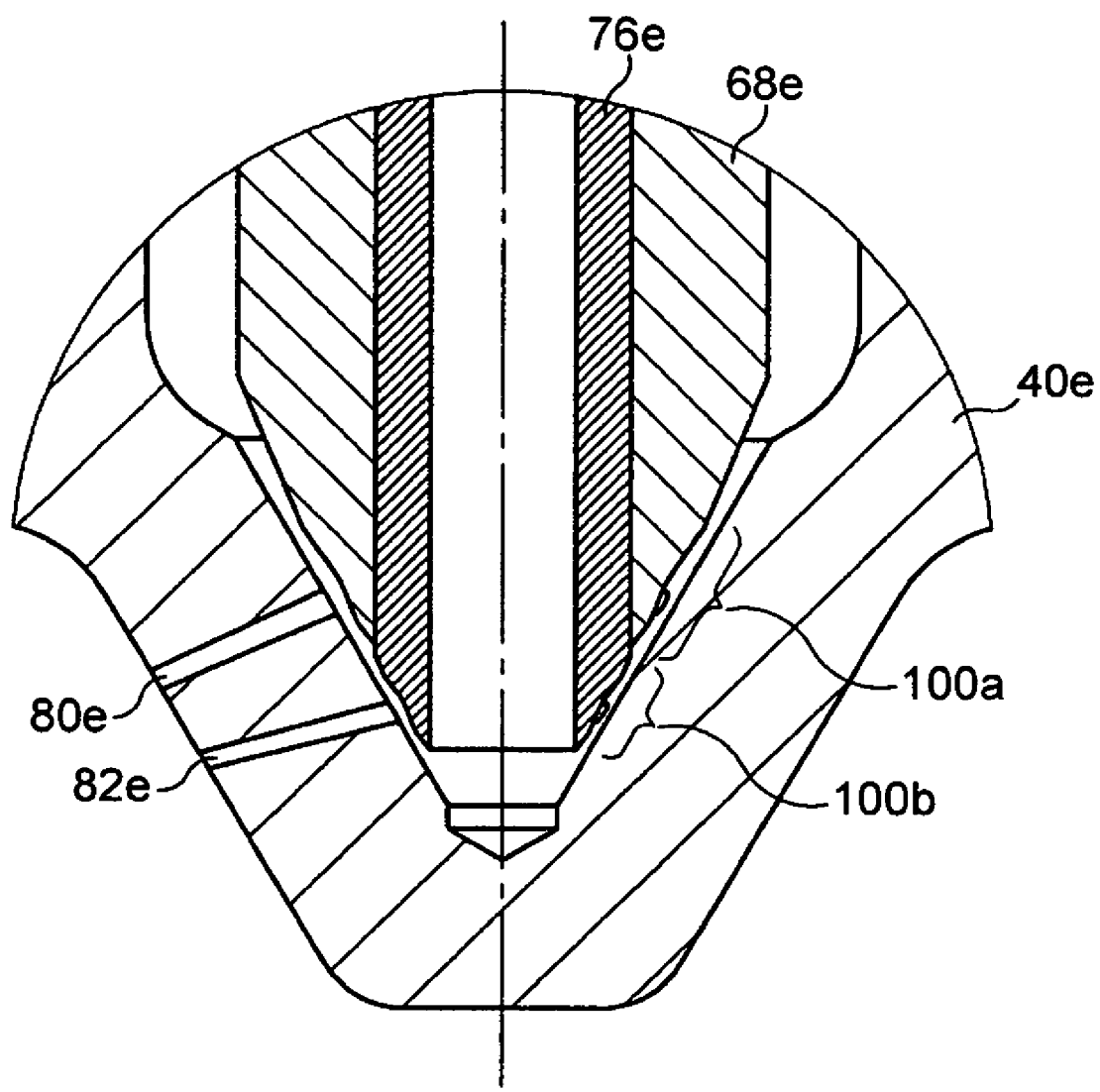
FIG. 14b is a further enlarged sectional view of part of the fuel injector of FIGS. 13a to 14a, when the outer and inner valve members are both in unseated positions.

As in the third embodiment of the invention, the inner valve member 76e can be lifted from the second seating region 100b by extending the actuator 56, while the outer valve member 68e remains seated. Likewise, the outer valve member 68e can be lifted from the first seating region 100a by contracting the actuator 56. However, in this embodiment, the inner valve member 76e only remains seated during lift of the outer valve member 68e while the gap D remains present. As shown in FIGS. 14a and 14b, once sufficient lift of the outer valve member 68e has occurred upon increasing contraction of the actuator 56, the gap D is eliminated and the outer valve member 68e acts upon the collar 142 so as to lift the inner valve member 76e from the second seating region 100b in conjunction with the outer valve member 68e.

Thus, as shown most clearly in FIG. 14b, both the first and second fuels can flow through both the first and second sets of outlets 80e, 82e for simultaneous delivery of the two fuels to the combustion chamber 48.

Hereafter, the position of the actuator 56 will be referred to as "partially contracted" when the gap D is non-zero and the inner valve member 76e remains seated, and as "fully contracted" when the gap D is zero and the inner valve member 76e has lifted from its seat as shown in FIGS. 14a and 14b. It will be appreciated that the terms "partially contracted" and "fully contracted" refer respectively to ranges of positions of the lower end of the actuator 56, relative to the injector body 34e, and not to particular positions within that range.

In the case where the first and second fuels are at approximately the same pressure within the injector 30e, the first fuel will tend to flow mainly through the first set of outlets 80e, and the second fuel will tend to flow mainly through the second set of outlets 82e. Consequently, mixing of the two fuels may take place primarily within the combustion chamber 48 after delivery of the fuels, rather than in the injector 30e itself. To promote mixing in the combustion chamber 48 during simultaneous injection, the first and second sets of outlets 80e, 82e are oriented toward one another so that the axes of the passages comprising the outlets 80e, 82e converge outside the fuel injector 30e.

In some applications, it may be desirable for the fuels to be pre-mixed before delivery into the combustion chamber. Accordingly, in a seventh embodiment of the invention, shown in FIGS. 15a and 15b, an injector 30f with a single set of outlets 80f is provided in place of the first and second outlets of previously described embodiments.

The single set of outlets 80f extend from the first seating region 100a to the outer surface of the nozzle body 40f, and are located so as to lie between the upper and lower seating lines 150a, 150b of the outer valve member 68f when it is seated. The injector is otherwise identical to the injector of the sixth embodiment of the invention, except in that only a single seating line 152 is provided on the inner valve member 76f.

As in the sixth embodiment of the invention, the outer valve member 68f can be lifted from the first seating region 100a by partially retracting the actuator 56. In that state, the first fuel is delivered through the single set of outlets 80f to the combustion chamber 48. The second fuel cannot flow out of the second delivery chamber 142 because of the seal formed between the seating line 152 of the inner valve member 76f and the second seating region 100b.

Figure 15A:
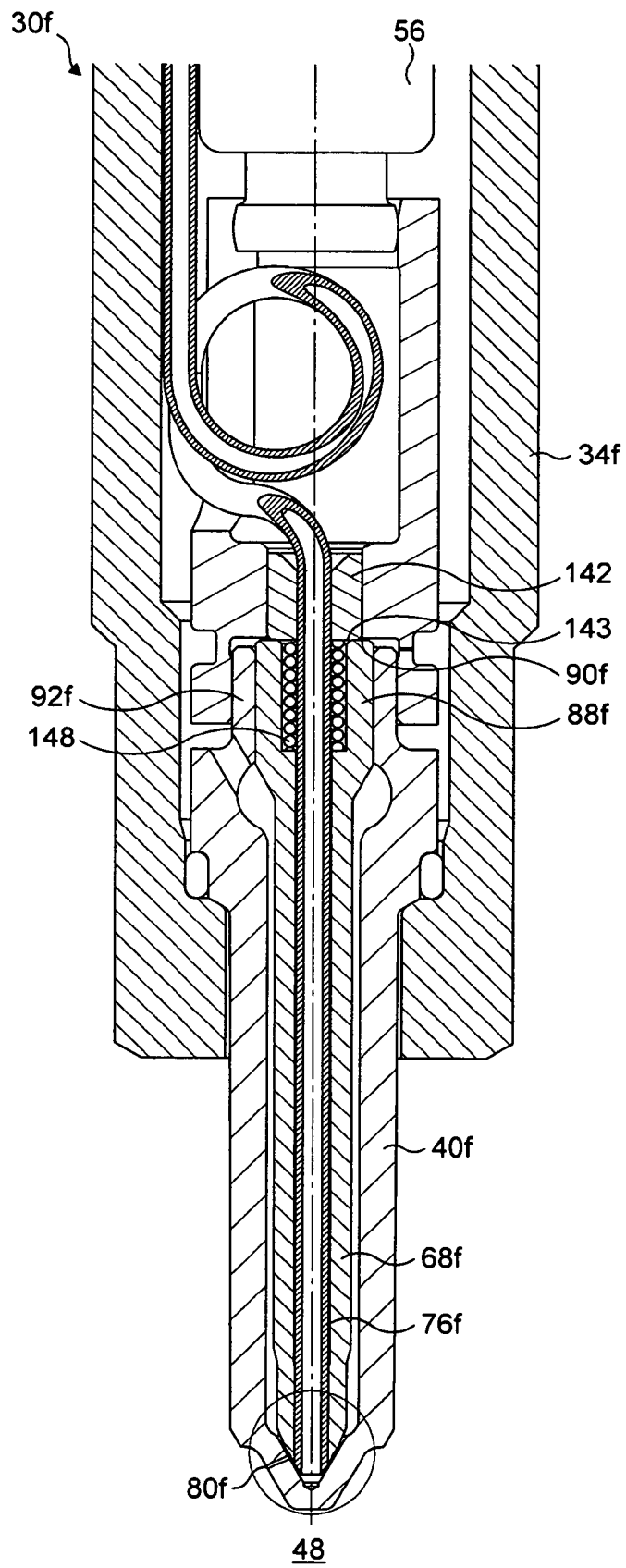
FIG. 15a is an enlarged sectional view of part of a fuel injector according to a seventh embodiment of the present invention, including an outer valve member and an inner valve member, when the outer and inner valve members are both in unseated positions.
Figure 15B:
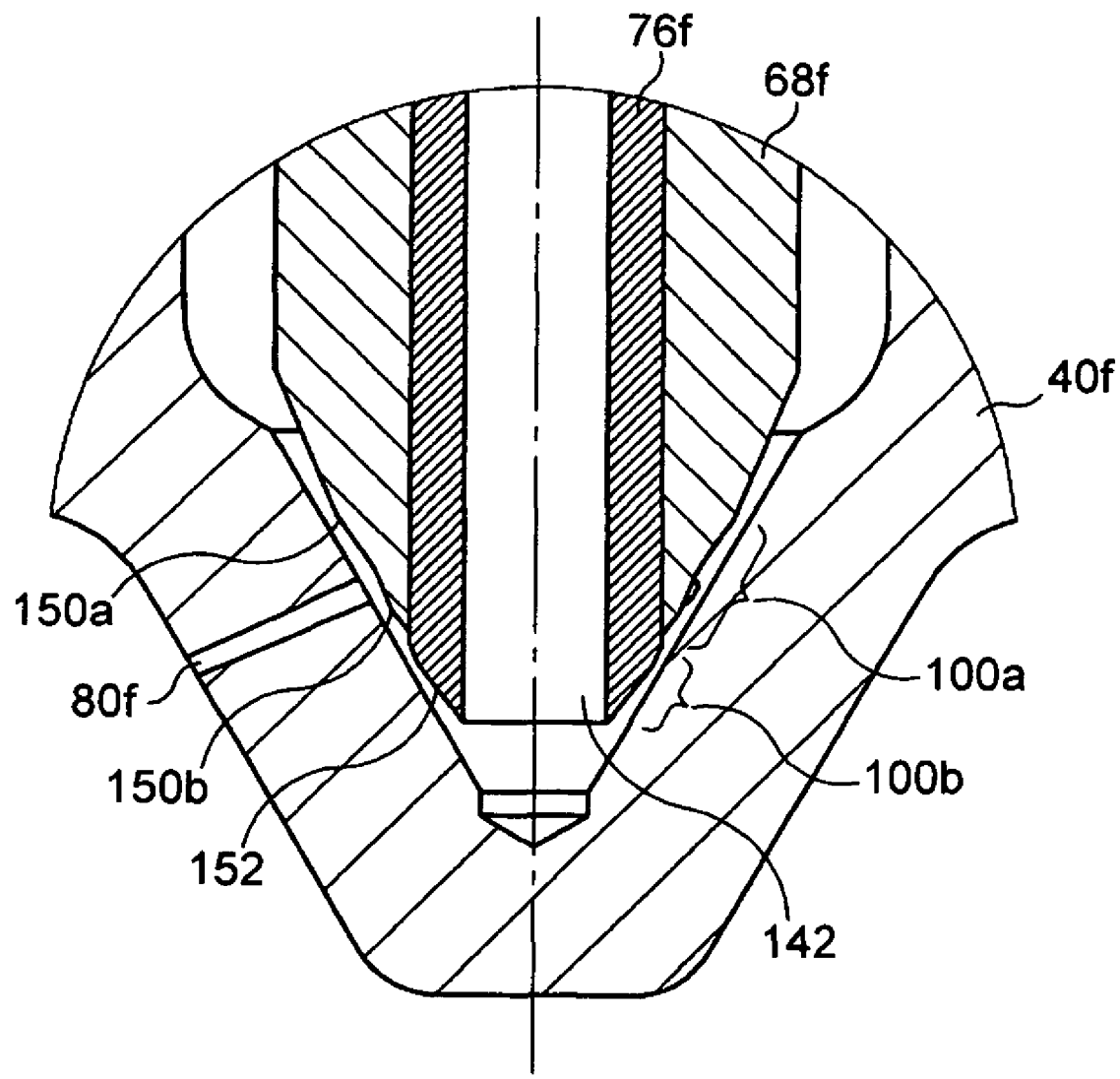
FIG. 15b is a further enlarged sectional view of part of the fuel injector of FIG. 15a, when the outer and inner valve members are both in unseated positions.

Further retraction of the actuator 56 causes the upper portion 88f of the outer valve member 68f to come into contact with and lift the collar 142, causing the inner valve member 76f to lift from the second seating region 100b as shown in FIGS. 15a and 15b. In this state, the second fuel can flow out of the injector 30f through the single set of outlets 80f, in addition to the first fuel. The two fuels are mixed as they pass through the relatively small passage or passages forming the single set of outlets 80f.

Thus, in this seventh embodiment of the invention, the first fuel alone or a mixture of the first and second fuels can be delivered through the single set of outlets 80f to the combustion chamber 48, according to the amount of retraction of the actuator 56 and hence according to the voltage applied to the actuator 56. Furthermore, the amount of lift of the inner valve needle 76f can be controlled, by varying the amount of retraction of the actuator 56, so as to control the amount of the second fuel present in the delivered mixture.

It will be appreciated that, as in previous embodiments, extension of the actuator 56 from its intermediate position will cause the inner valve member 76f to lift whilst leaving the outer valve member 68f seated. In this case, however, no delivery of fuel will occur because the passage of the second fuel to the single set of outlets 80f is blocked by the lower seating line 150b of the outer valve member 68f, which is engaged with the first seating region 100a.

Figure 16A:
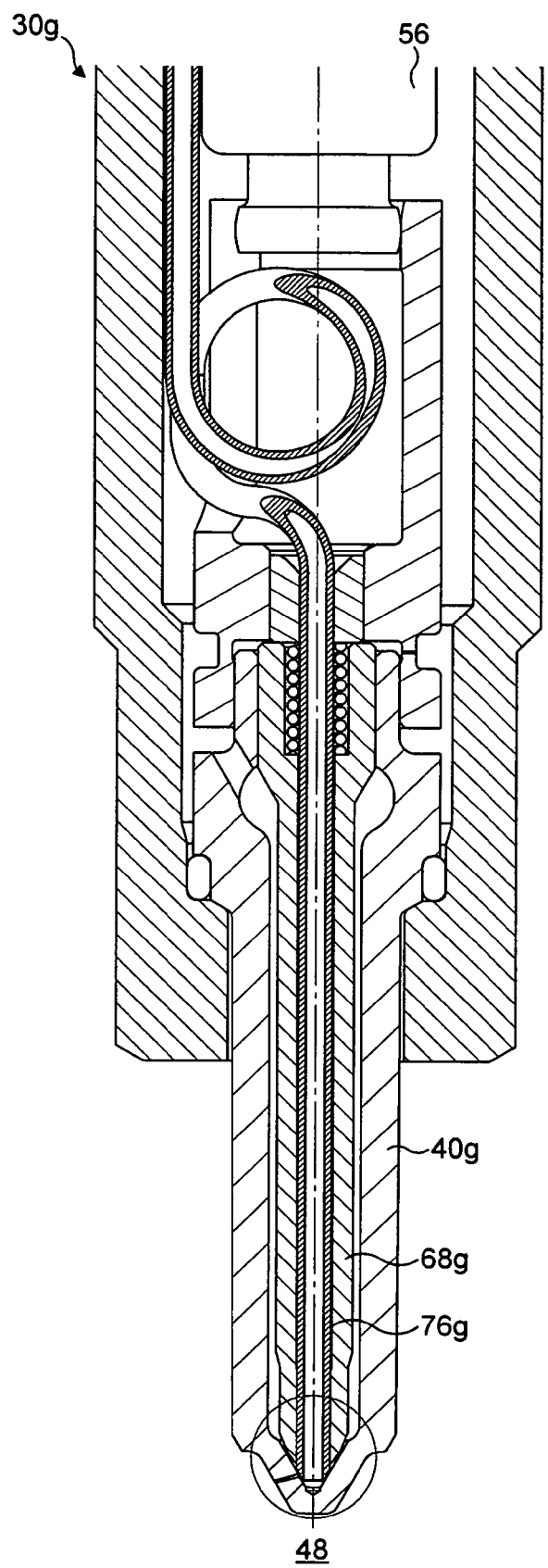
FIG. 16a is an enlarged sectional view of part of a fuel injector according to an eighth embodiment of the present invention, including an outer valve member and an inner valve member, when the outer and inner valve members are both in unseated positions.
Figure 16B:
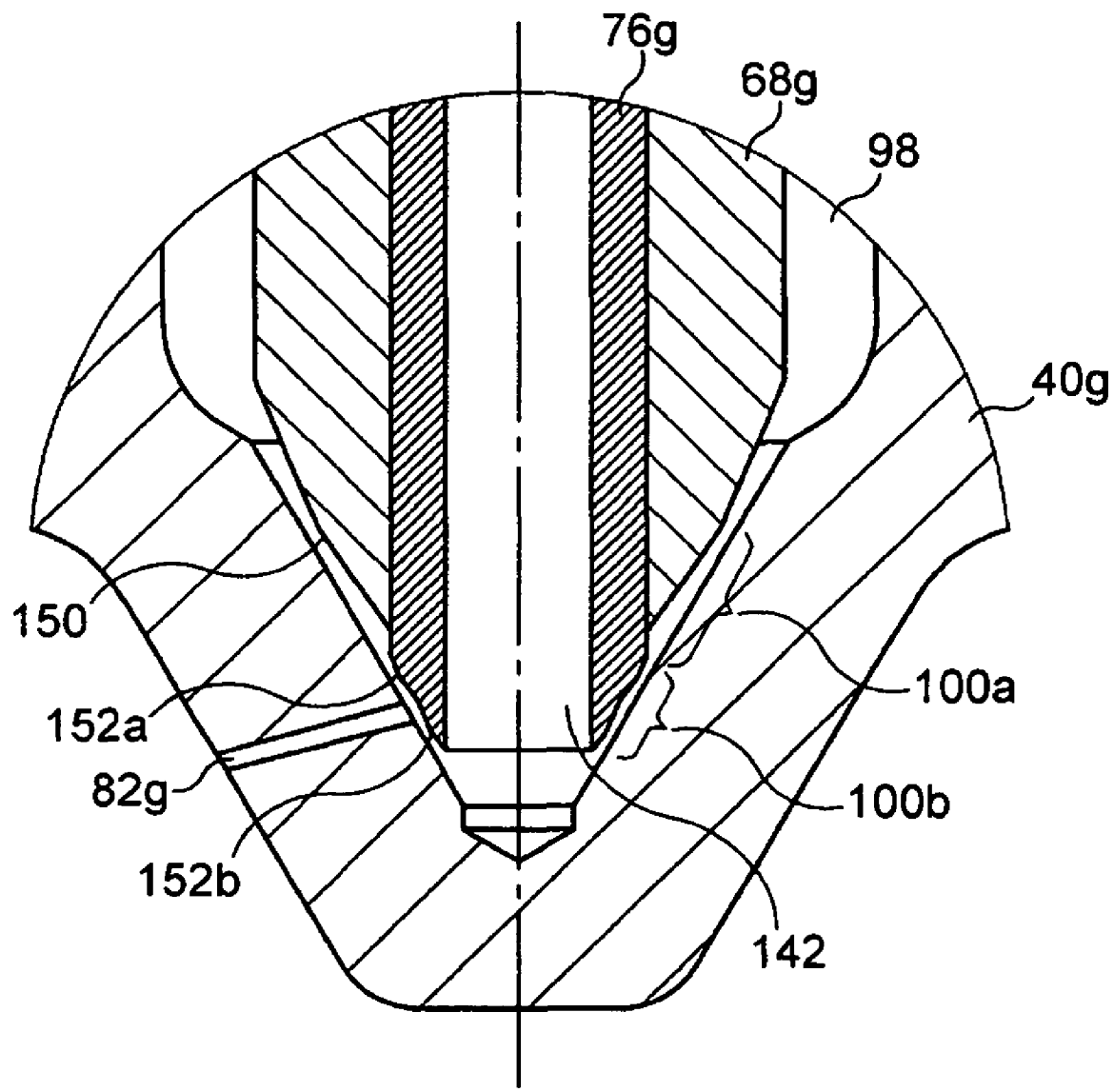
FIG. 16b is a further enlarged sectional view of part of the fuel injector of FIG. 16a, when the outer and inner valve members are both in unseated positions.

In an eighth embodiment of the invention, an injector 30g as shown in FIGS. 16a and 16b is provided. In this case, the injector 30g is similar to the injector of the seventh embodiment, except in that the outer valve member 68g is provided with only one seating line 150, the inner valve member is provided with two seating lines 152a, 152b, and the single set of outlets 82g is provided, which extend from the second seating region 100b to the outer surface of the nozzle body 40g.

In this embodiment, therefore, extension of the actuator 56 from its intermediate position causes the inner valve member 76g to lift from the second seating region 100b while the outer valve member 68g remains seated. The second fuel alone is therefore delivered from the second delivery chamber 142 to the combustion chamber 48 by way of the single set of outlets 82g.

Upon partial contraction of the actuator 56 from its intermediate position, the outer valve member 68g alone lifts from its seated position 100a. No delivery of fuel takes place because the inner valve member 76g is still engaged with the second seating region 100b. Upon further contraction of the actuator 56 to a fully contracted state, however, the inner valve member 76g lifts from the second seating region 100b in addition to the outer valve member 68g as shown in FIGS. 16a and 16b. In this state, the first fuel can flow from the first delivery chamber 98 and through the single set of outlets 82g in addition to the second fuel. As previously described, the two fuels mix within the injector 30g as they flow towards and through the single set of outlets 82g.

Therefore, in this embodiment of the invention, either the second fuel alone can be delivered to the combustion chamber 48 by causing extension of the actuator 56, or a mixture of both fuels can be injected by causing a contraction of the actuator 56 of suitable magnitude.

Figure 17A:
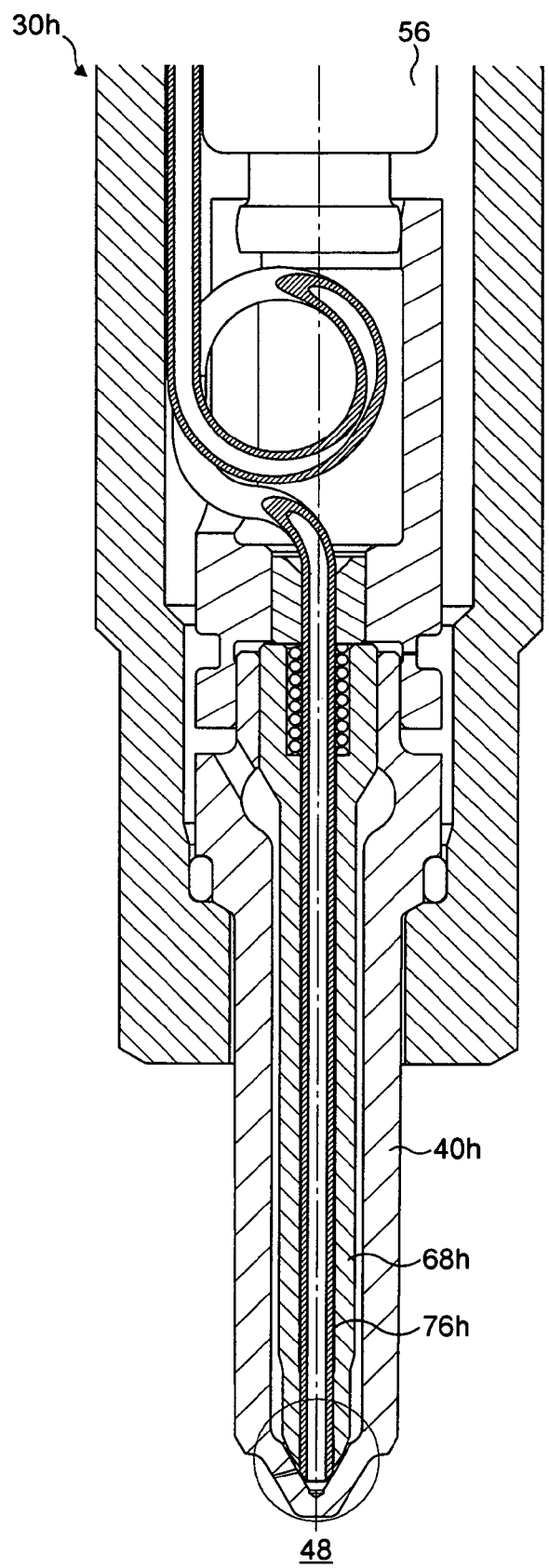
FIG. 17a is an enlarged sectional view of part of a fuel injector according to a ninth embodiment of the present invention, including an outer valve member and an inner valve member, when the outer and inner valve members are both in unseated positions.
Figure 17B:
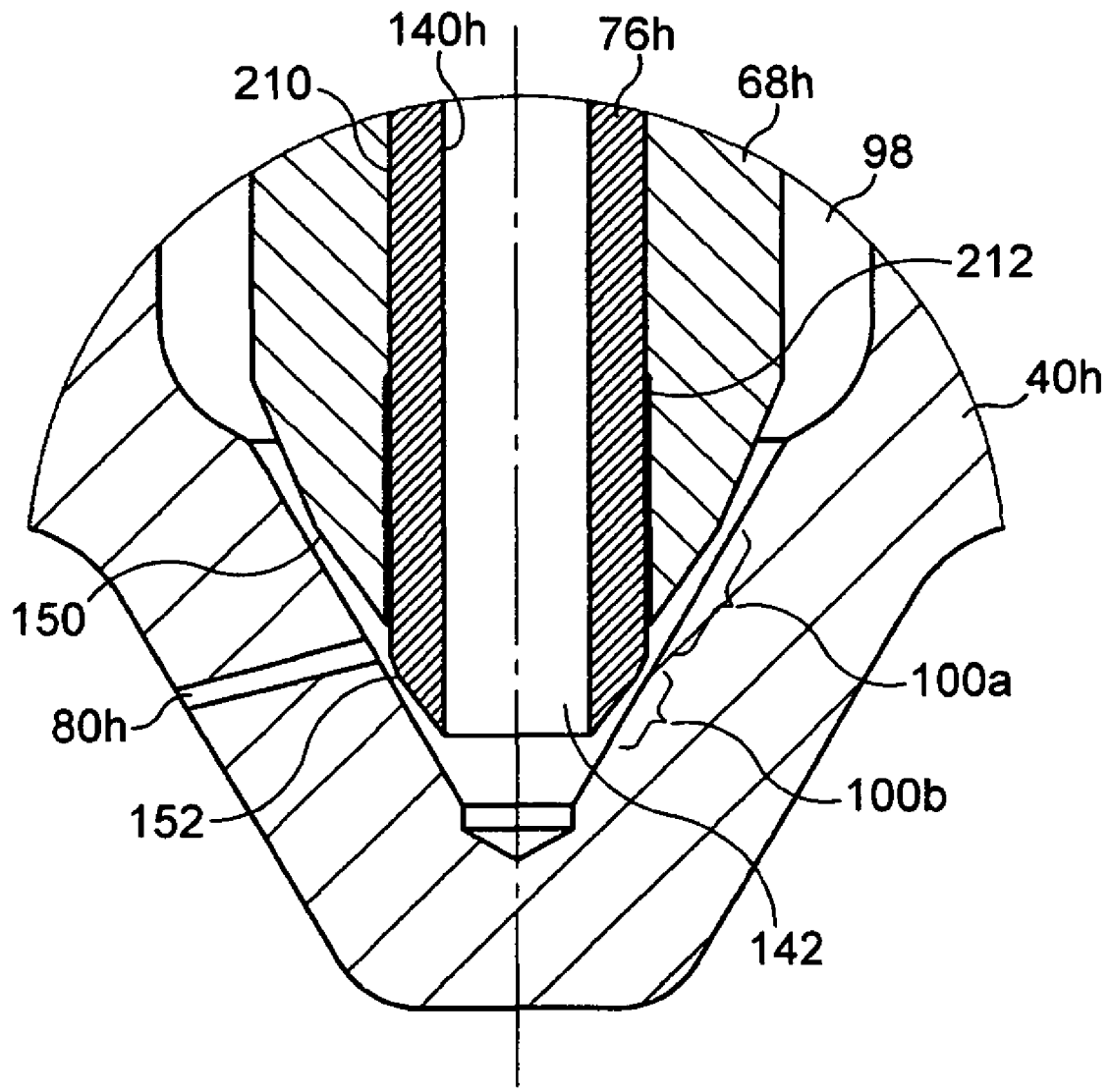
FIG. 17b is a further enlarged sectional view of part of the fuel injector of FIG. 17a, when the outer and inner valve members are both in unseated positions.

FIGS. 17a and 17b show a fuel injector 30h according to a ninth embodiment of the invention, which is similar to the seventh and eighth embodiments of the invention. In this embodiment, however, the single set of outlets 80h extend through the nozzle body 40h from a location intermediate the first and second seating regions 100a, 100b, and both the outer and inner valve members 68h, 76h are provided with a single seating line 150, 152.

When the outer and inner valve members 68h, 76h are seated on the respective first and second seating regions 100a, 100b, flow of the first fuel through the single set of outlets 80h is prevented by the engagement of the outer valve needle 68h with the first seating region 100a. Similarly, flow of the second fuel through the single set of outlets 80h is prevented by the engagement of the inner valve needle 76h with the second seating region 100b.

When the actuator 56 is set into an extended state, the inner valve needle 76h is lifted from the second seating region 100b while the outer valve needle 68h remains seated. In this state, the second fuel can flow from the second delivery chamber 142 through the single set of outlets 80h for delivery to the combustion chamber 48. Flow of the first fuel through the single set of outlets 80h is prevented by the engagement of the seating line 150 of the outer valve needle 68h with the first seating region 100a, so in this state the second fuel alone is delivered to the combustion chamber 48.

When the actuator 56 is partially contracted from its intermediate state, the outer valve member 68h lifts from the first seating region 100a while the inner valve member 76h remains seated. In this state, the first fuel can flow from the first delivery chamber 98 and through the single set of outlets 80h for delivery to the combustion chamber 48, while flow of the second fuel is prevented by the engagement of the seating line 152 of the inner valve member 76h with the second seating region 100b.

Upon further contraction of the actuator 56 to a fully contracted state, the inner valve member 76h also lifts from the second seating region 100b, as shown in FIGS. 17a and 17b. In this state, the first and second fuels can both flow through the single set of outlets 80h for delivery into the combustion chamber 48. The two fuels mix within the injector 30h as they flow towards and through the single set of outlets 80h.

In this embodiment of the invention, therefore, the first and second fuels can be delivered separately, or together in a mixture.

The first fuel may be present in the clearance 210 between the inner and outer valve members 68h, 76h. By virtue of its axial location, the single set of outlets 80h provides a pathway for such fuel to leak into the combustion chamber 48. To eliminate or mitigate fuel leakage in this way, the clearance 210 between the inner and outer valve members 68h, 76h must be carefully controlled in this embodiment of the invention.

When each fuel is at its maximum operating pressure, for example when both valve members 68h, 76h are seated just prior to an injection event, the inner valve member 76h is radially dilated due to the pressure of the second fuel inside its bore 140h, while the outer valve member 68h is radially compressed under pressure of the first fuel that surrounds it. The clearance 210 between the inner and outer valve members 68h, 76h is such that, in these conditions of maximum fuel pressure, the clearance 210 is close to zero to minimize leakage while still allowing relative movement of the valve members 68h, 76h. A region 212 of increased clearance between the outer valve member 68h and the inner valve member 76h may be provided, as shown most clearly in FIG. 17b, so as to allow for distortion of the clearance 210 as a result of deformation of the valve members 68h, 76h due to the seating forces.

In each of the sixth, seventh, eighth and ninth embodiments of the invention, the supply pressure of the first and second fuels should be approximately equal when they are to be injected simultaneously. Otherwise, the fuel at higher pressure will tend to flow into the injector parts containing the fuel at lower pressure when both the inner and outer valve members are open.

Figure 18A:
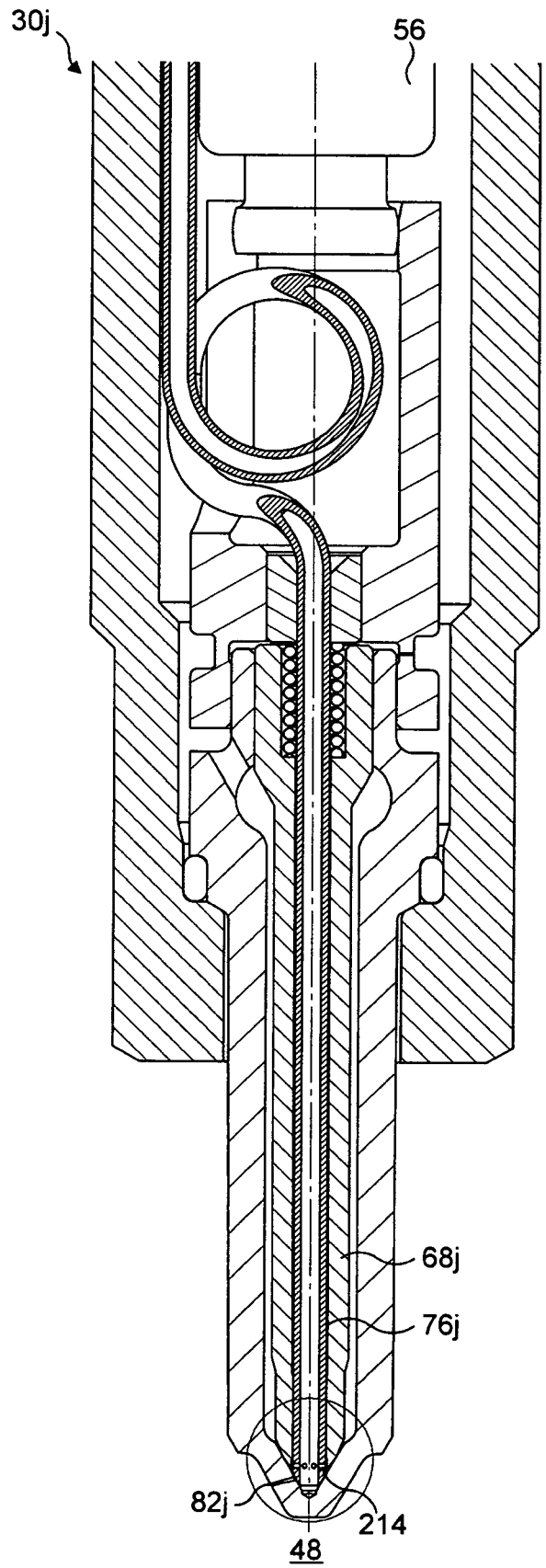
FIG. 18a is an enlarged sectional view of part of a fuel injector according to a tenth embodiment of the present invention, including an outer valve member and an inner valve member, when the outer and inner valve members are both in seated positions.
Figure 18B:
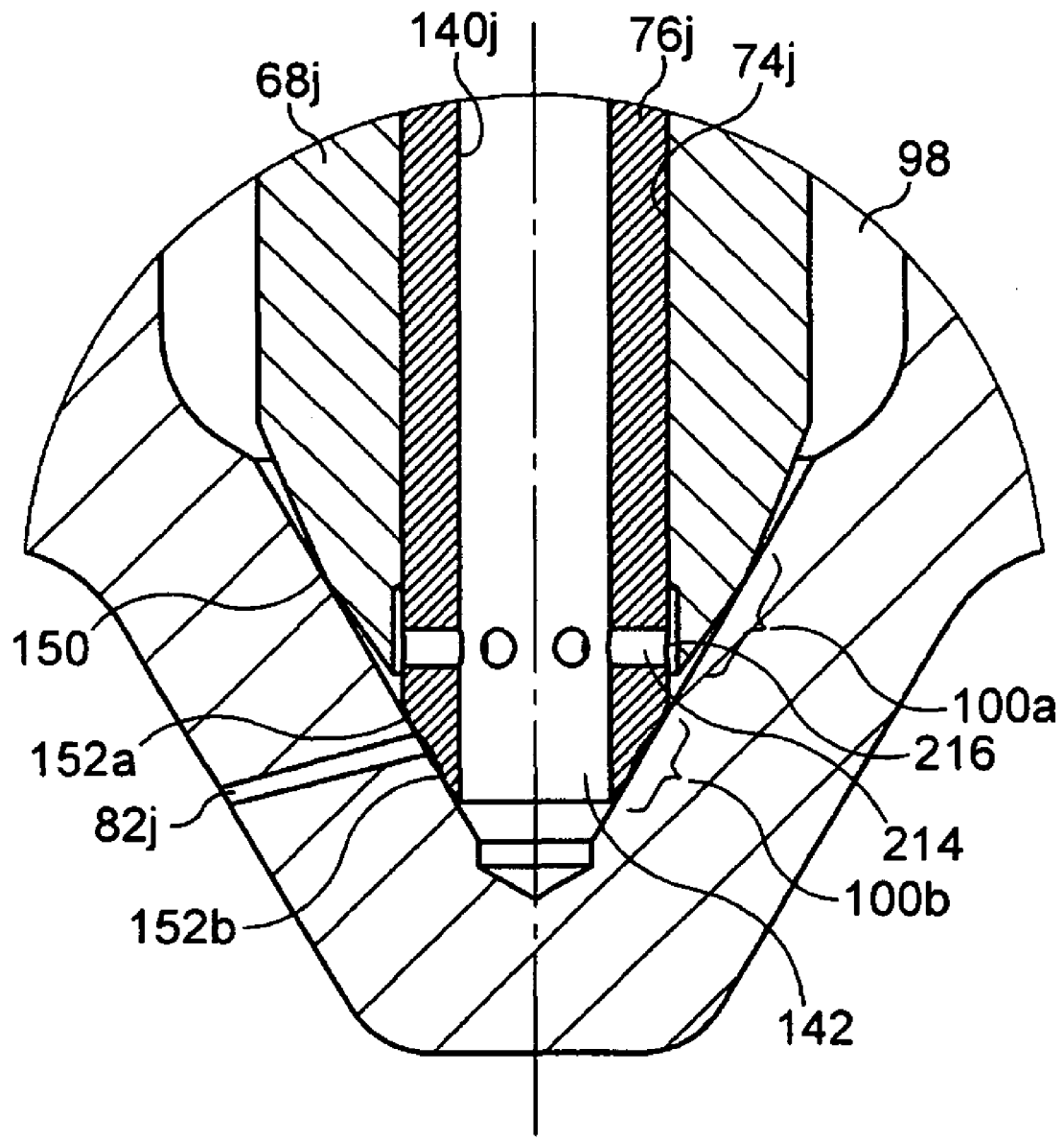
FIG. 18b is a further enlarged sectional view of part of the fuel injector of FIG. 18a, when the outer and inner valve members are both in seated positions.

In a tenth embodiment of the invention, illustrated in FIGS. 18a and 18b, an injector 30j is provided, which is capable of pre-mixing the first and second fuels within the injector 30j before the mixture is delivered to the combustion chamber 48.

The injector 30j is similar to the eighth embodiment of the invention, except in that the inner valve member 76j is provided with radial passages 214 that extend from the inner surface of its bore 140j to its outer surface. Furthermore, the lowermost end region of the bore 74j of the outer valve member 68j has a slightly enlarged diameter to create a clearance 216 between the inner and outer valve members 76j, 68j in the vicinity of the radial passages 214. The radial passages 214 allow the second fuel to flow into and occupy the clearance 216.

When the actuator 56 is in its intermediate energization state, the outer valve member 68j is seated against the first seating region 100a. The single seating line 150 of the outer valve member 68j engages the first seating region 100a to prevent flow of the first fluid past the outer valve member 86j and into the clearance 216. The inner valve member 76j is seated against the second seating region 100b. The upper and lower seating lines 152a, 152b of the inner valve member 76j engage the second seating region 100b either side of the single set of outlets 82j, so as to prevent delivery of fuel to the combustion chamber 48. In particular, the lower seating line 152b cooperates with the second seating region 100b to prevent flow of the second fluid from the second delivery chamber 142 to the outlets 82j, while the upper seating line 152a cooperates with the second seating region 100b to prevent flow of the second fluid from the clearance 216 to the outlets 82j.

Figure 19A:
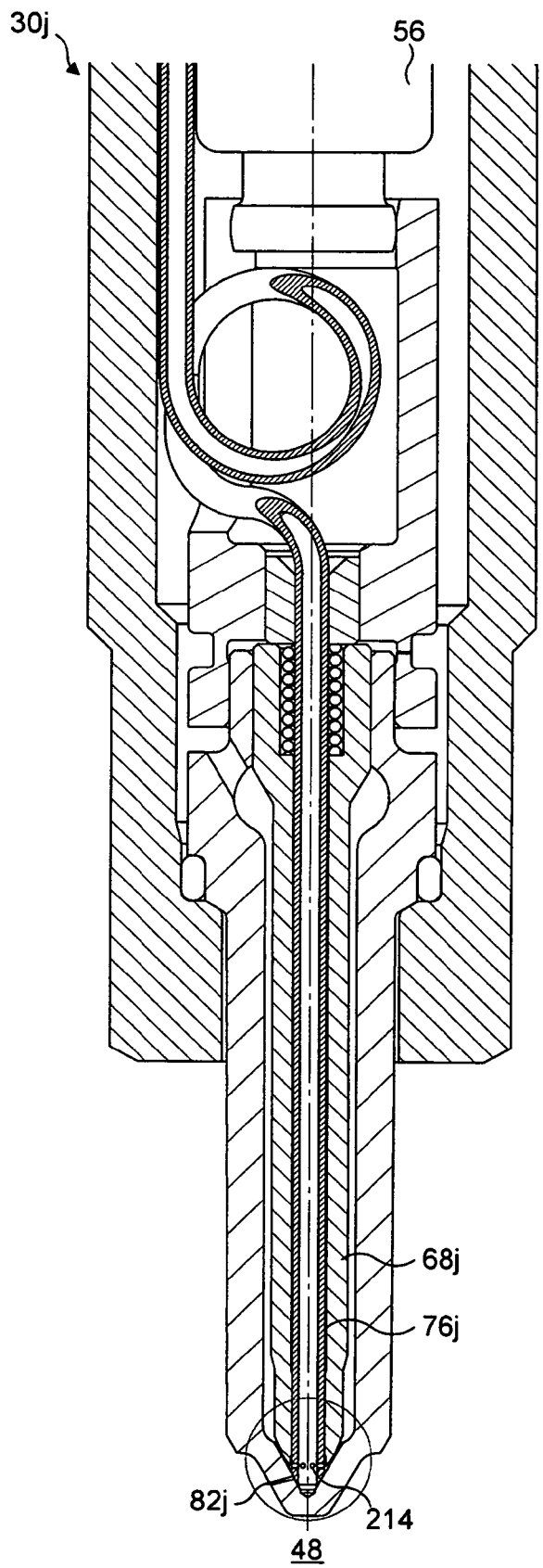
FIG. 19a is an enlarged sectional view of part of the fuel injector of FIGS. 18a and 18b, when the outer valve member is in an unseated position and the inner valve member is in a seated position.
Figure 19B:
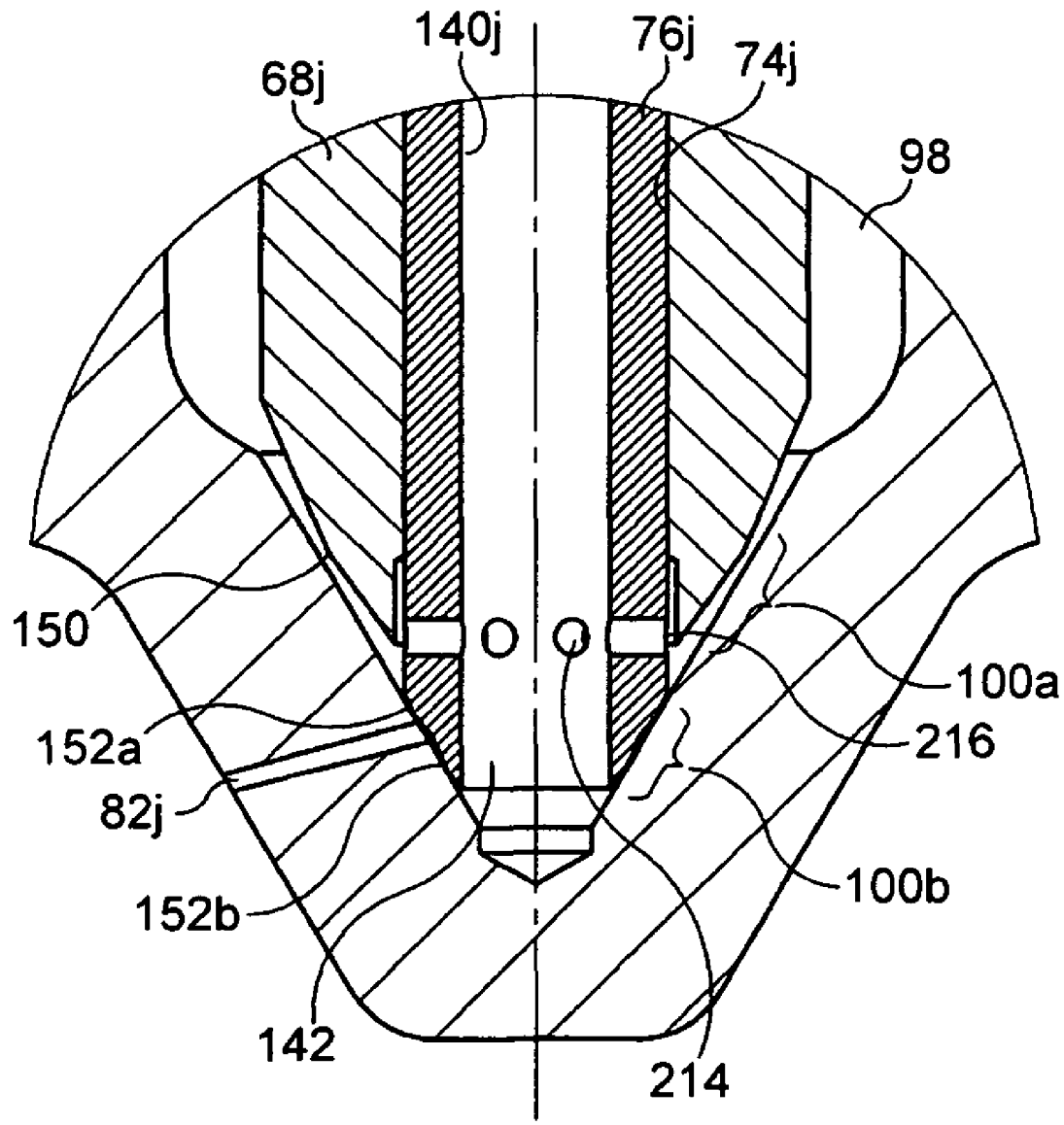
FIG. 19b is a further enlarged sectional view of part of the fuel injector of FIGS. 18a to 19a, when the outer valve member is in an unseated position and the inner valve member is in a seated position.

FIGS. 19a and 19b show the injector 30j of FIGS. 18a and 18b when the actuator 56 is in a partially retracted position. The outer valve member 68j is lifted from the first seating region 100a, while the inner valve member 76j remains seated. In this state, the first fuel can flow into the second delivery chamber 142 within the bore 140j of the inner valve member 76j, by way of the radial passages 214, whereupon it mixes with the second fuel already present. No delivery of fuel takes place because the outlets 86j are still sealed by engagement of the inner valve member 76j against the second seating region 100b.

The quantity of the first fuel that is allowed to mixed with the second fuel can be controlled or metered by varying the distance, by which the outer valve member 68j is lifted from the first seating region 100a, and the time, for which it is unseated. In this way, the ratio of the first and second fuels in the mixture in the second delivery chamber 142 can be controlled. The rate, at which the first fuel flows into the second delivery chamber 142 is governed, at least in part, by the size and number of radial passages 214 in the inner valve member 76j.

Figure 20A:
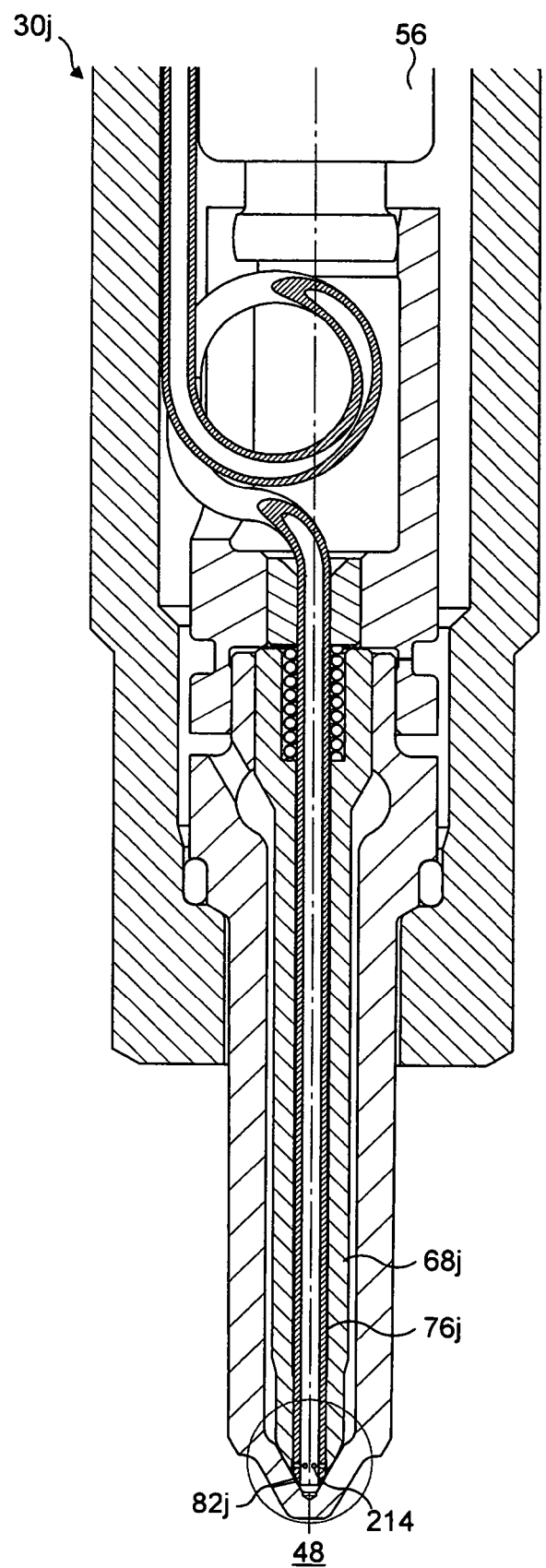
FIG. 20a is an enlarged sectional view of part of the fuel injector of FIGS. 18a to 19b, when the outer valve member is in a seated position and the inner valve member is in an unseated position.
Figure 20B:
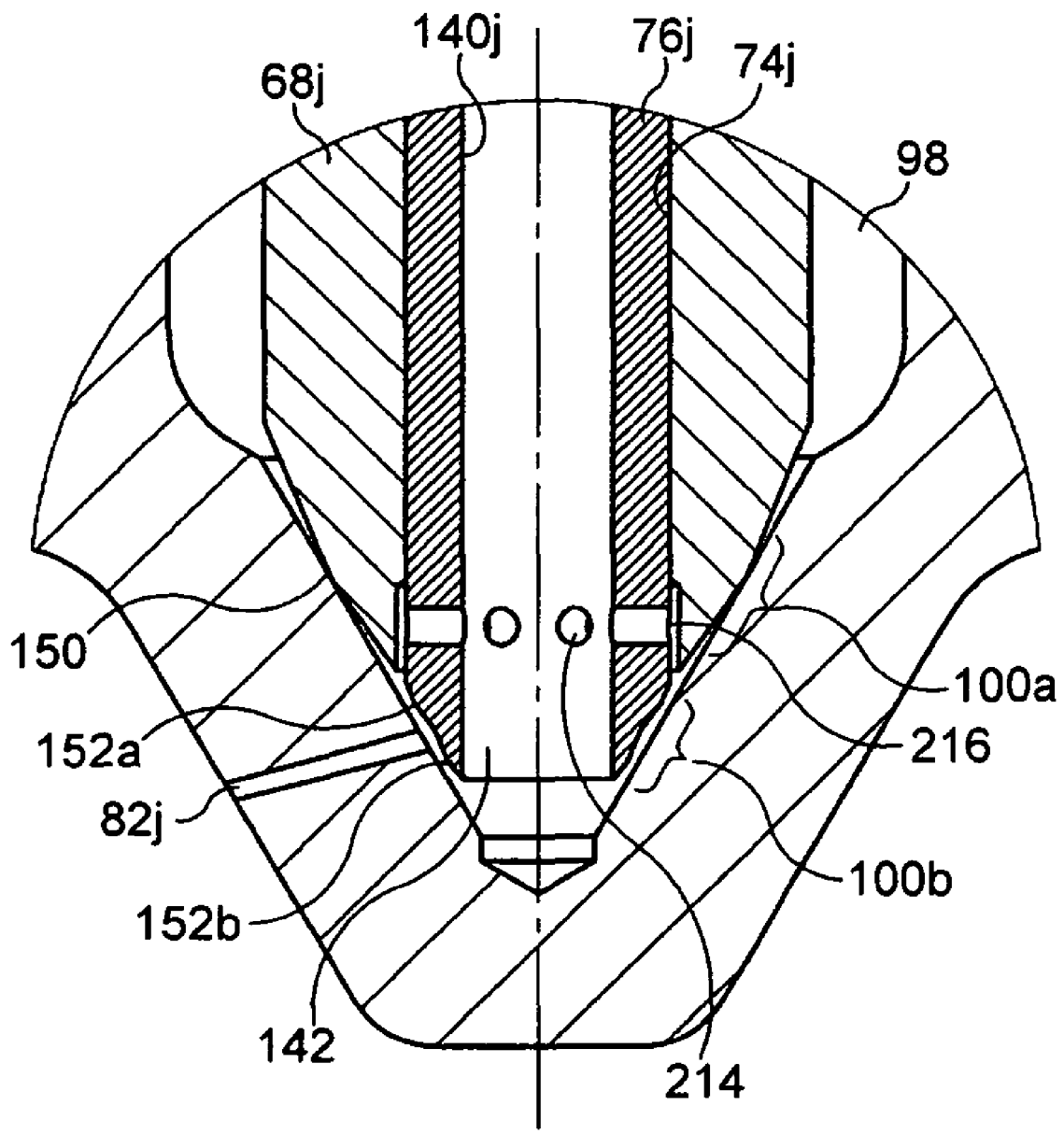
FIG. 20b is a further enlarged sectional view of part of the fuel injector of FIGS. 18a to 20a, when the outer valve member is in a seated position and the inner valve member is in an unseated position.

Once a sufficient amount of the first fuel has been permitted to flow into the second delivery chamber 142, the actuator 56 is returned to its intermediate position. Subsequently, an injection is initiated by extending the actuator 56 so as to lift the inner valve member 76j from its seated position, while leaving the outer valve member 68j seated as shown in FIGS. 20a and 20b. In this state, the mixture of first and second fuels can pass through the outlets 82j for delivery to the combustion chamber 48. Flow of the first fuel from the first delivery chamber 98 is prevented by engagement of the outer valve member 68j with the first seating region 100a.

It will be appreciated that, should the injection event be prolonged, the mixture of fuel in the second delivery chamber 142 will become richer in the second fuel, until eventually only the second fuel is delivered. Under normal operating conditions, however, the injection duration is sufficiently short to avoid this effect. In any case, the changing ratio of the fuel mixture delivered over the course of an injection can be readily determined during calibration of the injector 30j so that an injection timing correction could be applied if necessary.

Figure 21A:
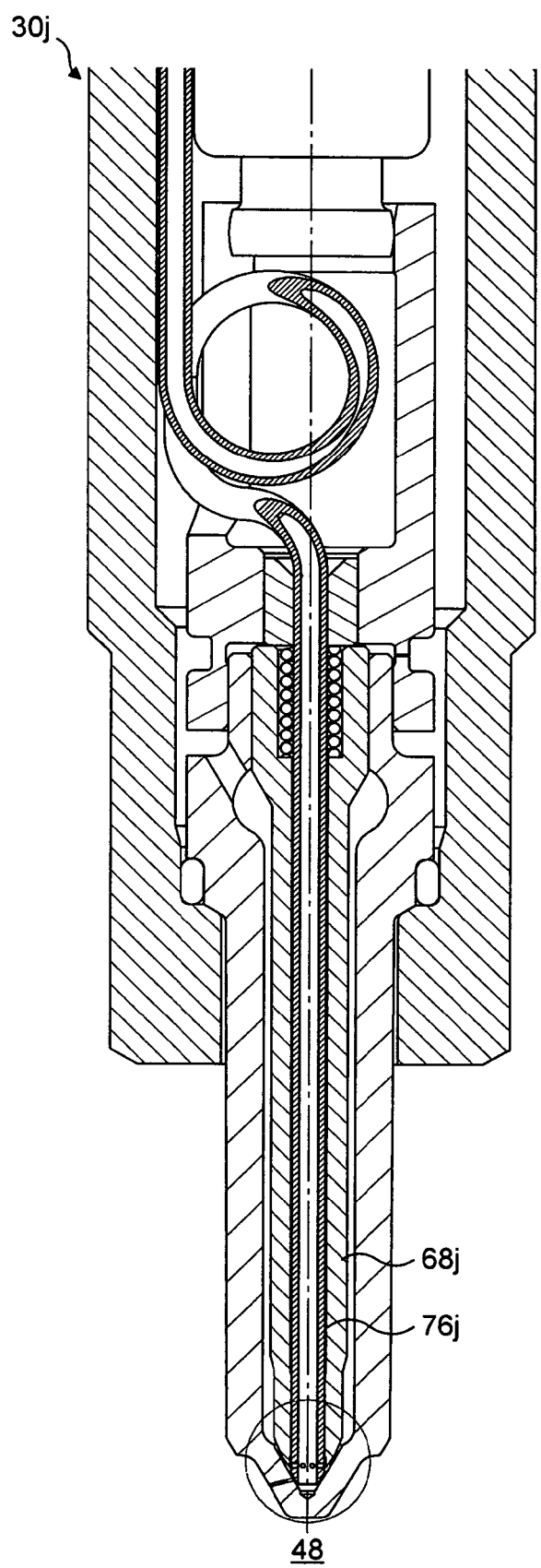
FIG. 21a is an enlarged sectional view of part of the fuel injector of FIGS. 18a to 20b, when the outer and inner valve members are both in unseated positions.
Figure 21B:
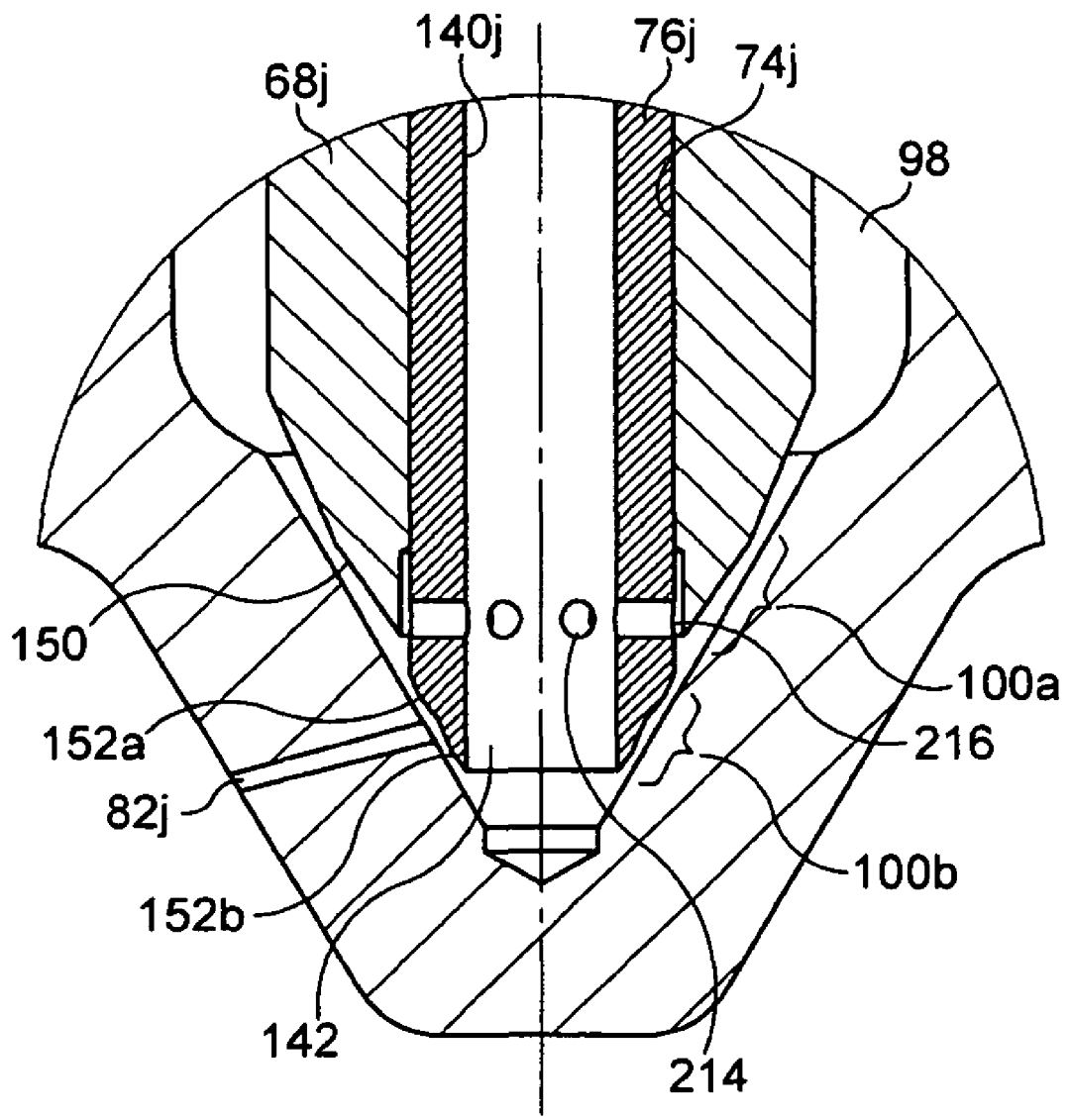
FIG. 21b is a further enlarged sectional view of part of the fuel injector of FIGS. 18a to 21a, when the outer and inner valve members are both in unseated positions.

FIGS. 21a and 21b illustrate a further operating mode of the injector 30j of the tenth embodiment, wherein both the inner and outer valve members 68j, 76j are lifted from the first and second seating regions 100a, 100b respectively by setting the actuator 56 to a fully contracted state, as previously described. In this case, the first and second fuels can flow through the outlet 82j for simultaneous delivery to the combustion chamber 48, having undergone a degree of mixing within the injector 30j. If the supply pressures of the first and second fuels are equal, then the ratio of the first fuel to the second fuel in the mixture of fuel flowing through the outlet 82j will be approximately 1:1, irrespective of needle lift. This is because the inner valve member 76j is dominant in restricting the flow of both fuels in this arrangement. However, if a pre-mixing step as shown in FIGS. 19a and 19b precedes the injection, then the composition of the initially injected ratio will accordingly be different.

Figure 22A:
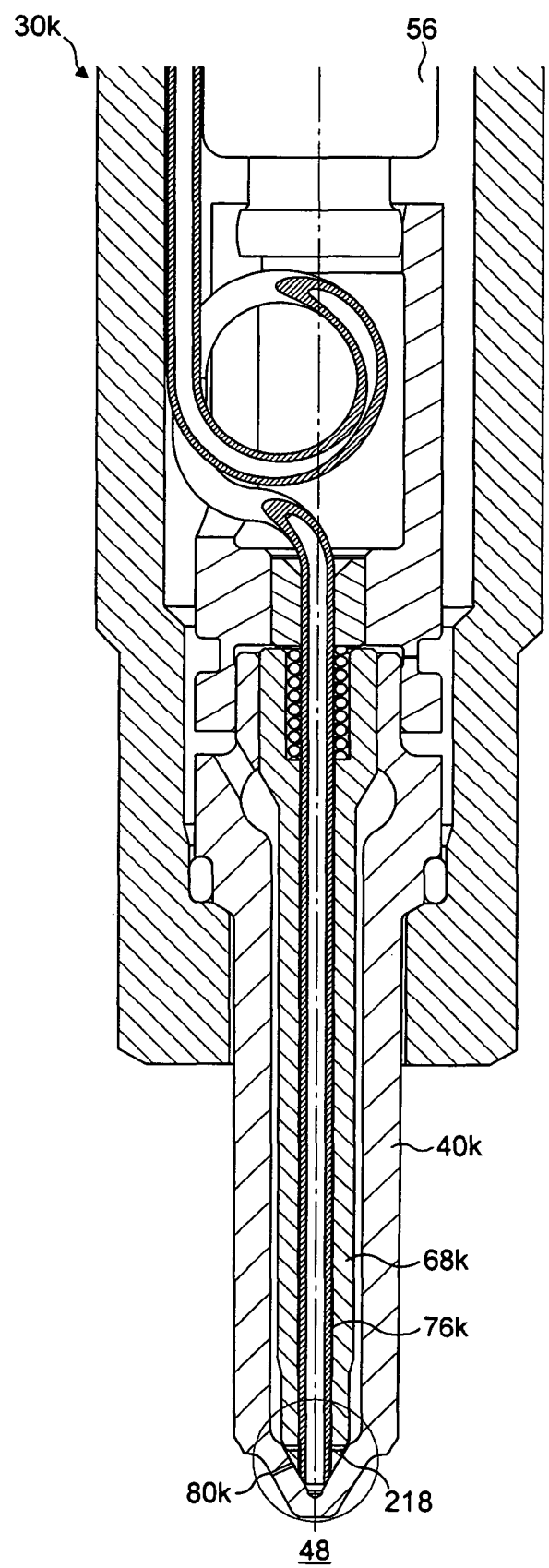
FIG. 22a is an enlarged sectional view of part of a fuel injector according to an eleventh embodiment of the present invention, including an outer valve member and an inner valve member, when the outer and inner valve members are both in seated positions.
Figure 22B:
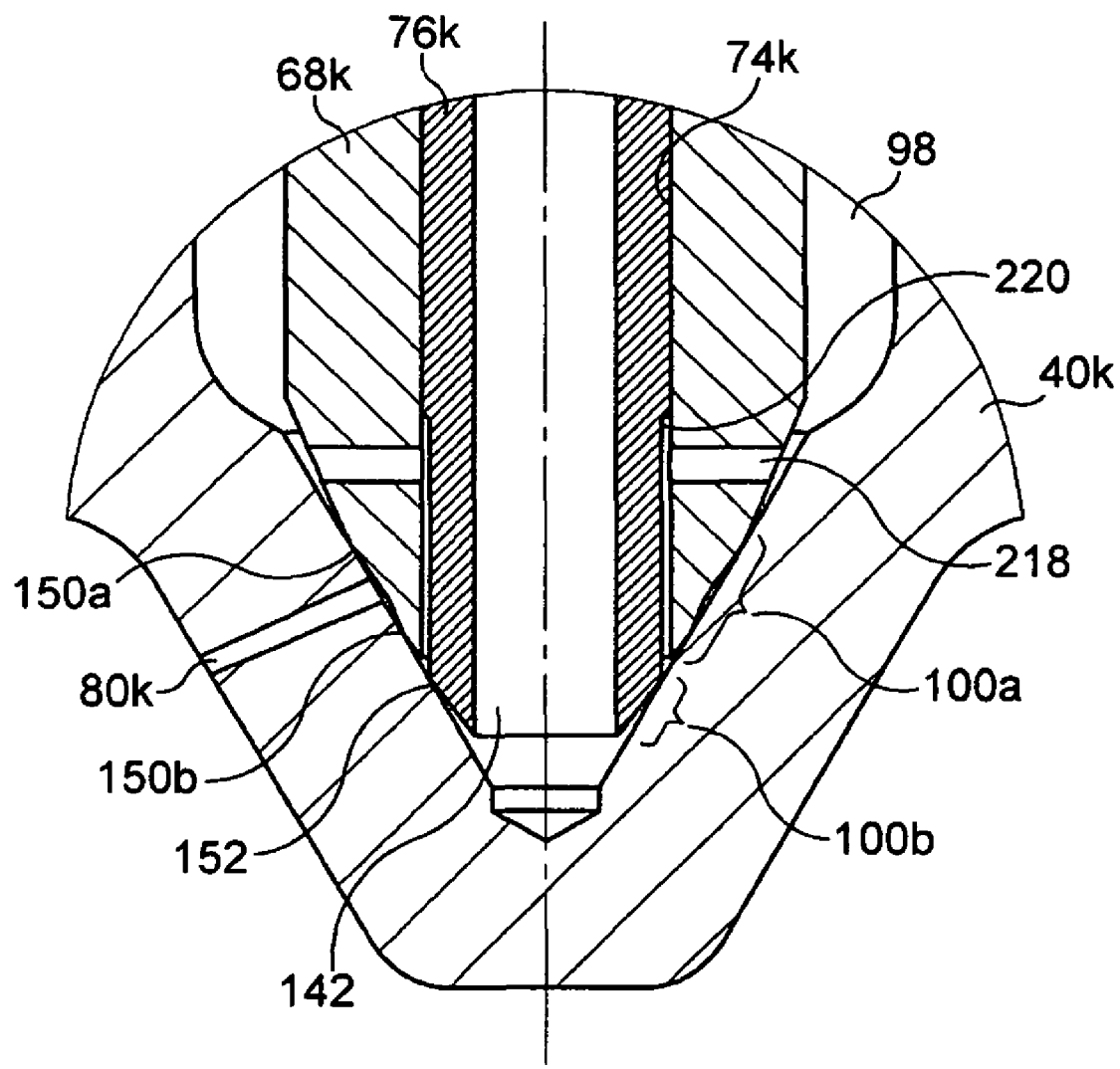
FIG. 22b is a further enlarged sectional view of part of the fuel injector of FIG. 22a, when the outer and inner valve members are both in seated positions.

FIGS. 22a and 22b show a fuel injector 30k according to an eleventh embodiment of the invention, which is similar to the tenth embodiment of the invention except in that the functions of the inner and outer valve members are reversed. Thus, the inner valve member 76k comprises a tubular needle with unbroken walls, and has a single seating line 152 for engagement with the second seating region 100b. The outer valve member 68k is provided with radial passages 218 that extend from the inner surface of its bore 74k to its outer surface. The radial passages 218 communicate at their outermost ends with the first delivery chamber 98 between the outer valve member 68k and the nozzle body 40k, and at their innermost ends with an enlarged clearance 220 between the inner and outer valve members 68k, 76k.

The outer valve member 68k is provided with two seating lines 150a, 150b to engage with the first seating region 100a and the single set of outlets 80k extends from the first seating region 100a to the outside wall of the nozzle body 40k. The outlets open on to the first seating region 100a at an axial location between the upper and lower seating lines 150a, 150b of the outer valve member 68k when the outer valve member 68k is seated.

When the actuator 56 is in its intermediate position, the outer and inner valve members 68k, 76k are seated against the first and second seating regions 100a, 100b respectively. Flow of the first fuel through the outlets 80k is prevented by cooperation of the outer valve member 68k with the first seating region 100a. In particular, engagement of the upper seating line 150a with the first seating region 100a prevents flow of the first fluid from the first delivery chamber 98 to the outlets 80k, while engagement of the lower seating line 150b with the first seating region 100a prevents flow of the first fluid from the clearance 220 to the outlets 80k. Flow of the second fuel out of the second delivery chamber 142 is prevented by engagement of the seating line 152 of the inner valve member 76k with the second seating region 100b.

Figure 23A:
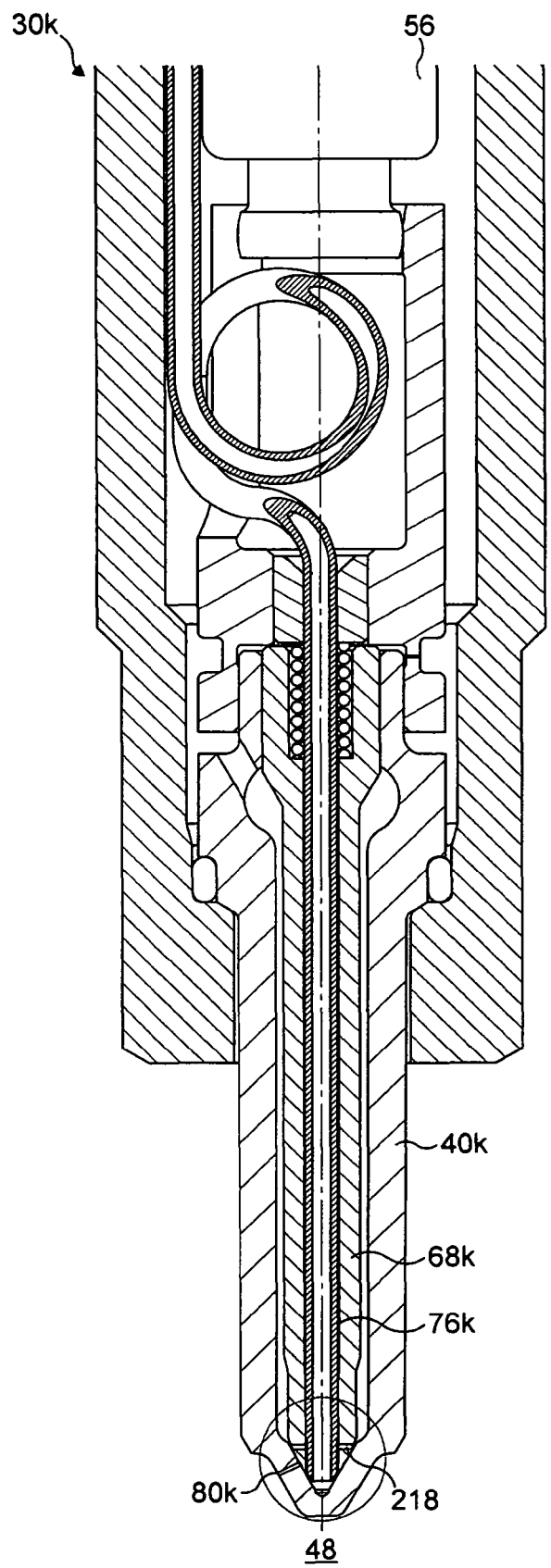
FIG. 23a is an enlarged sectional view of part of the fuel injector of FIGS. 22a and 22b, when the outer valve member is in a seated position and the inner valve member is in an unseated position.
Figure 23B:
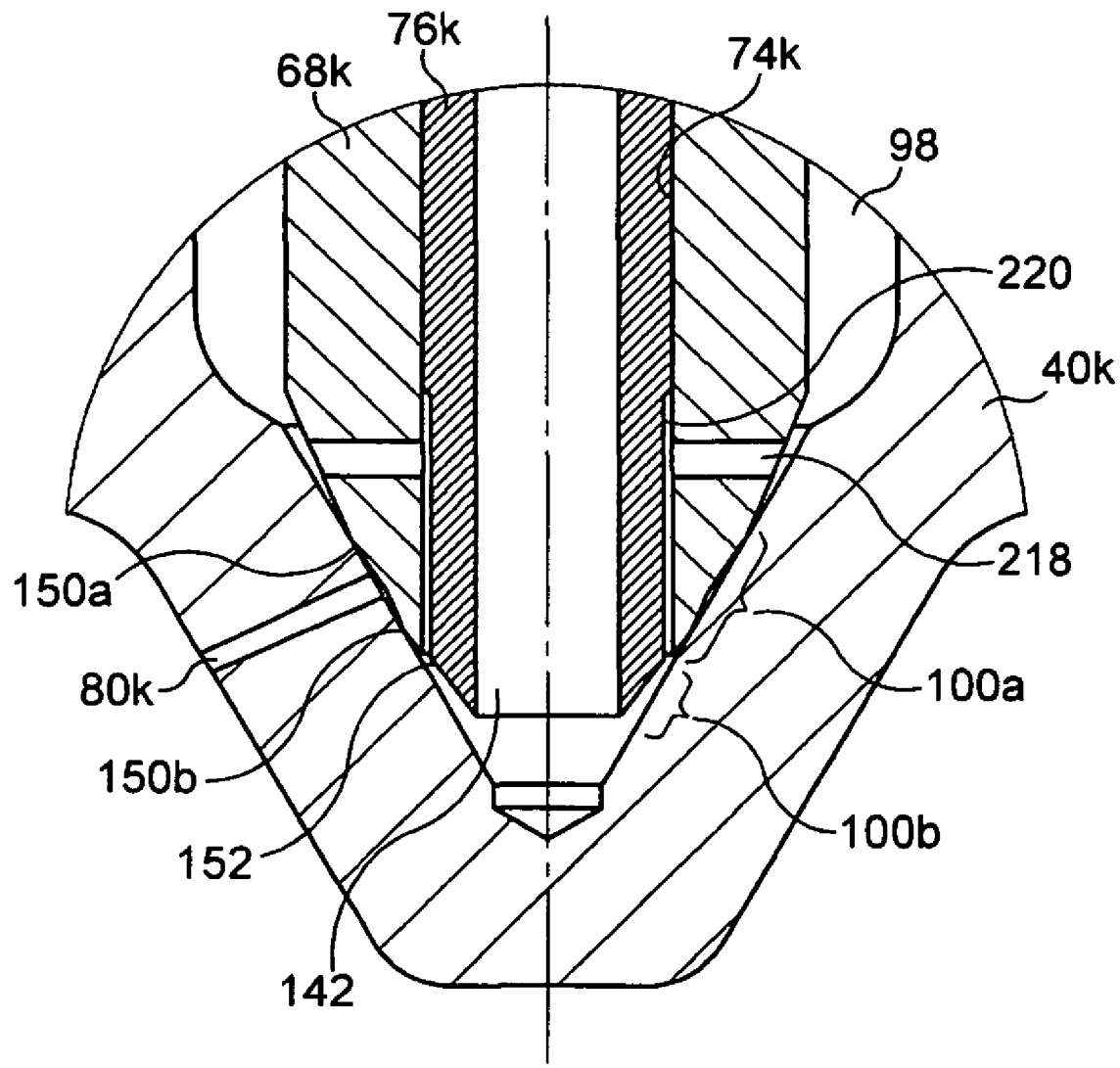
FIG. 23b is a further enlarged sectional view of part of the fuel injector of FIGS. 22a to 23a, when the outer valve member is in a seated position and the inner valve member is in an unseated position.

FIGS. 23a and 23b illustrate a pre-mixing operation of the injector 30k. In this case, the actuator 56 is extended to cause the inner valve member 76k to lift from the second seating region 150b, while the outer valve member 68k remains seated. The second fuel can then flow from the second delivery chamber 142 to the first delivery chamber 98, by way of the clearance 220 and the radial passages 218, whereupon it mixes with the first fuel. The quantity of the second fuel to be mixed with the first fuel can be metered or controlled by varying the amount of lift of the inner valve member 76k and the time, for which it is unseated. When the correct quantity of the second fuel has been metered, the inner valve member 76k is re-seated by returning the actuator to its intermediate position.

Figure 24A:
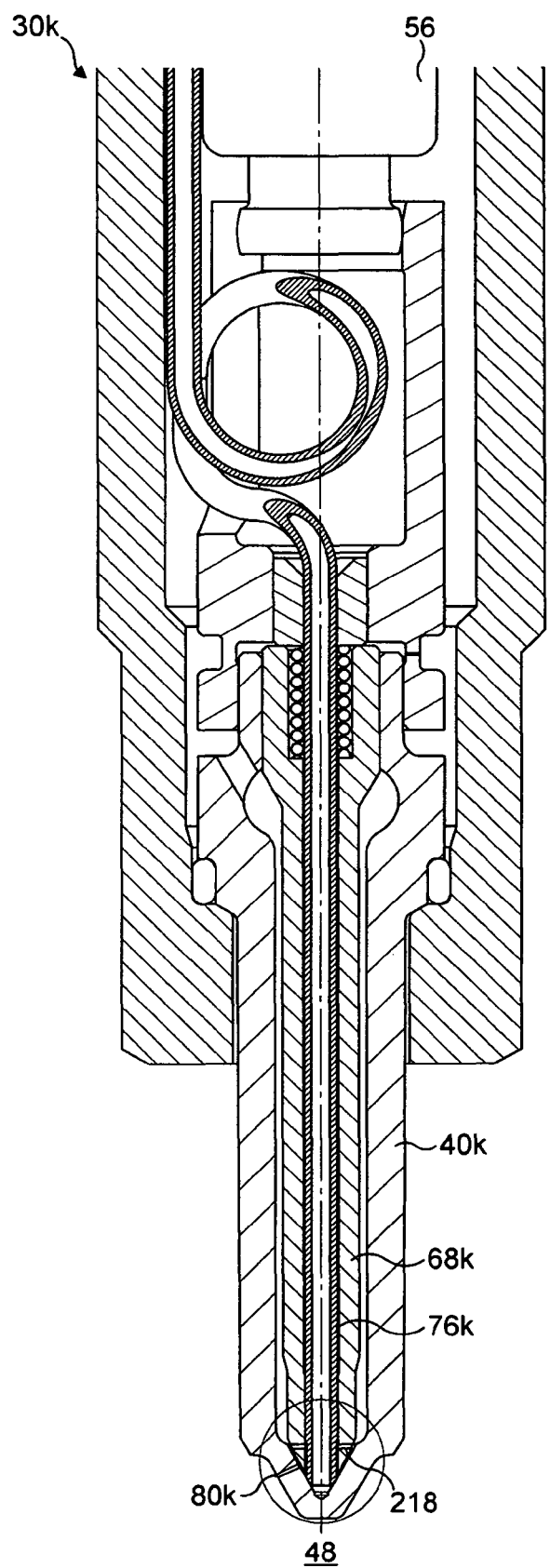
FIG. 24a is an enlarged sectional view of part of the fuel injector of FIGS. 22a to 23b, when the outer valve member is in an unseated position and the inner valve member is in a seated position.
Figure 24B:
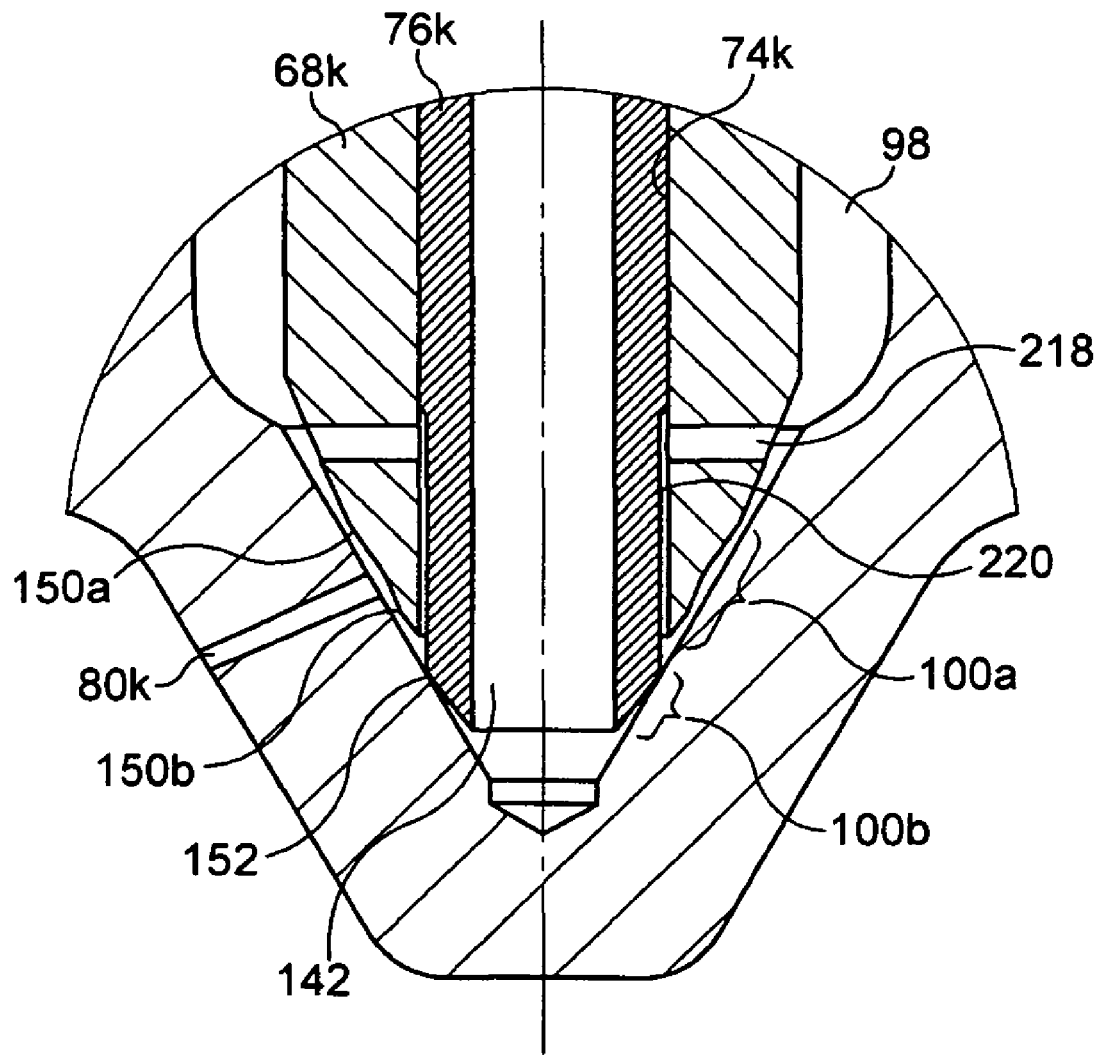
FIG. 24b is a further enlarged sectional view of part of the fuel injector of FIGS. 22a to 24a, when the outer valve member is in an unseated position and the inner valve member is in a seated position.

FIGS. 24a and 24b illustrate an injection operation. The actuator 56 is partially retracted to cause the outer valve member 68k to lift away from the first seating region 100a, while the inner valve member 76k remains seated. In this way, the mixture of the first and second fuels in the first delivery chamber 98 can flow through the outlets 80k for delivery to the combustion chamber 48.

Figure 25A:
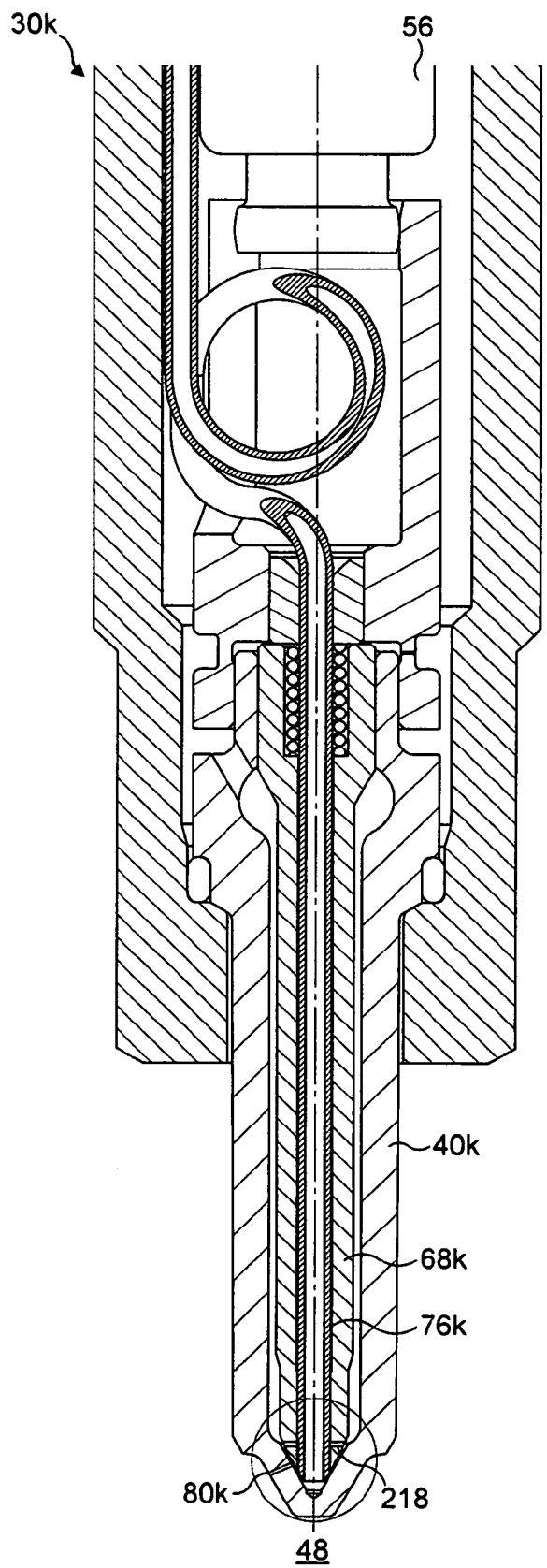
FIG. 25a is an enlarged sectional view of part of the fuel injector of FIGS. 22a to 24b, when the outer and inner valve members are both in unseated positions.
Figure 25B:
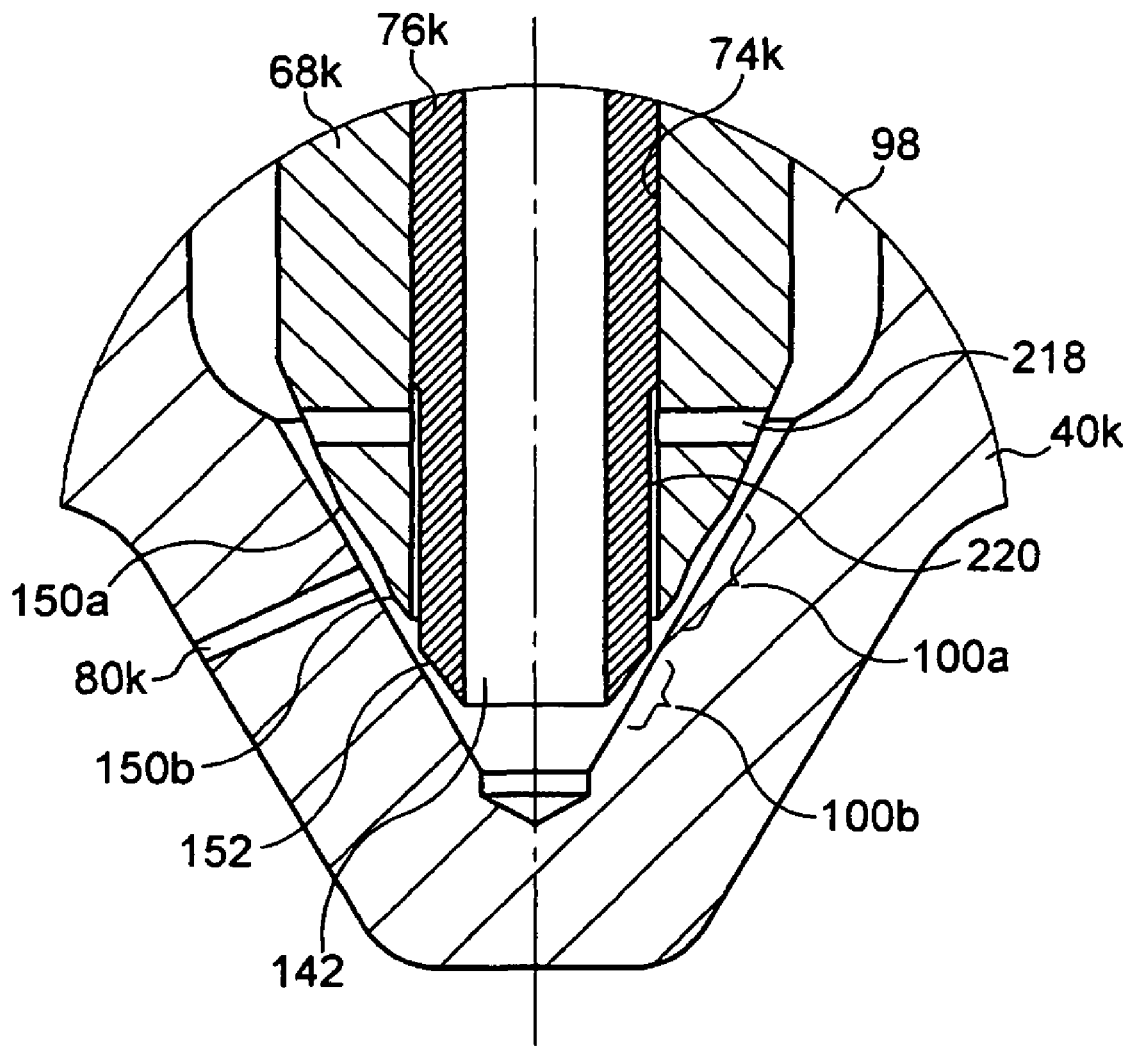
FIG. 25b is a further enlarged sectional view of part of the fuel injector of FIGS. 22a to 25a, when the outer and inner valve members are both in unseated positions.

Upon further retraction of the actuator 56 to a fully retracted position, the inner valve member 76k lifts from the second seating region 100b as shown in FIGS. 25a and 25b. In this case, both the first and second fuels can flow through the outlets 80k simultaneously, and undergo a degree of mixing within the injector 30k.

One particular advantage of the tenth and eleventh embodiments of the invention is that, by providing for pre-mixing of well-defined quantities of the first and second fuels, a high degree of control of the charge composition in the combustion chamber can be achieved.

It will be appreciated that many variations and modifications could be made to the embodiments described above, which are given as examples only. In particular, many features of the various embodiments could be combined with one another, even if such combinations have not been explicitly mentioned. Some further examples of possible variations will now be described.

Although the inner valve member has been described as a single integrated component, the inner valve member could instead be formed from two or more components. For example, in the embodiments having a hollow inner valve member for passage of fuel, the collar, the coiled portion, and the other portions of the inner valve member could be integrated or could be separate components. Similarly, when the inner valve member is a solid component, the head region and the needle region could be separate components instead of a single component. In any case, the tip of the inner valve member could be a separate part, joined to the remainder of the inner valve member by an interference fit or, alternatively or in addition, by welding.

In cases where the second fuel is admitted to the injector by way of a second injector inlet in the capnut of the injector, the second fuel is supplied to a space between the injector and the bore in a cylinder head, for example by way of passages in the cylinder head as previously described. However, the second fuel may be supplied to the space between the injector and the bore by another means, for example by providing a supply line that enters the bore alongside the injector, or by integrating a supply line within the upper portion of the injector body to feed fuel into the space.

In the foregoing description, reference has been made to the first and second fluids being fuels. Although the invention is particularly suitable for injection of fuels from two sources, it will be appreciated that the invention need not be limited to the delivery of two fuels. Instead, the second fluid may be an alternative fluid, such as water for reducing engine temperatures, urea or ammonia for reducing NOX emissions, and so on. The second fluid need not be injected during the same part of the combustion cycle as the first fluid. For example, if the second fluid is urea or ammonia, it may be beneficial to deliver the second fluid to the combustion chamber during the expansion stroke of the cylinder.

To allow operation of the injector, the first fluid must be a liquid over the temperature and pressure conditions prevalent in the injector in use. The first fluid may serve to lubricate the moving components of the injector. In contrast, the second fluid need not be a liquid. For example, the second fluid could be a gaseous fuel such as hydrogen, liquefied petroleum gas (LPG), compressed natural gas (CNG) or methane. The second fluid could alternatively be a solid carried in a gas or liquid, such as coal dust, biomass dust from shredded plant matter, urea crystals, or a catalytic agent such as cerium carried in a suitable carrier gas or liquid.

The injector is also advantageous in heavy fuel engines, which run on fuels such as heavy fuel oil or bitumen, which have high viscosities or are solid at room temperature. In this case, the first fluid could be diesel, enabling the engine to be run until a high enough operating temperature has been achieved to allow injection of the heavy fuel as the second fluid, either in addition to or instead of the first fluid. If the engine is operated on mixture of heavy fuel and diesel, then it may be desirable to switch back to diesel-only operation to flush the engine of heavy fuel before stopping the engine. This avoids problems such as clogging or corrosion that can occur when certain heavy fuels are mixed with diesel. The embodiments of the invention where the second fluid is supplied by way of passages in the cylinder head may be particularly advantageous in maximizing the transfer of heat from the engine to the heavy fuel before it enters the injector.

The invention has been described with reference to a piezoelectric actuator. It will be appreciated, however, that an alternative actuator, such as a magnetostrictive actuator or a solenoid actuator, could be used.

The invention claimed is:

1. A fuel injector for use in an internal combustion engine, comprising:
   a nozzle body provided with a nozzle bore and at least one set of one or more outlets for fluid;
   an outer valve member received within the nozzle bore and being engageable with a first seating region of the nozzle body to control the flow of a first fluid from a first delivery chamber to at least one set of outlets, the outer valve member being provided with an outer valve bore;
   an inner valve member received within the outer valve bore and being engageable with a second seating region of the nozzle body to control the flow of a second fluid from a second delivery chamber to at least one set of outlets;
   an injection control chamber for the first fluid;
   a pressure control arrangement for controlling the pressure of fluid in the control chamber;
   a first surface associated with the inner valve member, the first surface being exposed to fluid pressure within the injection control chamber; and
   a second surface associated with the outer valve member, the second surface being exposed to fluid pressure within the injection control chamber;
   wherein, when the injection control chamber is at an intermediate fluid pressure, the inner and outer valve members are in engagement with their respective seating regions;
   and wherein the first and second surfaces are arranged such that when the pressure of fluid within the injection control chamber is increased from the intermediate fluid pressure to a relatively high pressure, one of the outer valve member or the inner valve member is caused to disengage its respective seating region, and when the pressure of fluid within the injection control chamber is decreased from the intermediate fluid pressure to a relatively low pressure, the other of the outer valve member or the inner valve member is caused to disengage its respective seating region.

2. A fuel injector according to claim 1, wherein a decrease in fluid pressure within the injection control chamber causes the outer valve member to disengage the first seating region and wherein an increase in fluid pressure within the injection control chamber causes the inner valve member to disengage the second seating region.

3. A fuel injector according to claim 1, wherein the pressure control arrangement further includes a control piston having a surface that defines the injection control chamber, together with the first and second surfaces, and wherein the control piston is operable to control the volume of the injection control chamber.

4. A fuel injector according to claim 1, wherein the inner valve member is provided with a collar comprising the first surface.

5. A fuel injector according to claim 1, wherein the pressure control arrangement includes a piezoelectric actuator having a stack of piezoelectric elements, and wherein an increase in the length of the actuator causes an increase in fluid pressure within the injection control chamber.

6. A fuel injector according to claim 5, wherein at least part of the actuator is arranged in a first accumulator volume for receiving the first fluid at an injection pressure.

7. A fuel injector according to claim 6, further including a restricted flow arrangement for equalizing pressure between the control chamber and the first accumulator volume.

8. A fuel injector according to claim 7, wherein the restricted flow arrangement includes a restricted flow passage provided in the pressure control arrangement to fluidly connect the injection control chamber to the first accumulator volume.

9. A fuel injector according to claim 1, further including a coupler to couple movement of the outer valve member to the inner valve member when the outer valve member is caused to move away from the first seating region.

10. A fuel injector according to claim 9, wherein the coupler includes an abutment surface associated with the outer valve member, the abutment surface being engageable with a cooperable surface associated with the inner valve member.

11. A fuel injector according to claim 10, wherein the abutment surface associated with the outer valve member is an upper end face of the outer valve member.

12. A fuel injector according to claim 10, wherein the cooperable surface associated with the inner valve member is the first surface.

13. A fuel injector according to claim 1, wherein the first delivery chamber is defined by the bore of the nozzle body and the outer valve member.

14. A fuel injector according to claim 1, wherein the first fluid is a liquid fuel.

15. A fuel injector according to claim 1, wherein the nozzle body is provided with a first set of one or more outlets comprising one or more passages extending through the nozzle body from the first seating region to the outer surface of the nozzle body.

16. A fuel injector according to claim 15, wherein the outer valve member is provided with an upper seating line and a lower seating line engageable with the first seating region at respective positions either side of the first set of outlets.

17. A fuel injector according to claim 16, wherein the upper and lower seating lines are defined by upper and lower edges, respectively, of an annular groove provided on the outer valve needle.

18. A fuel injector according to claim 16, wherein cooperation between the upper seating line of the outer valve member and the first seating region controls fluid flow between the first delivery chamber and the first set of outlets.

19. A fuel injector according to claim 16, wherein cooperation between the lower seating line and the first seating region controls fluid flow between the second delivery chamber and the first set of outlets.

20. A fuel injector according to claim 15, wherein the nozzle body is provided with a second set of one or more outlets comprising one or more passages extending through the nozzle body from the second seating region to the outer surface of the nozzle body.

21. A fuel injector according to claim 20, wherein the inner valve member is provided with an upper seating line) and a lower seating line engageable with the second seating region at respective positions either side of the second set of outlets.

22. A fuel injector according to claim 21, wherein the upper and lower seating lines are defined by upper and lower edges, respectively, of an annular groove provided on the inner valve member.

23. A fuel injector according to claim 21, wherein cooperation between the lower seating line of the inner valve member and the second seating region controls fluid flow between the second delivery chamber and the second set of outlets.

24. A fuel injector according to claim 21, wherein cooperation between the upper seating line of the inner valve member and the second seating region controls fluid flow between the first delivery chamber and the second set of outlets.

25. A fuel injector according to claim 20, wherein the second set of outlets comprises an orifice extending axially through a tip region of the nozzle body.

26. A fuel injector according to claim 25, wherein the second delivery chamber comprises a bore of the inner valve member, and wherein the inner valve member is provided with an upper seating line and a lower seating line engageable with the second seating region at respective positions either side of one or more passages that extend through the inner valve member to communicate with the second delivery chamber.

27. A fuel injector according to claim 26, wherein the lower seating line is engageable with the second seating region to control flow of the second fluid from the second delivery chamber to the second set of outlets by way of the passages.

28. A fuel injector according to claim 15, wherein the outer valve member is operable to control flow of the first fluid from the first delivery chamber to the first set of outlets while the inner valve member remains engaged with the second seating region.

29. A fuel injector according to claim 20, wherein the inner valve member is operable to control flow of the second fluid from the second delivery chamber to the second set of outlets while the outer valve member remains engaged with the first seating region.

30. A fuel injector according to claim 20, wherein the inner valve member is coupled to the movement of the outer valve member to control flow of the second fluid from the second delivery chamber through the first and second outlets.

31. A fuel injector according to claim 1, wherein the nozzle body is provided with a single set of one or more outlets for fluid including one or more passages extending through the nozzle body.

32. A fuel injector according to claim 31, wherein the or each passage extends from the first seating region to an outer surface of the nozzle body, and wherein:
  in a first mode of operation, the outer valve member is operable to control flow of fluid from the first delivery chamber through the or each outlet while the inner valve member remains engaged with the second seating surface; and
  in a second mode of operation, the inner valve member is coupled to the movement of the outer valve member to control flow of fluid from the second delivery chamber through the or each outlet.

33. A fuel injector according to claim 32, further including a clearance defined in part by the outer valve member and in part by the inner valve member, wherein the outer valve member includes a communication path for fluid flow between the first delivery chamber and the clearance, and wherein, in a third mode of operation, the inner valve member is operable to control flow of the first and second fluids between the first delivery chamber and the second delivery chamber by way of the clearance so as to cause mixing of the first and second fluids while the outer valve member remains engaged with the first seating surface.

34. A fuel injector according to claim 32, wherein the outer valve member is provided with an upper seating line and a lower seating line engageable with the first seating region at respective positions either side of the passages of the outlet, and wherein the inner valve member is provided with a single seating line for engagement with the second seating region.

35. A fuel injector according to claim 31, wherein the or each passage extends from the second seating region to an outer surface of the nozzle body, and wherein:
  in a first mode of operation, the inner valve member is operable independently of the outer valve member to control flow of the second fluid from the second delivery chamber through the or each outlet; and
  in a second mode of operation, the inner valve member is coupled to the movement of the outer valve member to control flow of the first fluid from the first delivery chamber through the or each passage.

36. A fuel injector according to claim 35, further including a clearance defined in part by the outer valve member and in part by the inner valve member, wherein the inner valve member includes a communication path for fluid flow between the second delivery chamber and the clearance, and wherein, in a third mode of operation, the outer valve member is operable to control flow of the first and second fluids between the first delivery chamber and the second delivery chamber by way of the clearance so as to cause mixing of the first and second fluids, while the inner valve member remains engaged with the second seating surface.

37. A fuel injector according to claim 35, wherein the inner valve member is provided with an upper seating line and a lower seating line engageable with the second seating region at respective positions either side of the outlet, and wherein the outer valve member is provided with a single seating line for engagement with the first seating region.

38. A fuel injector according to claim 31, wherein the or each outlet extends from a position intermediate the first and second seating regions to an outer surface of the nozzle body, and wherein:
  in a first mode of operation, the inner valve member is operable to control flow of the second fluid from the second delivery chamber through the or each outlet while the outer valve member remains engaged with the first seating region; and
  in a second mode of operation, the outer valve member is operable to control flow of the first fluid from the first delivery chamber through the or each outlet while the inner valve member remains engaged with the second seating region.

39. A fuel injector according to claim 38, wherein, in a third mode of operation, the inner valve member is coupled to movement of the outer valve member to control flow of the first and second fluids from the respective first and second delivery chambers through the or each outlet.

40. A fuel injector according to claim 39, wherein the outer valve member is provided with a single seating line for engagement with the first seating region, and wherein the inner valve member is provided with a single seating line for engagement with the second seating region.

41. A fuel injector according to claim 1, further comprising a biasing element to bias the inner valve member towards the second seating region.

42. A fuel injector according to claim 41, wherein the biasing element comprises a coiled portion of the inner valve member.

43. A fuel injector according to claim 41, wherein the biasing element is a spring.

44. A fuel injector according to claim 1, wherein the inner valve member comprises a solid needle and the second delivery chamber is defined in part by the needle and in part by the nozzle body.

45. A fuel injector according to claim 44, wherein the second delivery chamber is defined by a blind bore extending upwardly from a tip of the needle and a blind bore extending downwardly within the nozzle body.

46. A fuel injector according to claim 44, wherein the nozzle body carries a sleeve to define a second accumulator volume for receiving the second fluid between the nozzle body and the sleeve.

47. A fuel injector according to claim 46, wherein the nozzle body includes a flow path for communication of the second fluid from the second accumulator volume to the second delivery chamber.

48. A fuel injector according to claim 47, wherein the flow path includes the second delivery chamber.

49. A fuel injector according to claim 48, wherein the second delivery chamber is a cross-hole of the flow path.

50. A fuel injector according to claim 1, wherein the inner valve member comprises a tube for delivery of the second fluid to the second delivery chamber, and wherein the second delivery chamber is defined, in part, by a bore of the inner valve member.

51. A fuel injector according to claim 50, including a capnut for retaining the nozzle body on an end of the injector body, and wherein one or more radial passages are provided in the capnut to form an inlet to admit the second fluid to the injector.

52. A fuel injector according to claim 51, wherein the nozzle body comprises a communication path for communication of the second fluid from the inlet to the inner valve member.

53. A fuel injector according to claim 52, wherein the communication path includes passages within a collar portion of the nozzle body.

54. A fuel injector according to claim 52, wherein the communication path includes a filter arrangement for filtering the second fluid.

55. A fuel injector according to claim 50, wherein an upstream end of the inner valve member comprises an inlet to admit the second fluid to the injector.

\* \* \* \* \*